(12) United States Patent
Creeger et al.

(10) Patent No.: US 12,293,188 B2
(45) Date of Patent: May 6, 2025

(54) METHOD AND APPARATUS FOR CONFIGURING A REDUCED INSTRUCTION SET COMPUTER PROCESSOR ARCHITECTURE TO EXECUTE A FULLY HOMOMORPHIC ENCRYPTION ALGORITHM

(71) Applicant: Cornami, Inc., Santa Clara, CA (US)

(72) Inventors: Morris Jacob Creeger, Santa Clara, CA (US); Tianfang Liu, Santa Clara, CA (US); Frederick Furtek, Santa Clara, CA (US); Paul L. Master, Santa Clara, CA (US)

(73) Assignee: Cornami, Inc., Santa Clara, CA (US)

( * ) Notice: Subject to any disclaimer, the term of this patent is extended or adjusted under 35 U.S.C. 154(b) by 385 days.

(21) Appl. No.: 17/860,475

(22) Filed: Jul. 8, 2022

(65) Prior Publication Data

US 2022/0360428 A1 Nov. 10, 2022

Related U.S. Application Data

(60) Division of application No. 16/743,257, filed on Jan. 15, 2020, now Pat. No. 11,693,662, which is a (Continued)

(51) Int. Cl.
*G06F 17/16* (2006.01)
*G06F 7/48* (2006.01)
(Continued)

(52) U.S. Cl.
CPC .......... *G06F 9/3812* (2013.01); *G06F 7/4806* (2013.01); *G06F 8/4436* (2013.01); *G06F 17/142* (2013.01)

(58) Field of Classification Search
CPC .... G06F 9/3812; G06F 7/4806; G06F 8/4436; G06F 17/142
See application file for complete search history.

(56) References Cited

U.S. PATENT DOCUMENTS

| 2005/0166033 A1 | 7/2005 | Jacob |
| 2018/0336161 A1 | 11/2018 | Sheikh et al. |

(Continued)

OTHER PUBLICATIONS

Keith A. Campbell, Robust and Reliable Hardware Accelerator Design Through High-Level Synthesis, 2017, [Retrieved on Dec. 11, 2024]. Retrieved from the internet: <URL: https://www.ideals.illinois.edu/items/105258> 128 Pages (1-128) (Year: 2017).*

(Continued)

*Primary Examiner* — Anibal Rivera
(74) *Attorney, Agent, or Firm* — Potomac Law Group, PLLC, Marc S. Kaufman

(57) ABSTRACT

Systems and methods for configuring a reduced instruction set computer processor architecture to execute fully homomorphic encryption (FHE) logic gates as a streaming topology. The method includes parsing sequential FHE logic gate code, transforming the FHE logic gate code into a set of code modules that each have in input and an output that is a function of the input and which do not pass control to other functions, creating a node wrapper around each code module, configuring at least one of the primary processing cores to implement the logic element equivalents of each element in a manner which operates in a streaming mode wherein data streams out of corresponding arithmetic logic units into the main memory and other ones of the plurality arithmetic logic units.

4 Claims, 52 Drawing Sheets

Related U.S. Application Data continuation-in-part of application No. 15/970,915, filed on May 4, 2018, now Pat. No. 11,294,851.

(60) Provisional application No. 62/883,967, filed on Aug. 7, 2019.

(51) Int. Cl.
*G06F 8/41* (2018.01)
*G06F 9/38* (2018.01)
*G06F 17/14* (2006.01)

(56) References Cited

U.S. PATENT DOCUMENTS

| | | | |
|---|---|---|---|
| 2019/0140818 A1* | 5/2019 | Bent | H04L 9/3093 |
| 2019/0334694 A1* | 10/2019 | Chen | H04L 9/008 |
| 2020/0394287 A1* | 12/2020 | Mucciolo | H04L 9/0618 |

OTHER PUBLICATIONS

International Searching Authority, International Search Report and Written Opinion for International Application No. PCT/US20/44944, mailed Jan. 5, 2021.

Rahman et al. "Dynamic Range Input FFT Algorithm for Signal Processing In Parallel Processor Architecture." In: Proceedings of the World Congress on Engineering and Computer Science 2011 vol. I WCECS 2011, Oct. 19, 2011, San Francisco, USA, (online) [retrieved on Nov. 23, 2020 (Nov. 23, 2020)1 Retrieved from lha Internet < URL: https://www.sem anUcs cholar.o rgfpapar/Dynamic-Range-Input-FFT-Algonthm-for-Sigm1-IIn- Rahman, oyaram/ 1d25616c110ca9e60a0tf61b058d813361b56275 >, entire document, especially Abstract; p. 2-6.

* cited by examiner

METHOD AND APPARATUS FOR CONFIGURING A REDUCED INSTRUCTION SET COMPUTER PROCESSOR ARCHITECTURE TO EXECUTE A FULLY HOMOMORPHIC ENCRYPTION ALGORITHM

RELATED APPLICATION DATA

This application is divisional of U.S. application Ser. No. 16/743,257 filed on Jan. 15, 2020, now U.S. Pat. No. 11,693,662, which is a continuation-in-part of U.S. application Ser. No. 15/970,915 filed on May 4, 2018, now U.S. Pat. No. 11,294,851, and claims priority to U.S. Provisional App. Ser. No. 62/883,967 filed on Aug. 7, 2019, the entire disclosures of which are incorporated herein by reference.

FIELD OF THE DISCLOSURE

The present disclosure relates to systems and methods for configuring a reduced instruction set computer processor architecture to execute a fully homomorphic encryption algorithm in a streaming manner.

BACKGROUND

Computing needs have changed drastically over the last several years. Since the 1980s, computer processor design has been focused on optimizing processors to execute computer code of enormous sizes. For example, Microsoft Office, a popular productivity suite, has been estimated to have tens of millions of lines of code. Yet, the data size that these massive code bases manipulate are comparatively small. For example, a Word document of several megabytes is all that is being manipulated by the code base in most cases. Other applications, such as graphics processing, while generating a large amount of data, have the same lopsided characteristic of a large code base manipulating a relatively small working set size of data. Thus, the design of conventional graphics processors has been based on techniques similar to processors for more code intensive applications.

Complex Instruction set Computing (CISC) processors are based on a processor design where single instructions can execute several low-level operations (such as a load from memory, an arithmetic operation, and a memory store) or are capable of multi-step operations or addressing modes within single instructions. CISC processors are characterized by having many clock cycles per each instruction, a slow overall clock due to the large amount of circuitry required to implement each complex instruction, and a single control thread, thus characterized as being control-centric. The term "control-centric", as used herein, refers to a processor that relies primarily on reading and executing instructions for its processing and moving of data. In most applications, moving data is the most resource intensive operation.

More recently, Reduced Instruction Set Computing (RISC) processors have become popular. A RISC processor is one whose instruction set architecture has a set of attributes that allows it to have much simpler circuitry required to implement its instructions and thus a lower cycles per instruction than a complex instruction set computer. A processor that has a small set of simple and general instructions running faster, rather than a large set of complex and specialized instructions running slower is generally more efficient. RISC processors are characterized by having relatively few clock cycles per instruction, a fast clock, a single control thread, and are characterized as being control-centric.

Due to the requirement that processors must run very large instruction code bases RISC processors have been optimized with multiple levels of memory caches that are backed up by even larger Double Data Rate (DDR) DRAM memory. The smaller memory caches are faster from a clock cycle access point of view than the large DRAM. Since code exhibits "locality of reference", that is the probability that the next instruction required to be executed in the code base is relatively nearby (as defined by its address), the DRAM holds the majority of the executable code, and the specific code to be executed is loaded from the DRAM into the memory caches with a high probability that the next instruction to be accessed will be available in the cache. While this multiple level cache system is excellent in terms of speeding up the execution of large code bases, it fails when moving large amounts of data.

Modern RISC processor designs consist of a multiplicity of levels of caches. This allows flexibility of instructions flow for large executable code bases but is not efficient for large amounts of data. Moving data in and out of caches is relatively slow, there is overhead in extra circuitry required to maintain cache coherency across all the levels of caches and memory and requires a large amount of energy. This "penalty" is acceptable when a group of instructions is brought in from DRAM and executed multiple times from a cache but is highly inefficient for data movement. Data that needs to be processed once, must go thru the cache overhead (extra power dissipation, extra circuitry which equates to slower clock speeds, and multiple copies in multiple caches) of the caches.

This data movement penalty is the characteristic of modern processor architectures, including graphic processor units (GPU). Multi-core designs of processors and GPUs replicate the caches per individual processor core and only serve to exacerbate the performance and power dissipation penalty of using these legacy architectures to solve problems that require vast amounts of data movement. Recent developments in computing technology, such as Fully Homomorphic Encryption (FHE), Artificial Intelligence (AI), Deep Learning (DL), Machine Learning (ML), Machine Intelligence (MI), and Neural Networks (NN), require enormous amounts of computing resources both in terms of number of processor cores whose total sum aggregate performance is measured in TeraOperations (Trillions of operations) or TeraFLOPS (Trillion of Floating Point Operations) per second and power dissipation measured in the 100's of watts.

It is well known to encrypt data with various encryption algorithms in order to secure the data during transmission and storage. However, generally encrypted data must be decrypted in order to process the data. This means that the data is unsecure for at least a window of time in which the data is being processed. During that window of time, the unencrypted data can be copied or altered by an attacker. For this reason, processing of data in cloud-based environments, and other potentially unsecured environments is not common for data that requires an extremely high level of security.

Recently, the concept of "Fully Homomorphic Encryption" (FHE), i.e., encryption schemes in which arbitrary functions can be accomplished over encrypted data without the need for decryption (e.g., given encryptions $E(m1); \ldots ; E(mt)$ of $m1; \ldots ; mt$, one can efficiently compute a compact ciphertext that encrypts $f(m1; \ldots ; mt)$ for any computable function f). In other words, the result of a function applied to encrypted data will be, upon decryption, the same as the result of the corresponding function applied to the decrypted input data. For example, "*A Fully Homomorphic Encryption Scheme*", Craig Gentry, September 2009 teaches such an encryption scheme. However, FHE has not become widely feasible because FHE algorithms are implemented by a complex set of control-centric instruction modules that operate as sequential code and call other modules which also operate as sequential code. Therefore, for the reasons set forth above, pragmatic use of FHE algorithms generally requires a level of computing resources that is not readily available based on conventional processor technology.

For example, TFHE is an open-source library for FHE processing. TFHE is distributed under the terms of the Apache 2.0 license. The underlying scheme of TFHE is described in IACR conference Asiacrypt 2016: "*Faster fully homomorphic encryption: Bootstrapping in less than 0.1 seconds*", Ilaria Chillotti, Nicolas Gama, Mariya Georgieva and Malika Izabachène. TFHE is a C/C++ library which allows FHE evaluation of an arbitrary boolean circuit composed of binary gates, over encrypted data, using gate by gate bootstrapping. TFHE supports the homomorphic evaluation of the 10 binary gates (And, Or, Xor, Nand, Nor, etc. . . . ), as well as the negation and the Mux gate.

The library implements a Ring-variant of the GSW cryptography system. It also implements a dedicated Fast Fourier Transformation (FFT) for the anticyclic ring, and uses AVX assembly vectorization instructions. The default parameter set achieves 110-bit cryptographic security, based on ideal lattice assumptions. The library interface can be used in a conventional C code implementation.

Since the FFT function is critical in FHE, a dedicated FFT processor is required to run TFHE. FHE is indeed notoriously difficult to achieve Because of FHE's enormous computational demands, a task that would ordinarily take milliseconds in unencrypted from, typically takes hours when processed in FHE form. FHE's enormous computational demands are primarily due to a for-loop in the FHE code. For each encrypted Boolean-gate operation:
  there are 500 iterations of the loop,
  there are 5 steps in each loop iteration,
  one step consists of 4 1024-point IFFTs, and
  another step consists of 2 1024-point FFTs.

This results in 3,000 IFFTs/FFTs per encrypted Boolean-gate operation. Further, because these 5 steps are contained in a loop, they cannot be pipelined in a conventional processor architecture and must be performed serially. Also, each of the 500 iterations must be performed serially. This results in 2,500 steps that must be performed serially. This is an enormous computational burden when using conventional processing architectures and techniques.

SUMMARY

Implementations described herein include creating streaming data-centric topologies derived from TFHE functions. When converted to a streaming topology in the manner described herein, TFHE functions can be accomplished with far fewer computing resources. Stated differently, the methods and apparatus disclosed herein cause a computer to operate in a more efficient manner to the extent that FHE algorithms can be accomplished in a, dramatically faster, and more pragmatic, manner.

One aspect of the disclosed implementations is a method for configuring a reduced instruction set computer processor architecture to process a Discrete Fourier Transform (DFT) of a finite-length sequence N, wherein the computer processor architecture includes a plurality of primary processing cores defined by RISC processors, each primary processing core comprising a main memory, at least one cache memory, and a plurality of arithmetic logic units, each primary core having an associated node wrapper, the node wrapper including access memory associated with each arithmetic logic unit, a load/unload matrix associated with each arithmetic logic unit, the method comprising: (a) applying a Decimation-in-Frequency algorithm to the DFT to decompose the DFT of a finite-length sequence N into two derived DFTs each of a length N/2; (b) constructing a logic element equivalent of each stage of the derived DFTs in which inputs and outputs are composed of real and imaginary components; (c) repeating (a) and (b) for each stage of the DFT except for the endpoint stages of the DFT; (d) for each endpoint stage of the DFT constructing a logic element equivalent of the corresponding stage of the derived DFTs in which inputs and outputs are composed of only real components; (e) configuring at least one primary core of the computer processor architecture to implement the logic element equivalents of each stage of the DFTs in a manner which operates in a streaming mode wherein data streams out of corresponding arithmetic logic units into the main memory and other ones of the plurality arithmetic logic units; and (f) configuring the computer processor architecture to couple the output of each stage on the DFT to the input of a subsequent stage.

Another aspect of the disclosed implements is a method for configuring a reduced instruction set computer processor architecture to execute a fully homomorphic encryption (FHE) logic gate as a streaming topology, wherein the computer processor architecture includes a plurality of primary processing cores defined by RISC processors, each primary processing core comprising a main memory, at least one cache memory, and a plurality of arithmetic logic units, each primary core having an associated node wrapper, the node wrapper including access memory associated with each arithmetic logic unit, a load/unload matrix associated with each arithmetic logic unit, the method comprising: parsing sequential FHE logic gate code; transforming the FHE logic gate code into a set of code modules that each have in input and an output that is a function of the input and which do not pass control to other functions; creating a node wrapper around each code module; configuring at least one of the primary processing cores to implement the logic element equivalents of each element in a manner which operates in a streaming mode wherein data streams out of corresponding arithmetic logic units into the main memory and other ones of the plurality arithmetic logic units.

Another aspect of the disclosed implementations is a computer processor architecture for processing a Discrete Fourier Transform (DFT) of a finite-length sequence N, the computer processor architecture comprising: a plurality of primary processing cores defined by RISC processors, each primary processing core comprising a main memory, at least one cache memory, and a plurality of arithmetic logic units, each primary core having an associated node wrapper, the node wrapper including access memory associated with each arithmetic logic unit, a load/unload matrix associated with each arithmetic logic unit; wherein multiple stages of the DFT are constructed by, (a) applying a Decimation-in-Frequency algorithm to the DFT to decompose the DFT of a finite-length sequence N into two derived DFTs each of a length N/2, (b) constructing a logic element equivalent of each stage of the derived DFTs in which inputs and outputs are composed of real and imaginary components, (c) repeating (a) and (b) for each stage of the DFT except for the endpoint stages of the DFT, (d) for each endpoint stage of the DFT constructing a logic element equivalent of the corresponding stage of the derived DFTs in which inputs and outputs are composed of only real components; wherein at least one primary core of the computer processor architecture is configured to implement the logic element equivalents of each stage of the DFTs in a manner which operates in a streaming mode wherein data streams out of corresponding arithmetic logic units into the main memory and other ones of the plurality arithmetic logic units; and wherein the computer processor architecture is configured to couple the output of each stage on the DFT to the input of a subsequent stage.

Another aspect of the disclosed implementations is a computer processor architecture for executing a fully homomorphic encryption (FHE) logic gate as a streaming topology, the computer processor architecture comprising: a plurality of primary processing cores defined by RISC processors, each primary processing core comprising a main memory, at least one cache memory, and a plurality of arithmetic logic units, each primary core having an associated node wrapper, the node wrapper including access memory associated with each arithmetic logic unit, a load/unload matrix associated with each arithmetic logic unit; wherein the sequential FHE logic gate code has been transformed into a set of code modules that each have an input and an output that is a function of the input and which do not pass control to other functions, a node wrapper has been created around each code module; and wherein at least one of the primary processing cores has been configured architecture to implement the logic element equivalents of each element in a manner which operates in a streaming mode wherein data streams out of corresponding arithmetic logic units into the main memory and other ones of the plurality arithmetic logic units.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The inventors have developed an architecture and methodology that allows processor cores, such as known RISC processors to be leveraged for increased computing power. The processor cores, referred to as "primary cores" herein, are segregated into control logic and simple processing elements, such as arithmetic logic units. A node wrapper allows the architecture to be configurable into a streaming mode ("fractured mode") in which pipelines are defined and data is streamed directly to the execution units/processing elements as "secondary cores". Applicant refers to secondary cores using the tradename "Fractal Cores™." In a streaming mode, the processor control logic need not be used. The secondary cores are addressed individually and there is reduced need for data to be stored in temporary storage as the data is streamed from point to point in the pipelines. The architecture is extensible across chips, boards and racks.

Figure 1:
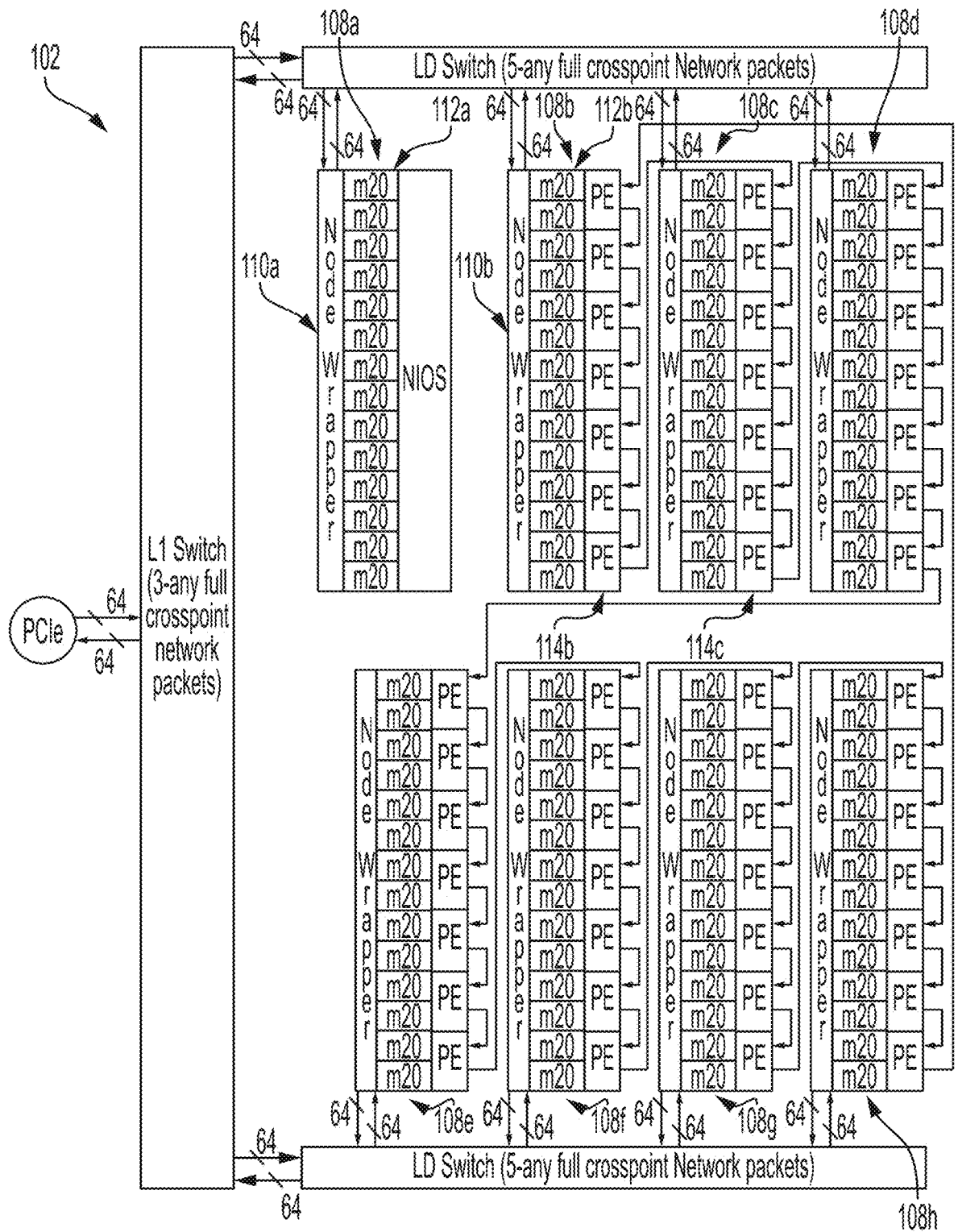
FIG. 1 is a schematic illustration of a processor architecture in accordance with one or more implementations.

FIG. 1 illustrates an example of a computing architecture. As illustrated in FIG. 1, architecture 102 includes multiple primary processing cores 108a, 108b . . . 108n. Each main processing core 108 can include a corresponding node wrapper 110a, 110b . . . 110n (only some of which are labeled 110 in FIG. 1. for clarity) as described in greater detail below. Each primary processing core 108 may be defined by a RISC processor, such as the Altera NIOS™ processor. By way of non-limiting example, each primary processing core 108 may include a corresponding main memory 112a, 112b . . . 112n (only some of which are labeled FIG. 1. for clarity) that includes multiple cache memories. The node wrappers 110 can include access memory associated with each secondary core, and a load/unload matrix associated with each secondary core. Each primary processing core 108 can also include a set of processing units 114a, 114b . . . 114n, such as arithmetic logic units (ALUs), which separately or collectively can define a secondary processing core as described in detail below.

A "wrapper" is generally known as hardware or software that contains ("wraps around") other hardware, data or software, so that the contained elements can exist in a newer system. The wrapper provides a new interface to an existing element. In embodiments, the node wrappers provide a configurable interface that can be configured to allow execution in a conventional control-centric mode or in a streaming mode, or fractured mode, that is described below.

In a conventional control-centric mode ("RISC mode"), the architecture uses the core control logic to control data flow and operates in a manner wherein data is read from and written to the cache memory and processed by a primary core in accordance with control logic. However, secondary cores 114 may be selectively "fractured" to operate in a fractured mode, as part of a pipeline, wherein data streams out of the corresponding secondary core into the main memory and other ones of the plurality of secondary cores and data streams from the main memory and other secondary cores to stream into the corresponding core, as described in greater detail below. As an example, a rectangular partition can be created from a result matrix y using single precision floating point arithmetic.

The node wrappers 110 may be configured to partition logic and an input state machine for transferring data from memory to the processing element and wherein each arithmetic logic unit has an output that is associated with an output memory. The output memory may be updated throughout processing with the latest sum as it is computed. Arithmetic logic units 114 of the RISC processor can be used as streaming secondary cores in the streaming mode. Each node wrapper 110 can be configured to define multiple hardware streams, i.e. pipelines, to be allocated to specific ones of the cores.

Figure 2A:
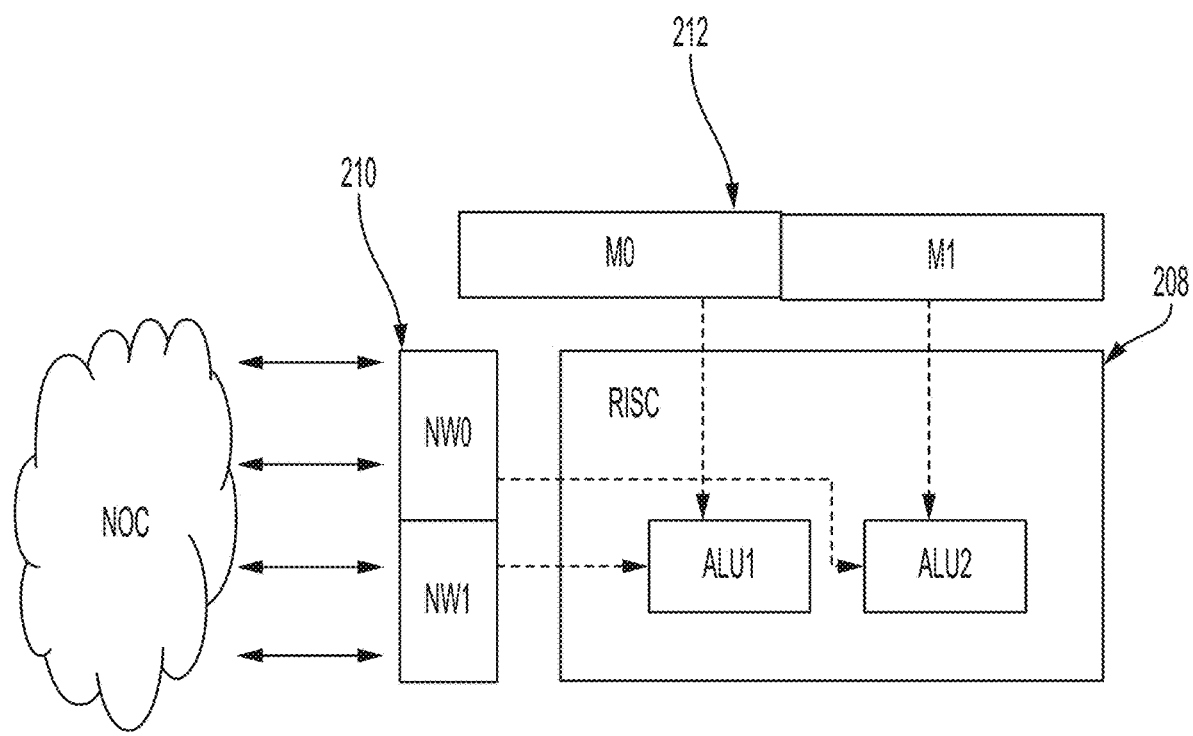
FIG. 2a is a schematic illustration of a single RISC processor and related hardware showing the data streams of both control mode and streaming mode.
Figures 1, 31A:
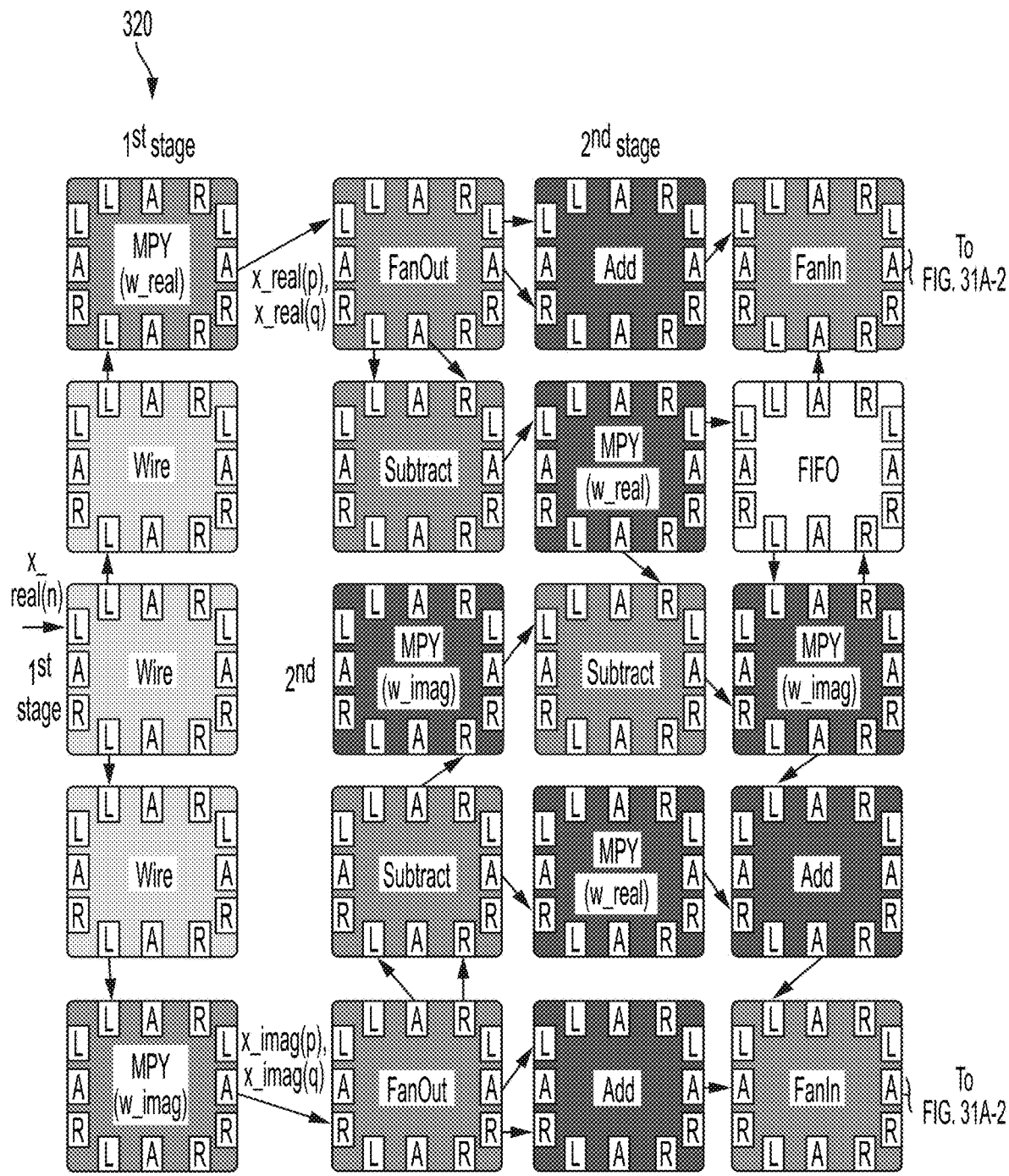
FIGS. 31a-31d illustrate the entire FFT mapped to cores in accordance with one or more implementations.
Figures 2, 31A:
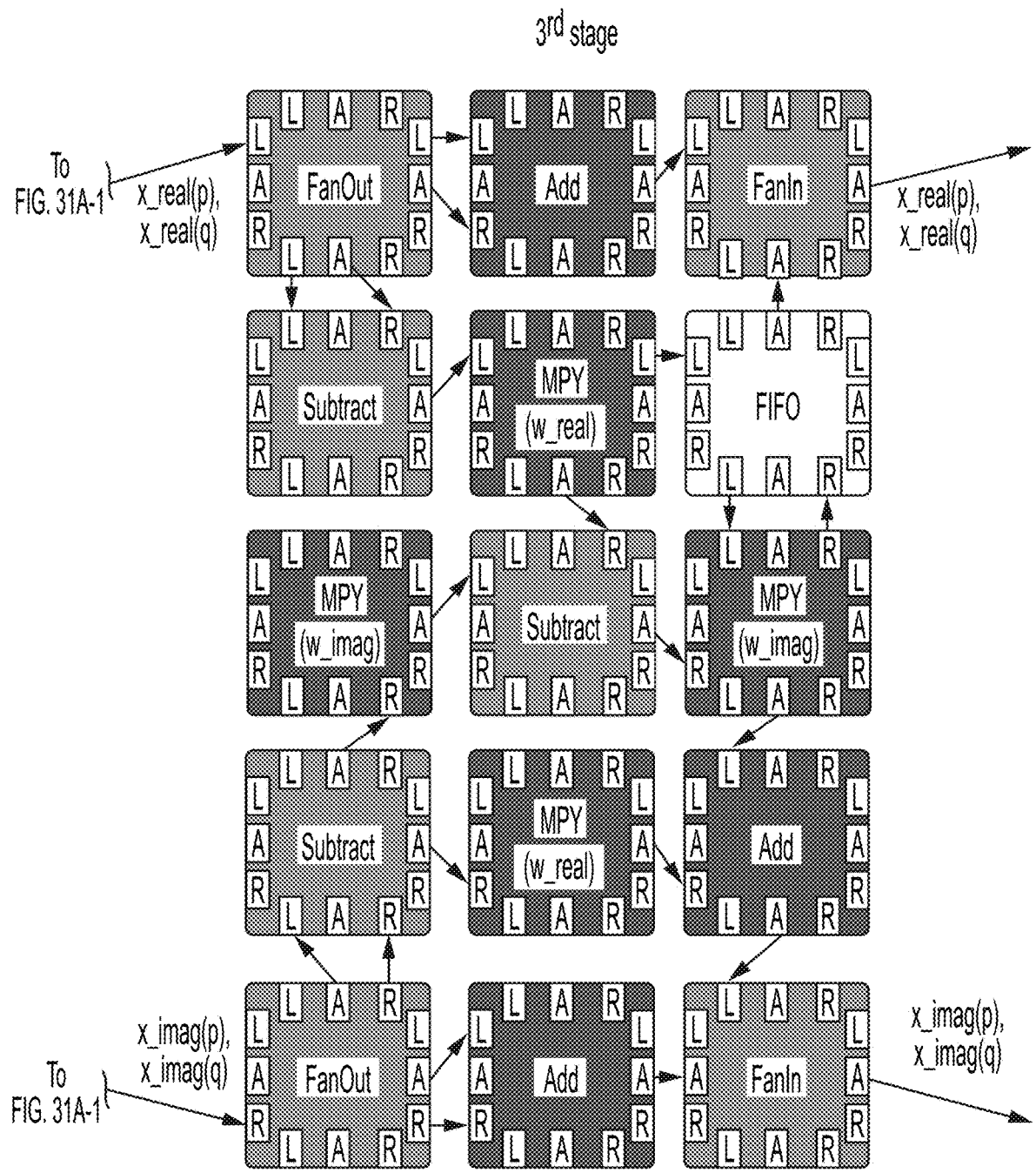
Figures 1, 31B:
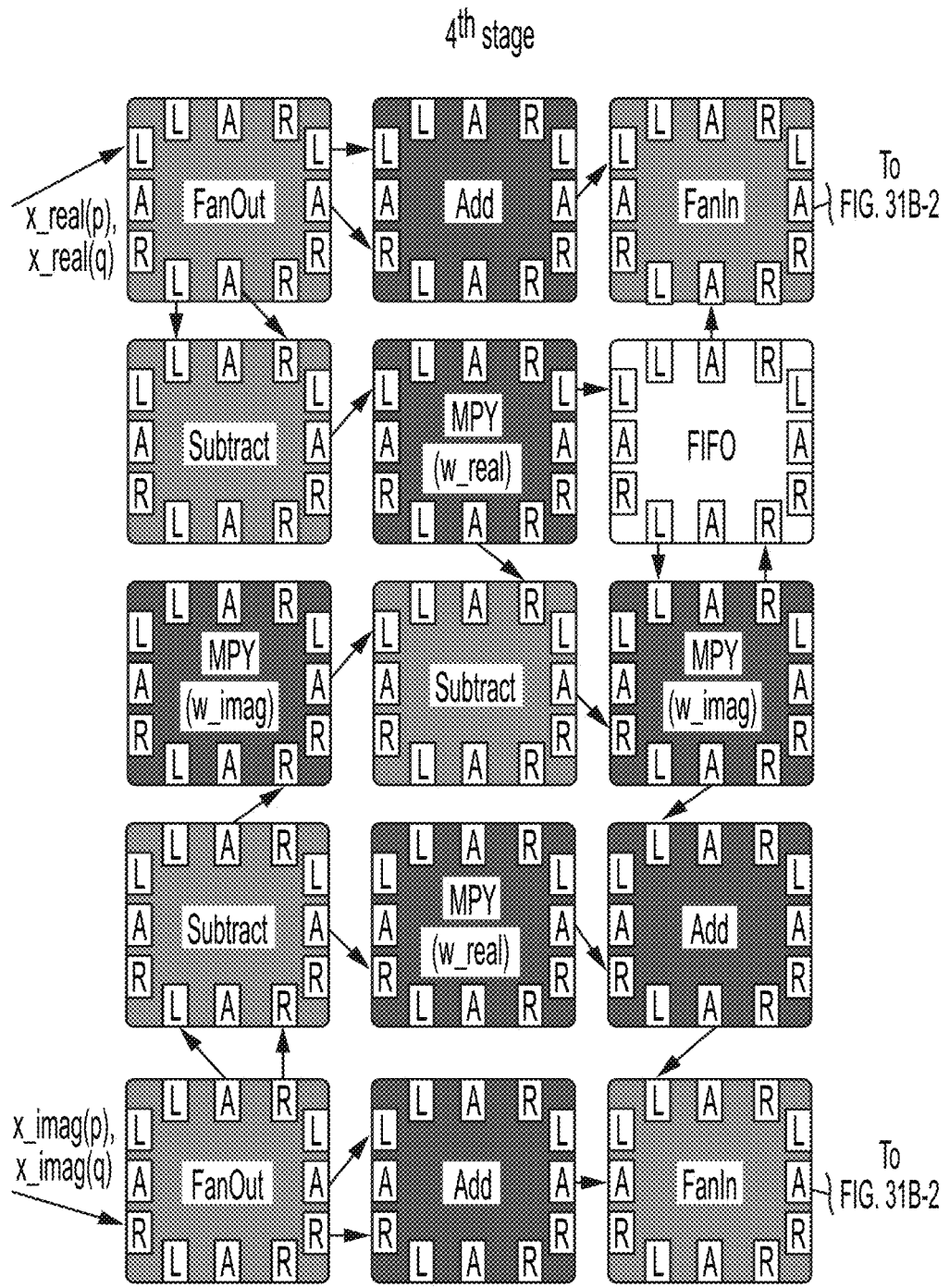
Figures 2, 31B:
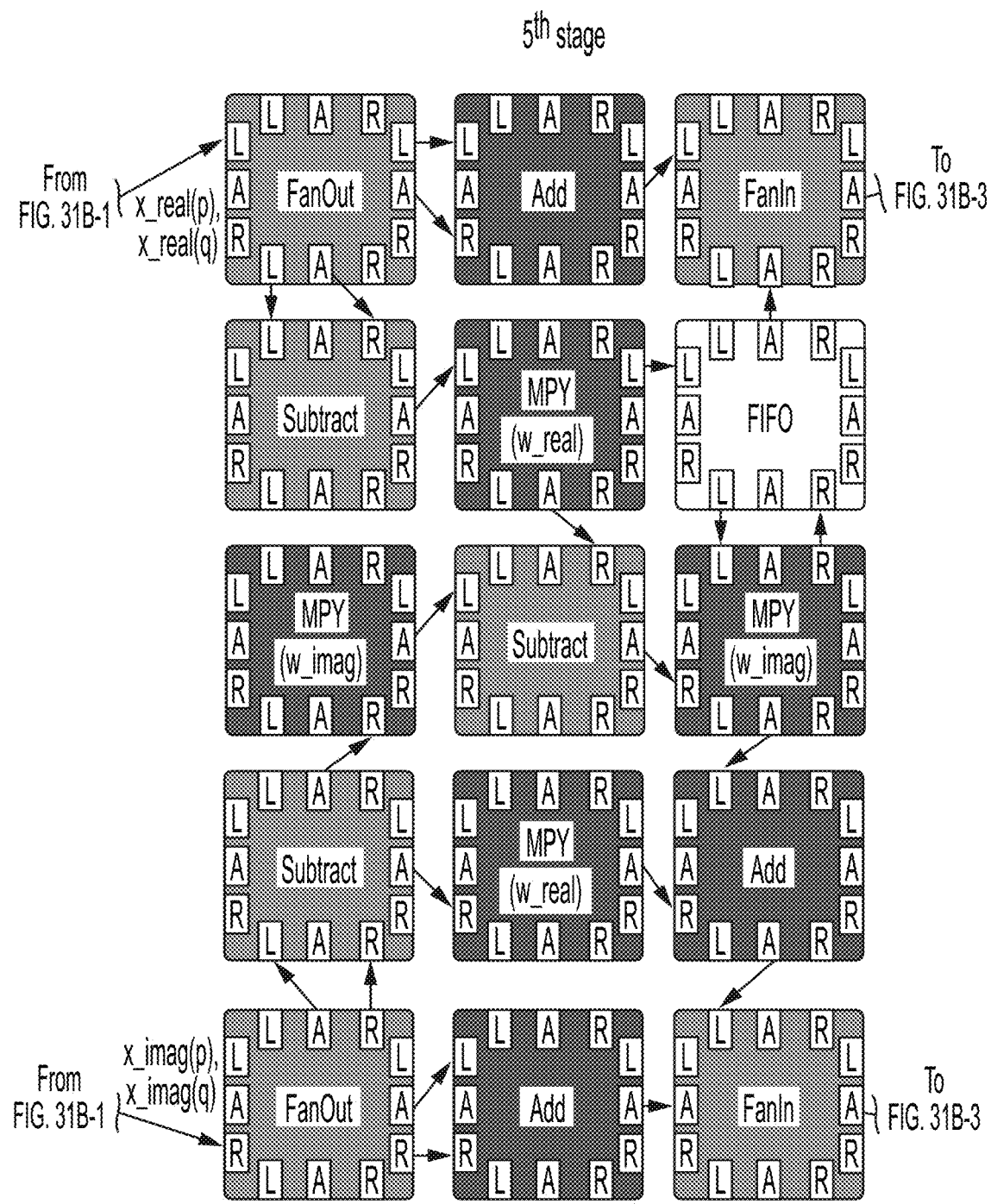
Figures 3, 31B:
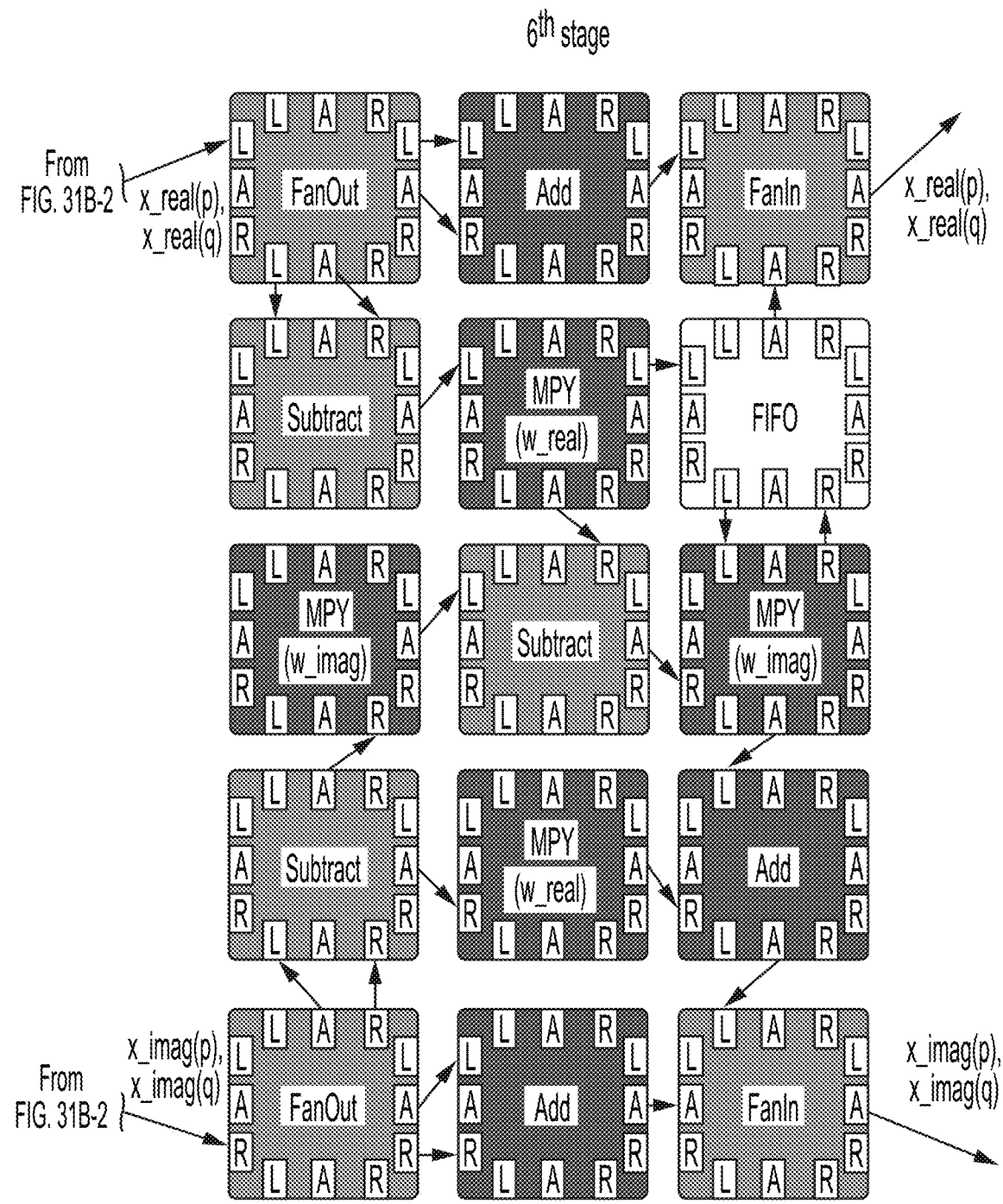
Figures 1, 31C:
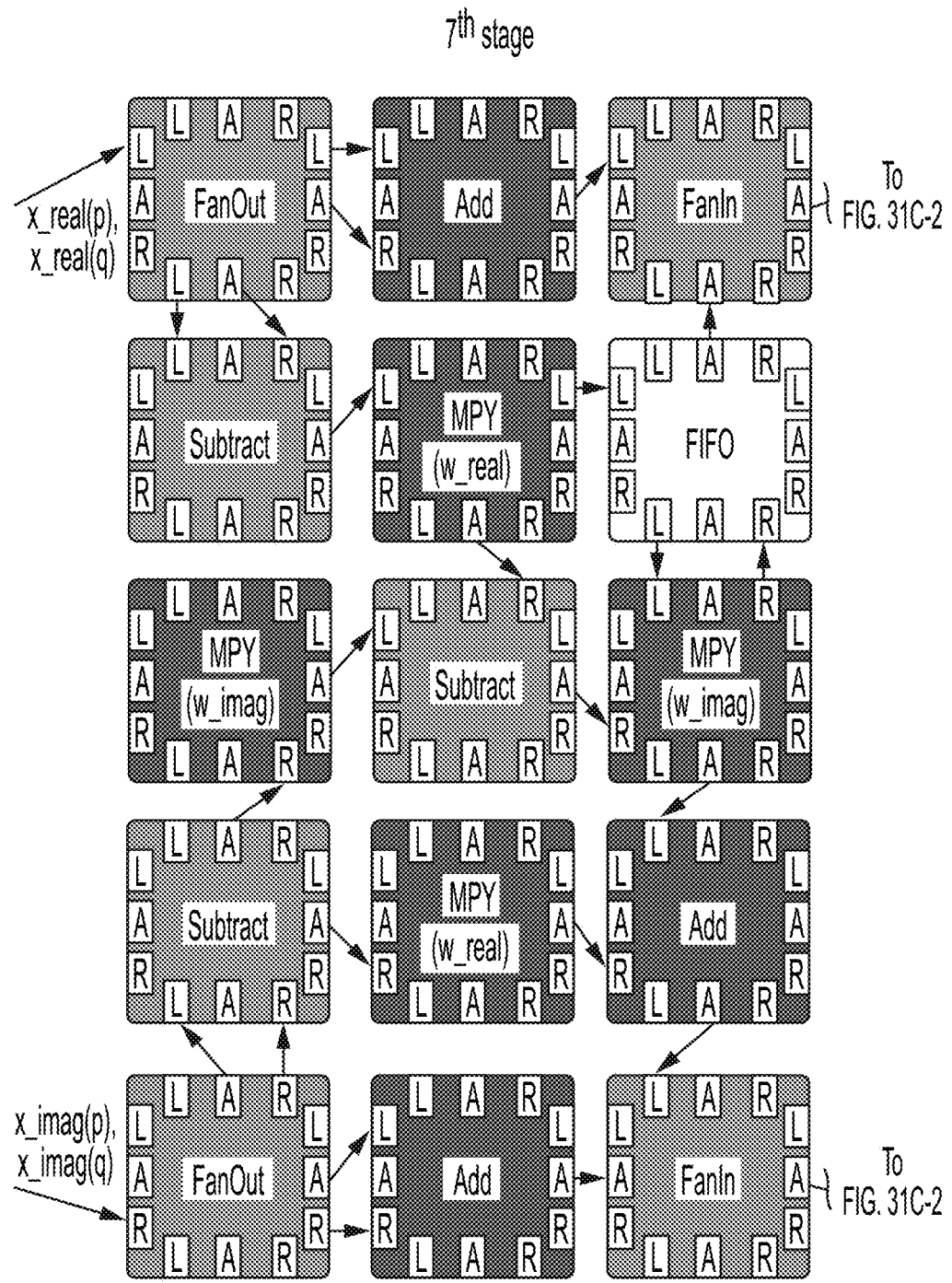
Figures 2, 31C:
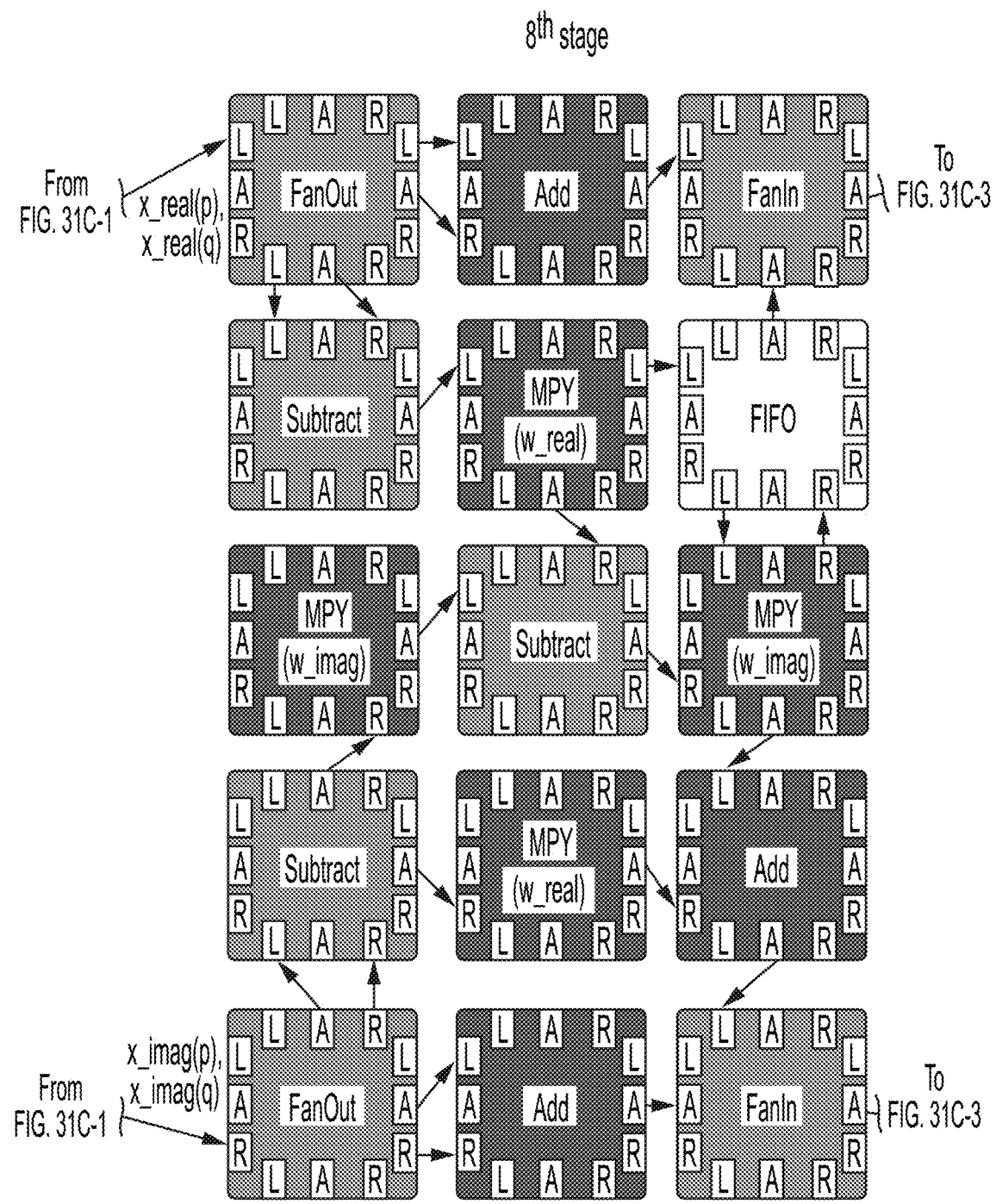
Figures 3, 31C:
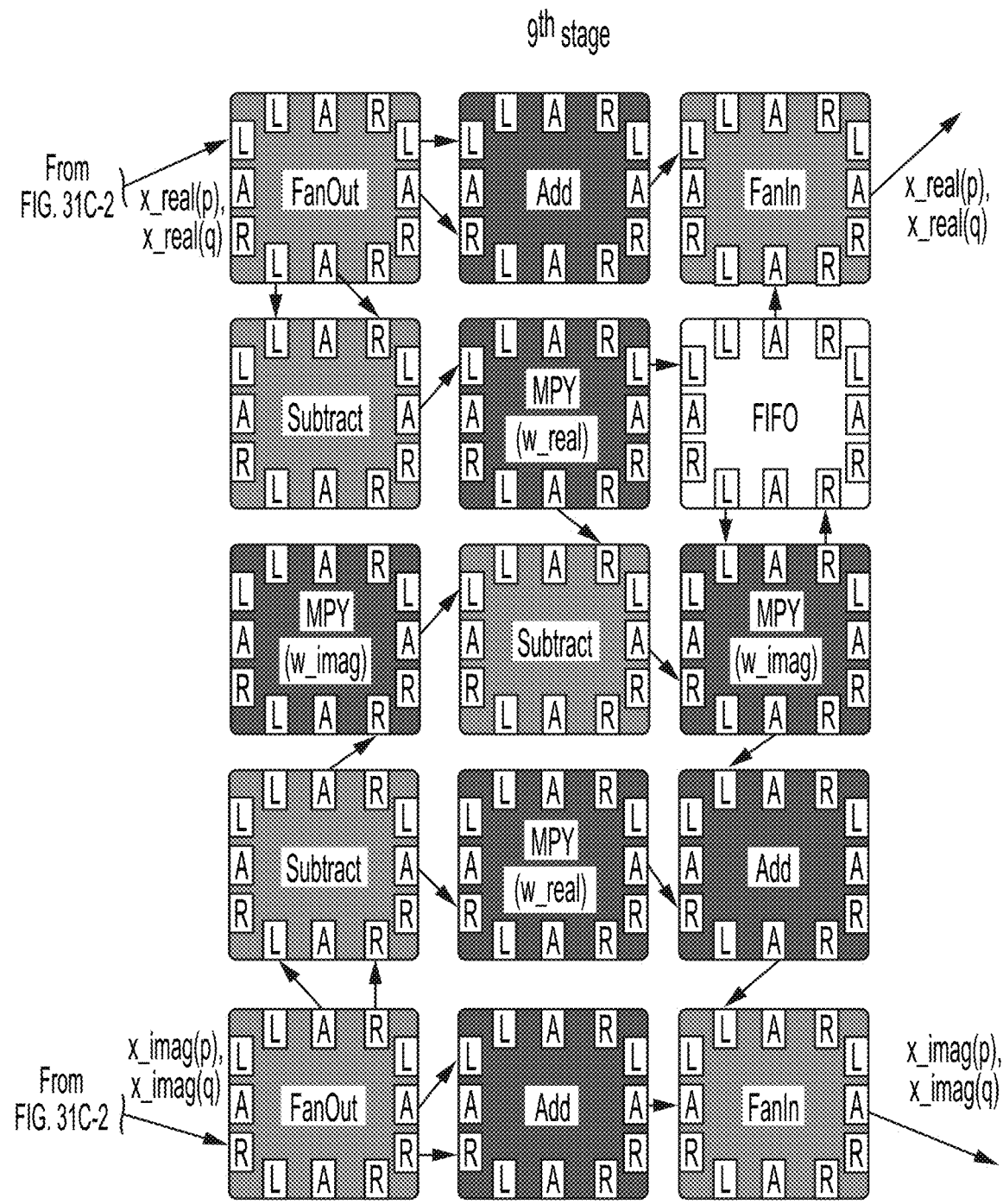
Figures 1, 31D:
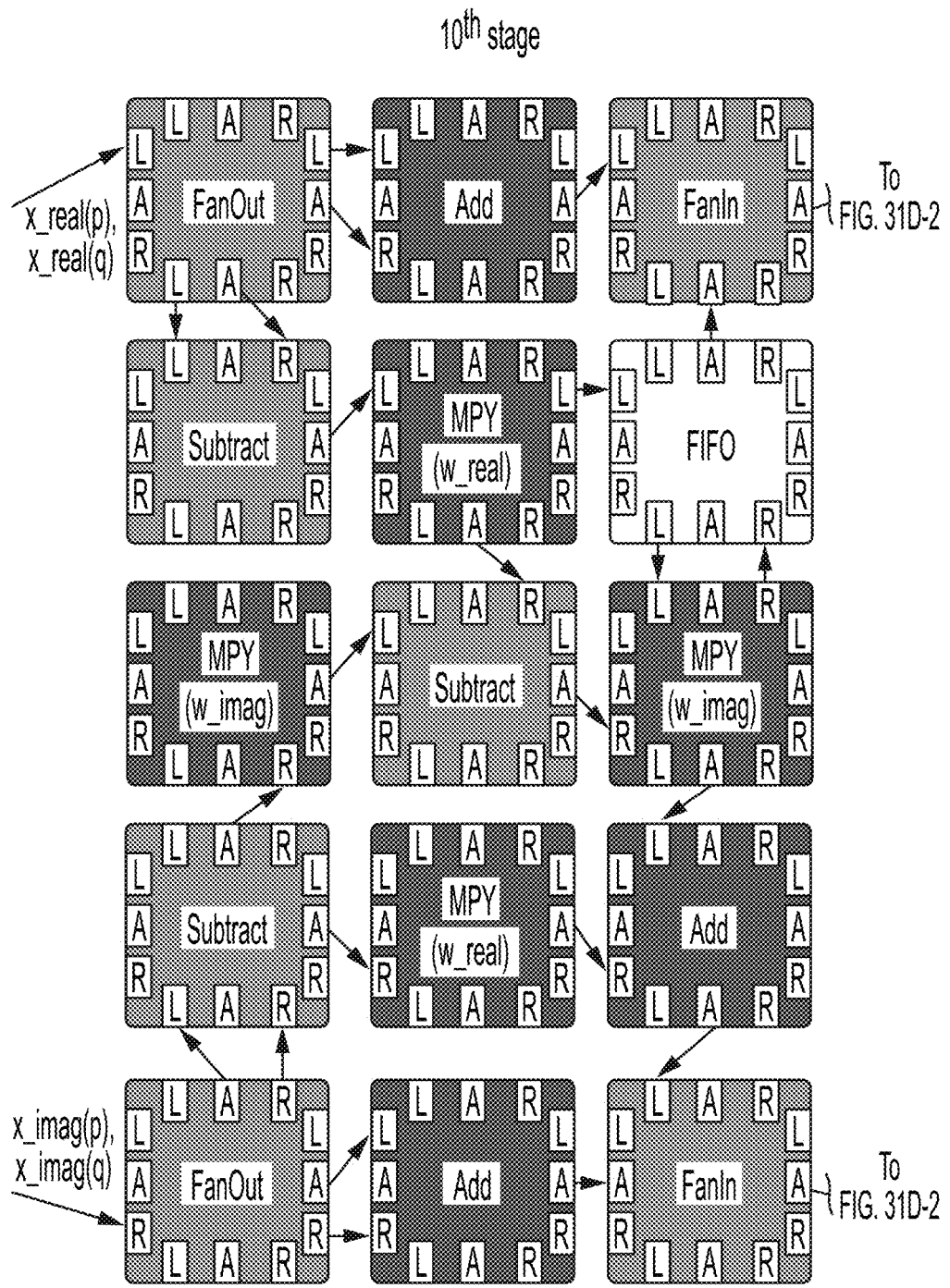
Figures 2, 31D:
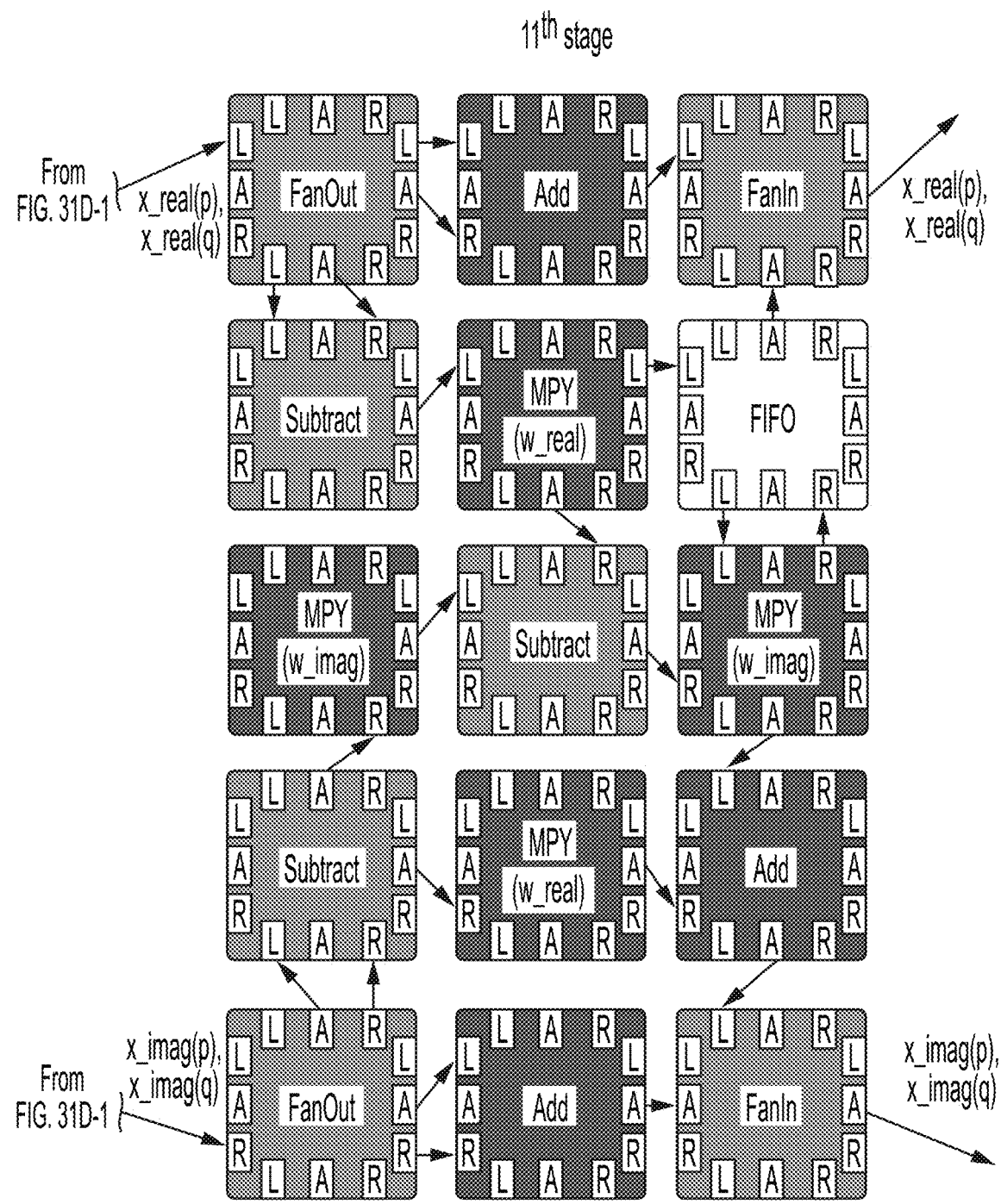
Figures 1, 32A:
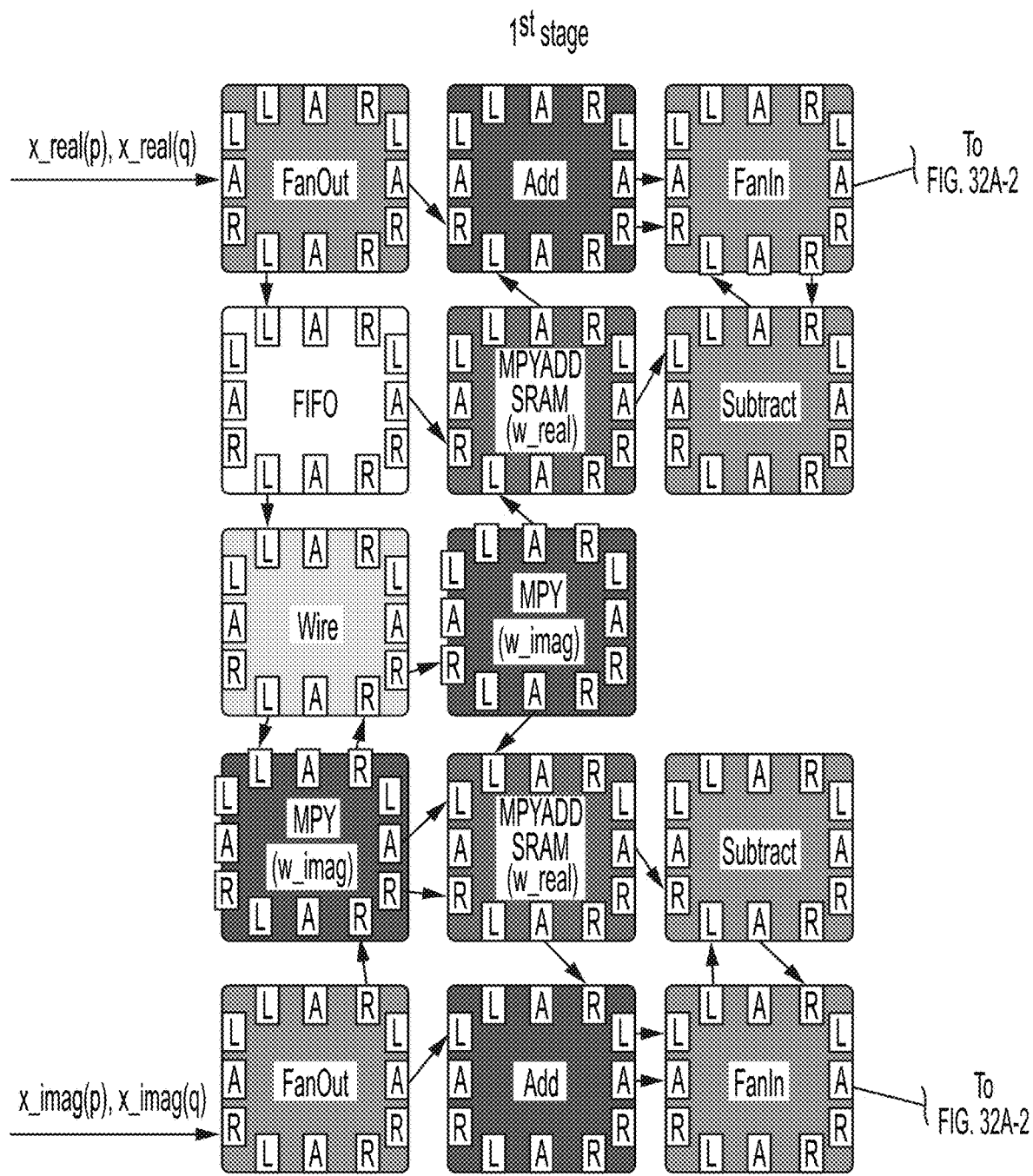
FIGS. 32a-32d illustrate the entire IFFT mapped to cores in accordance with one or more implementations.
Figures 2, 32A:
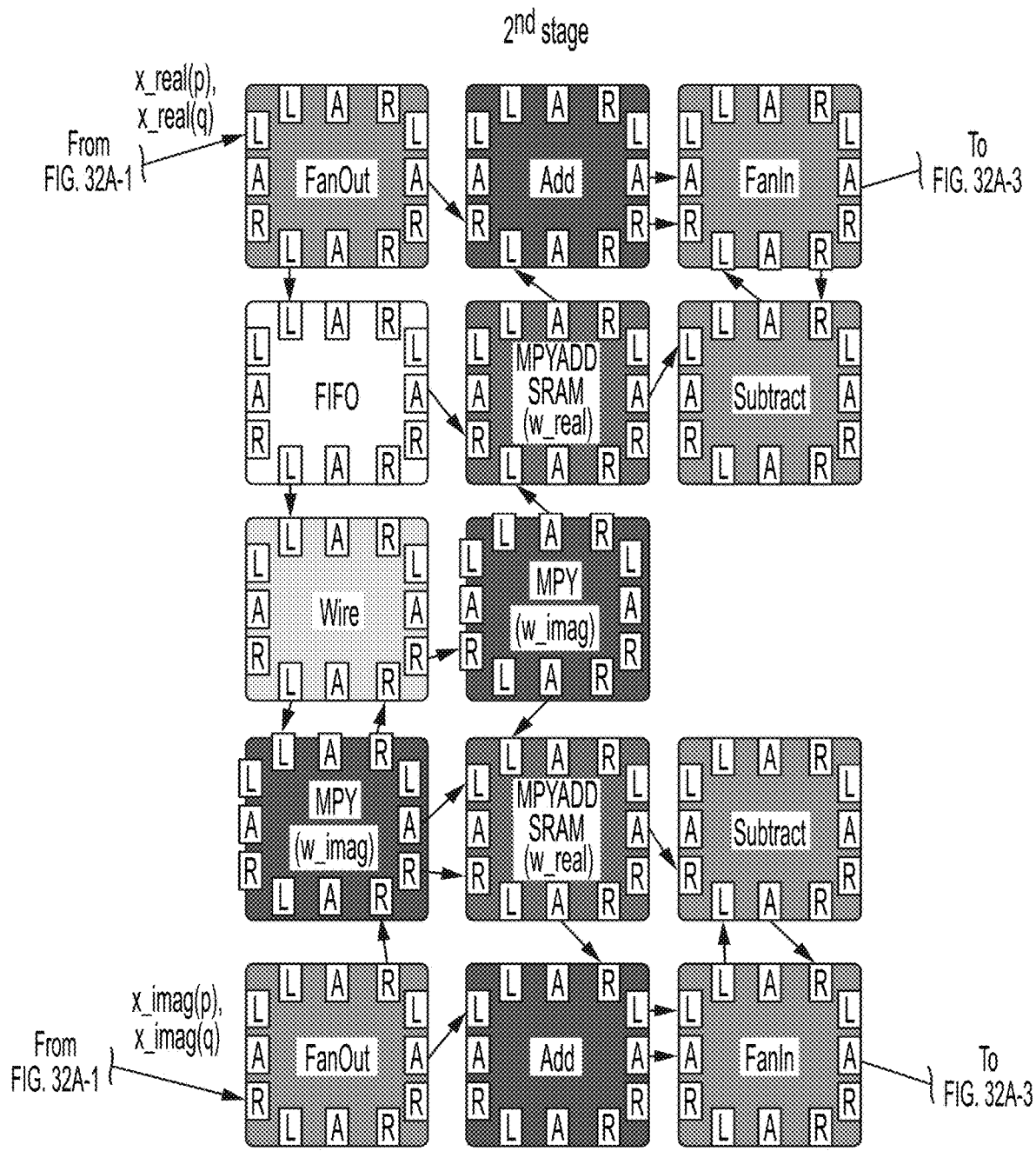
Figures 3, 32A:
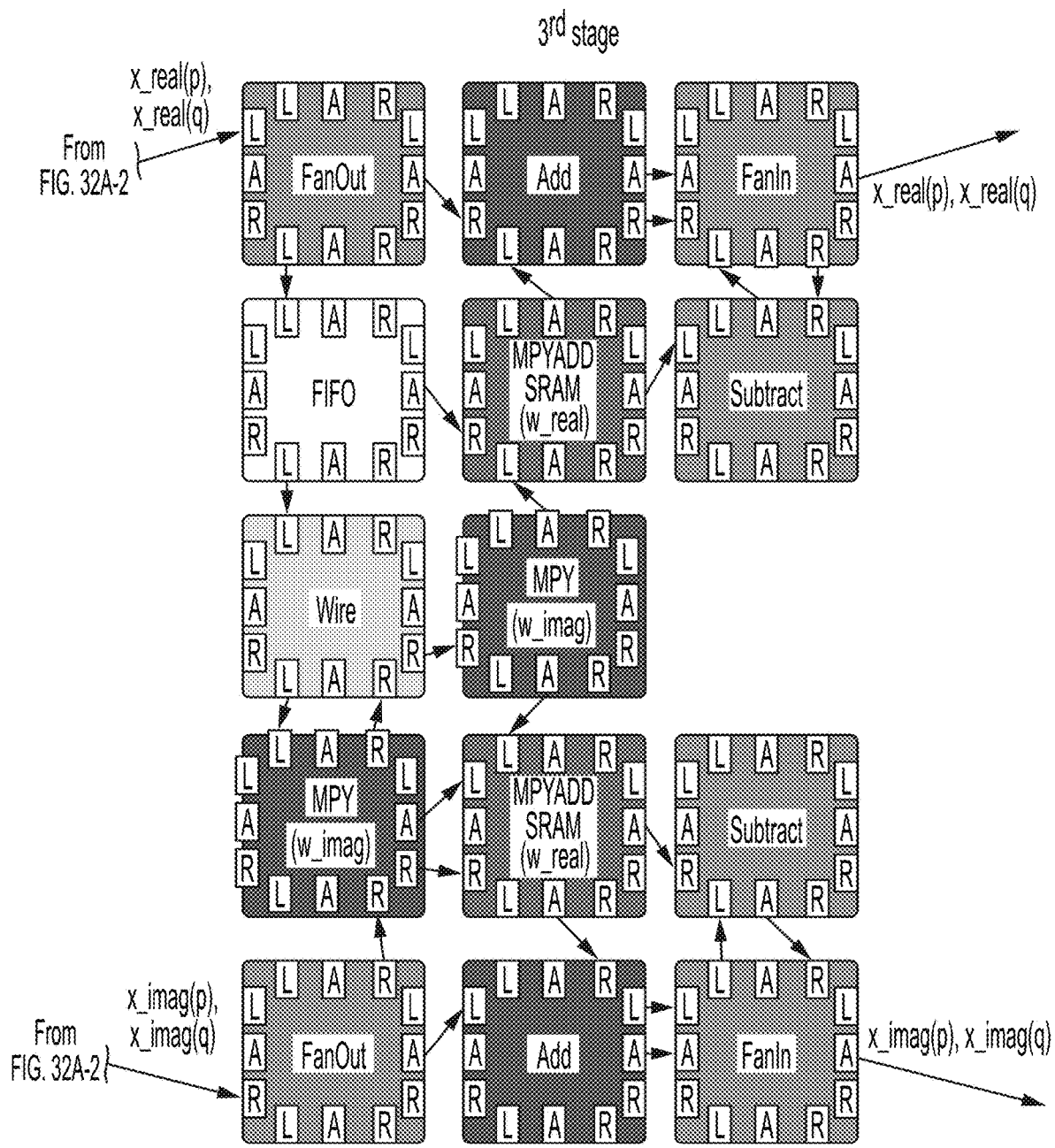
Figures 1, 32B:
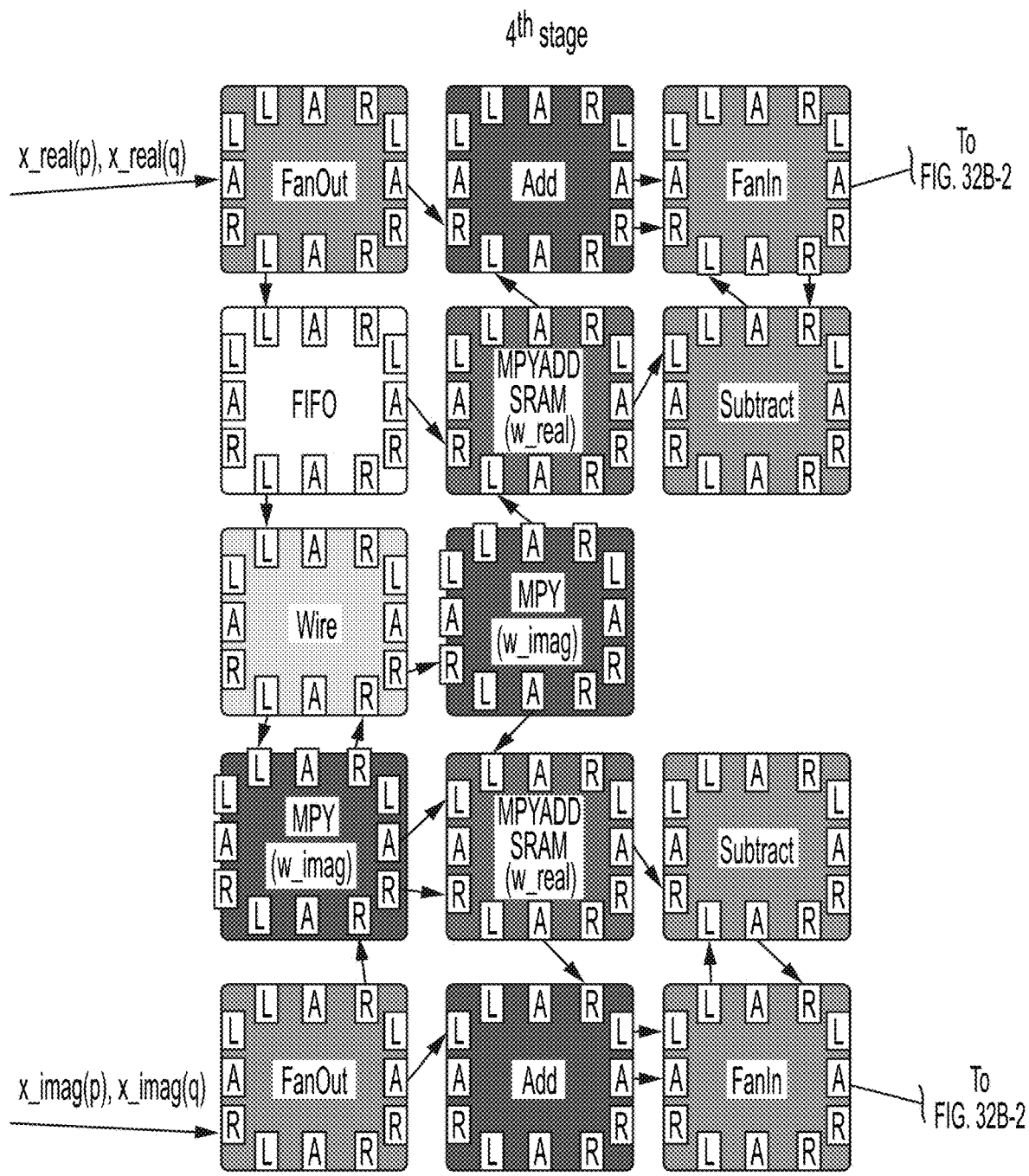
Figures 2, 32B:
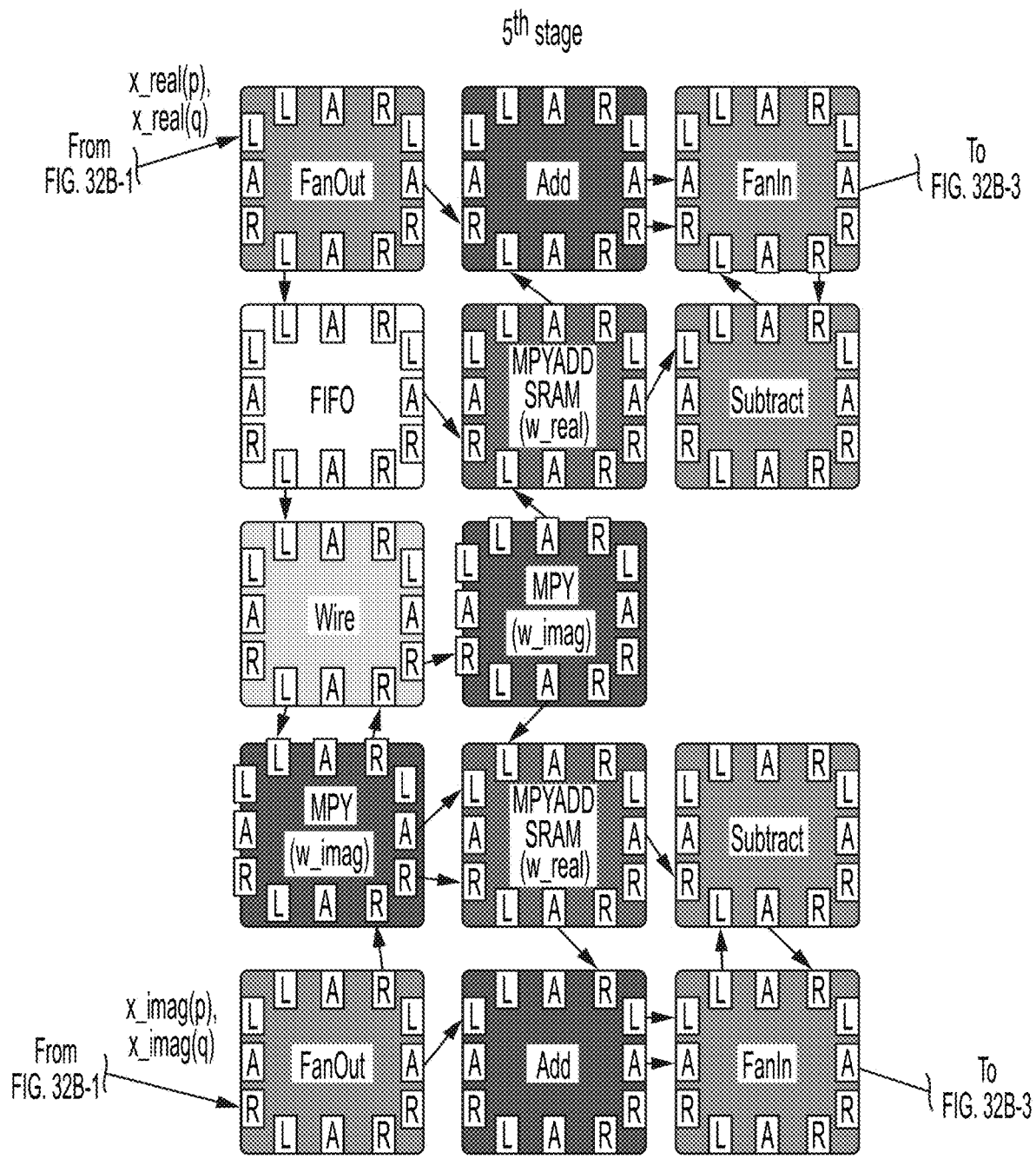
Figures 3, 32B:
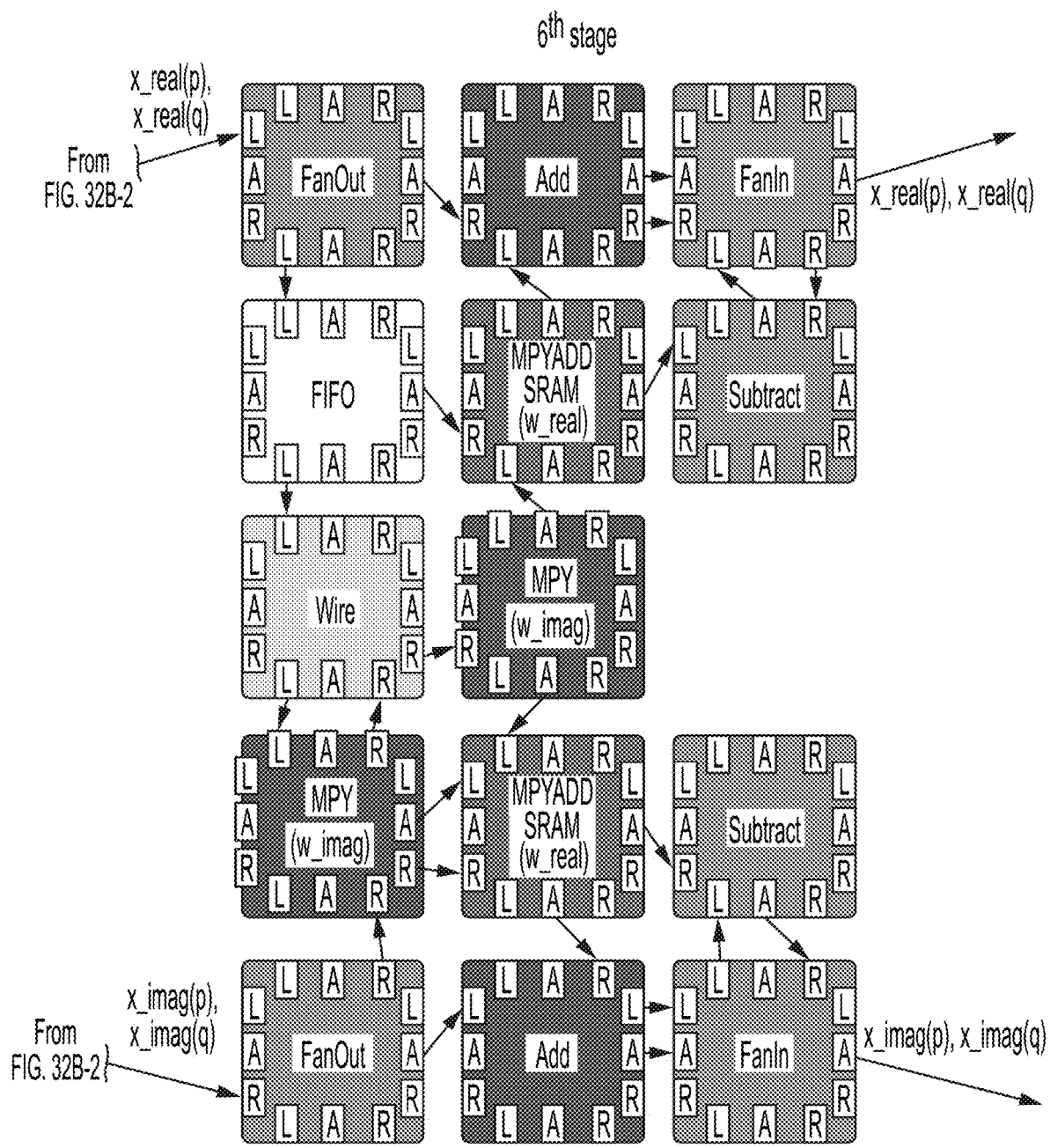
Figures 1, 32C:
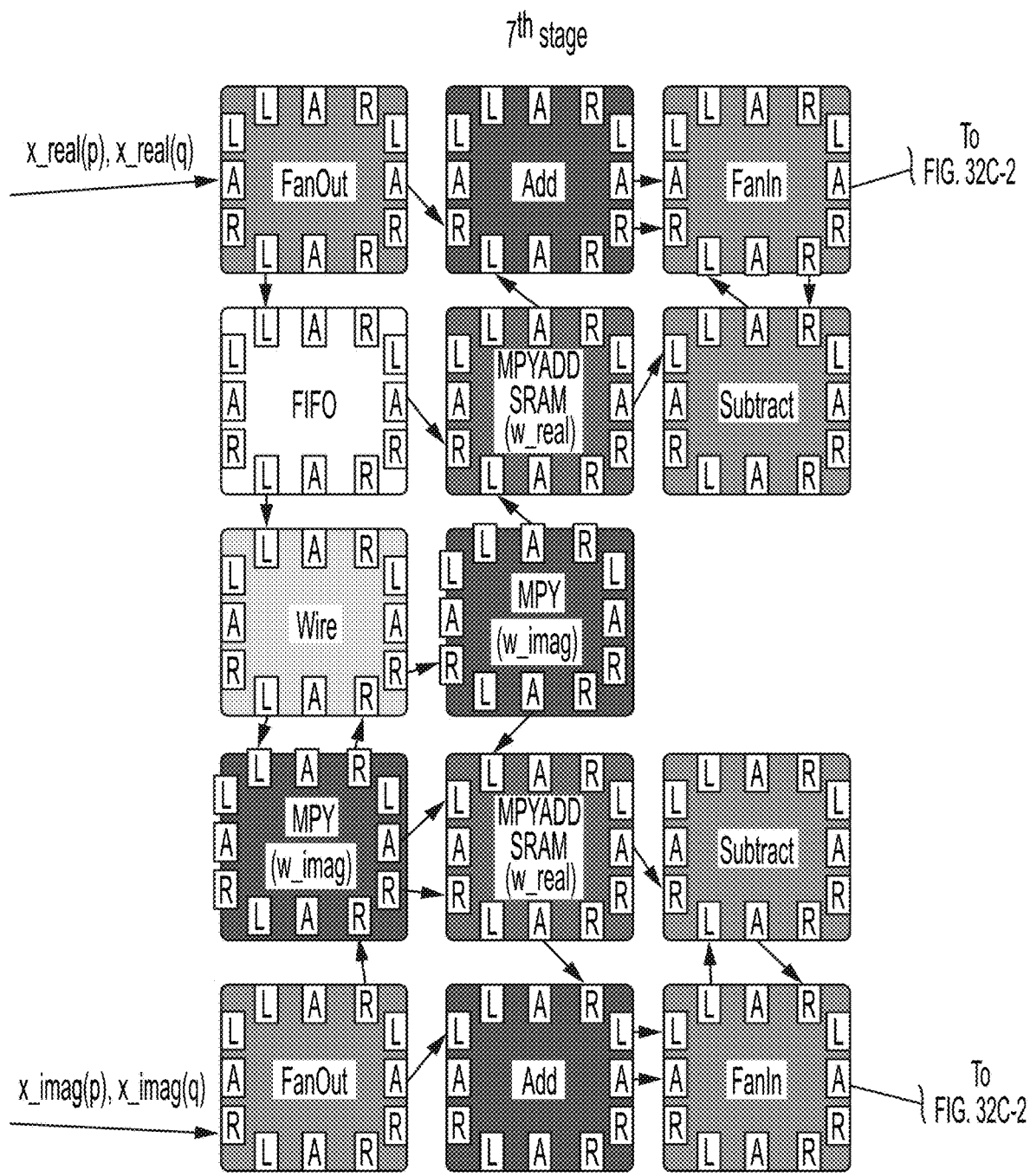
Figures 2, 32C:
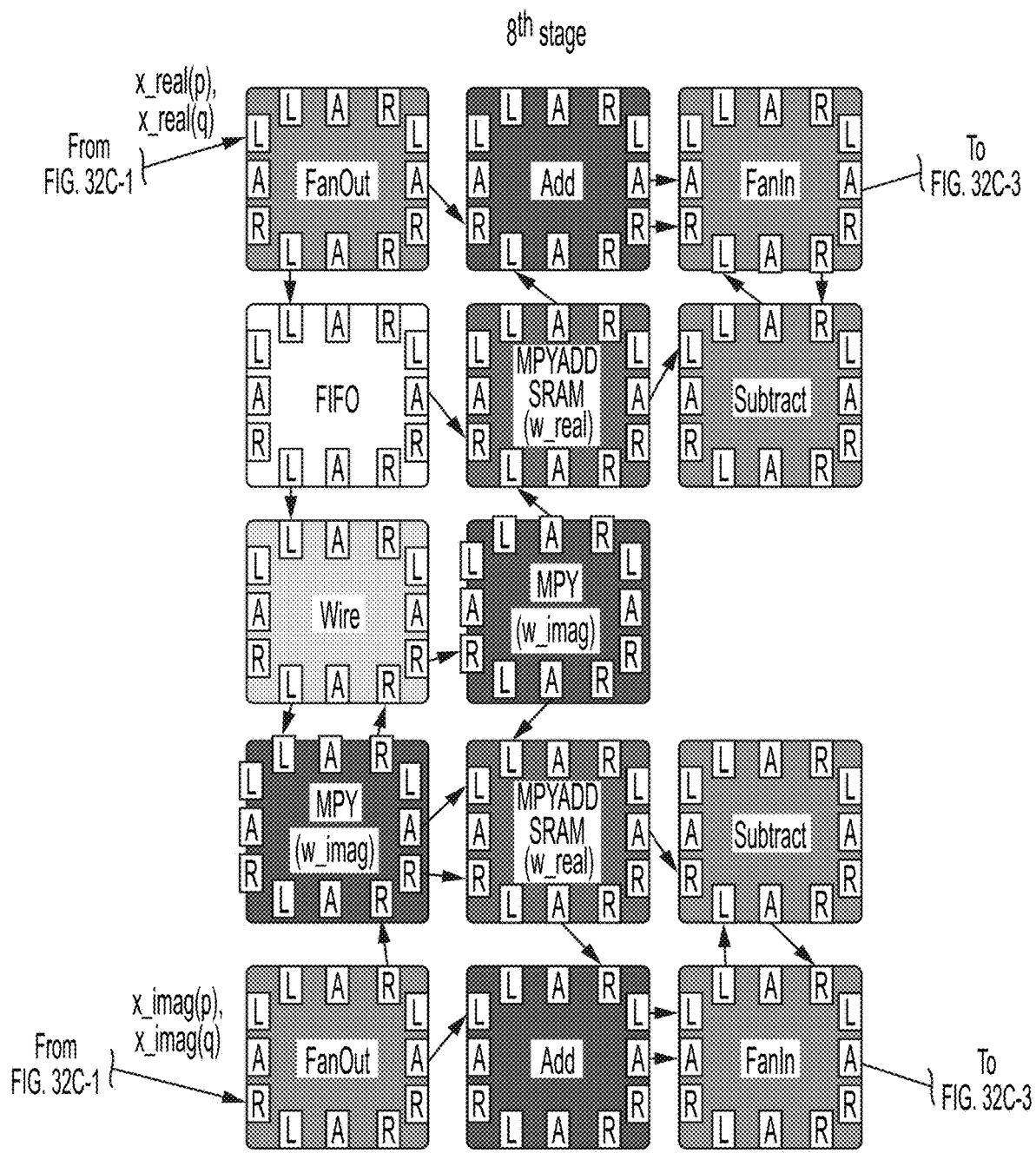
Figures 3, 32C:
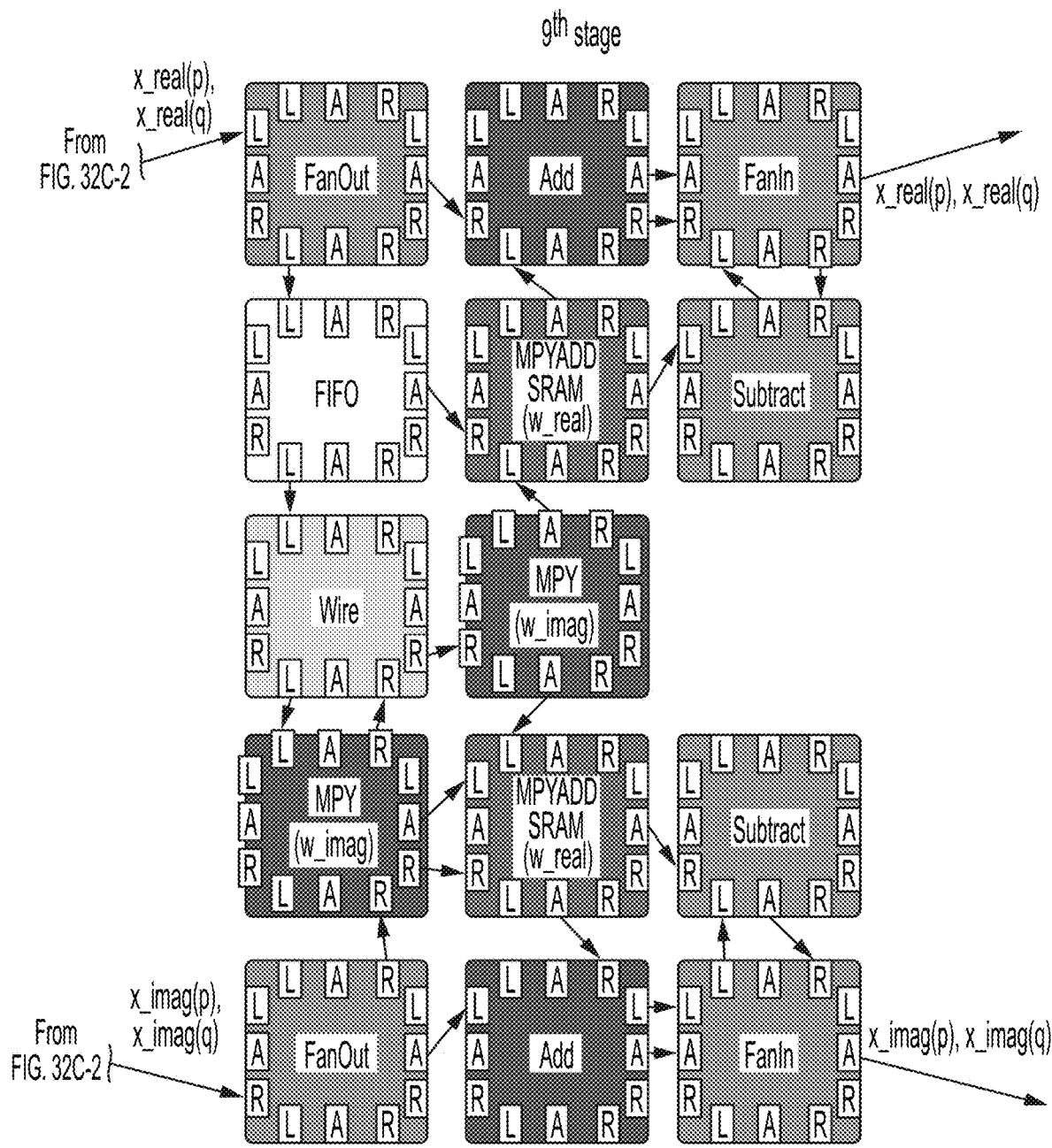
Figures 1, 32D:
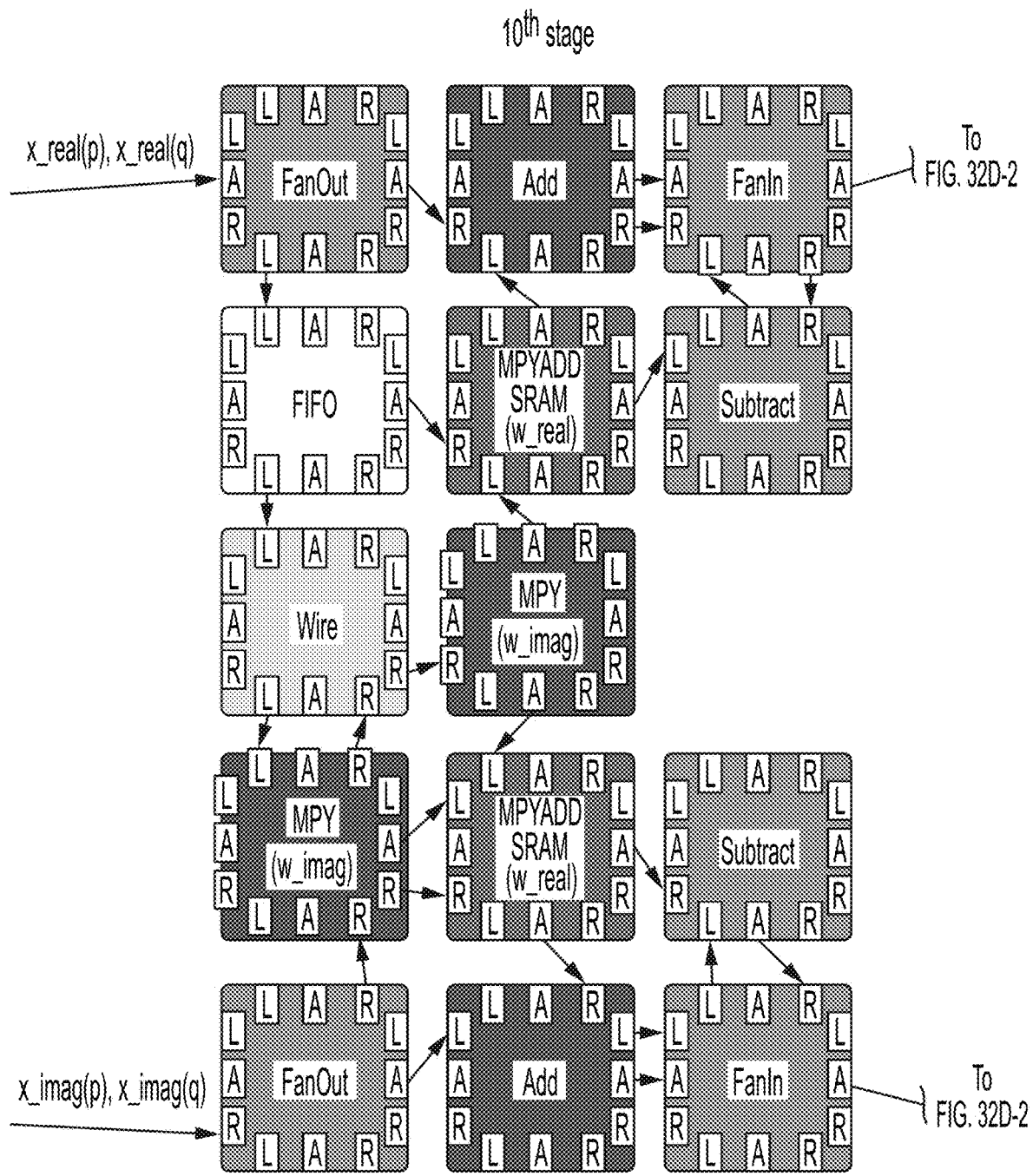
Figures 2, 32D:
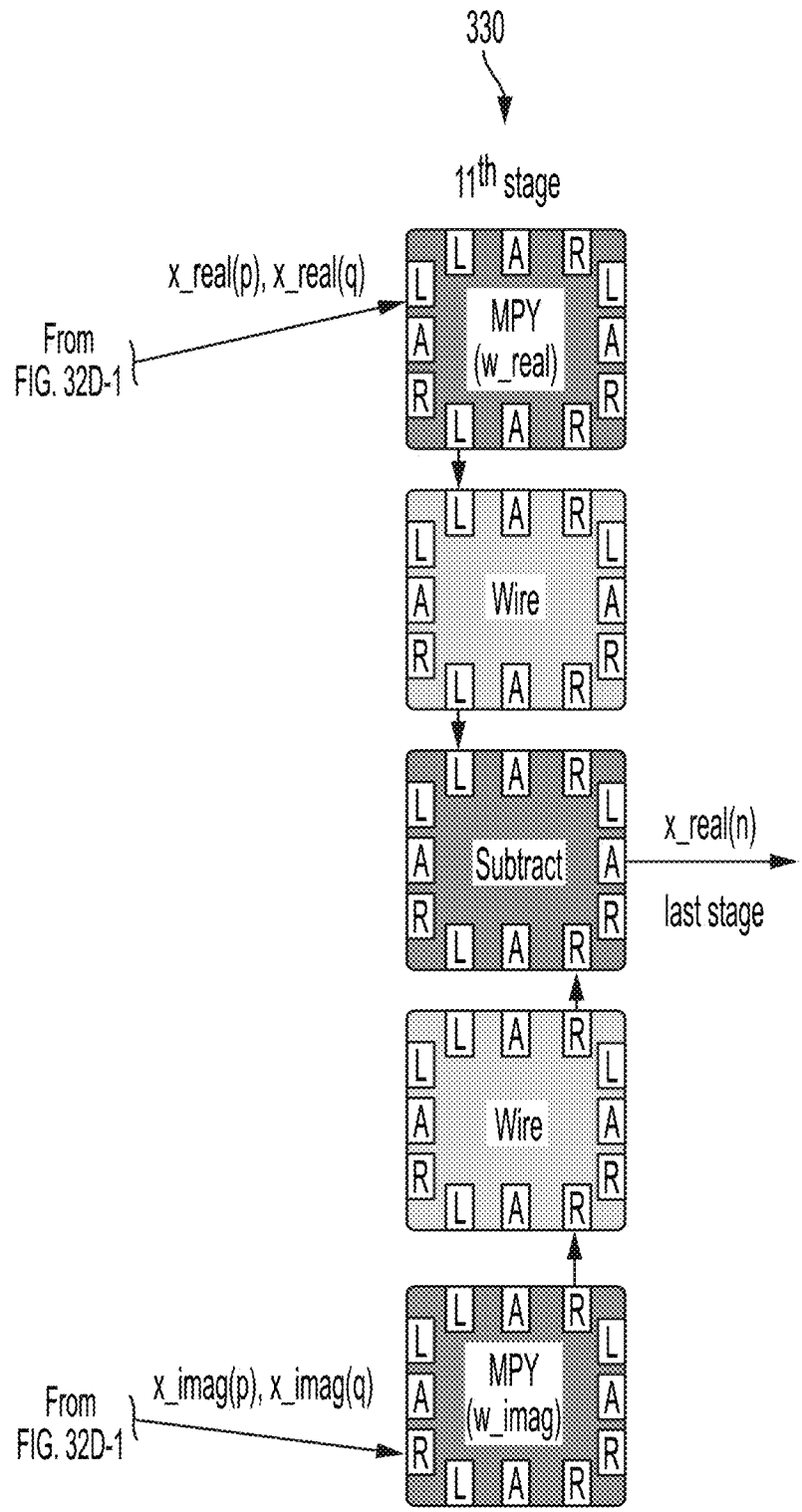

FIG. 2a illustrates the two possible modes of operation, RISC mode and fractured mode, of the architecture. As illustrated in FIG. 2, RISC Processor 208 includes two processing elements, ALU1 and ALU2. Node Wrapper 210 includes two secondary node wrappers NW0 and NW1. Memory 212 includes secondary memories M0 and M1. In the RISC mode, the data streams indicated by the solid lines stream from a Network on a Chip (NOC), such as a PCIe bus, to memory 112 for processing by RISC processor 208. In the fractured mode, the streams are indicated by the dashed lines. In the fractured mode, node wrapper 210 is used as secondary node wrappers NW0 and NW1 and memory 212 is used as secondary memories M0 and M1 to define two data streams in this example. One data stream passed through ALU1 and one passed through ALU2 with ALU1 and ALU2 each defining a secondary core. Of course, the RISC processor can have any number of processing elements and data streams can be configured as needed. Note that, in this example, the RISC mode includes 4 data streams and a relatively large memory, while in the Fractured mode includes 2 data streams and a relatively small memory.

Figure 2B:
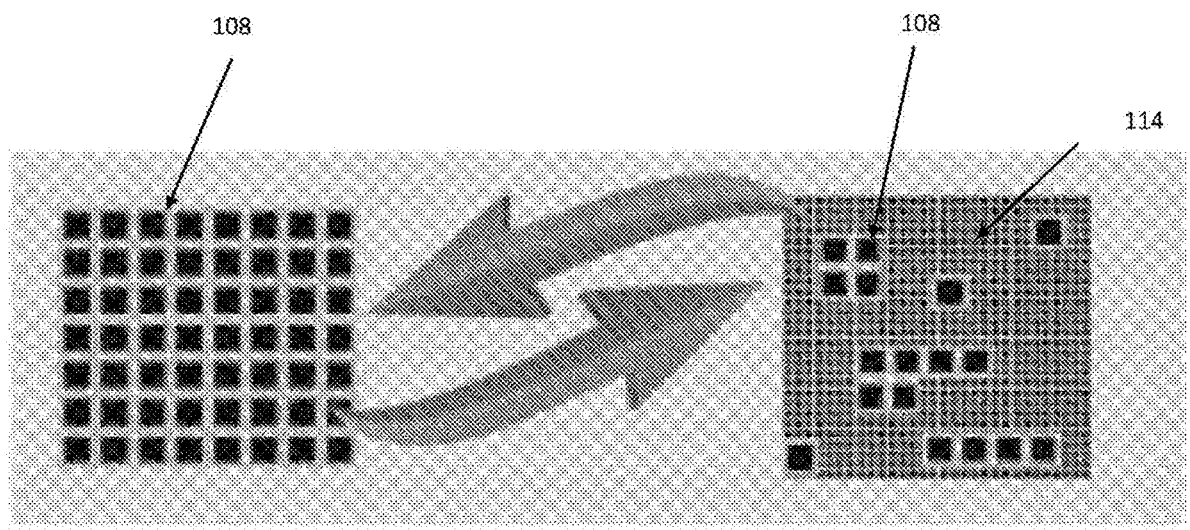
FIG. 2b is a schematic illustration of a processor architecture showing that the core modes can be dynamically and flexibly configured.

As illustrated schematically in FIG. 2b, some cores of the architecture can be configured to operate in the RISC mode while some are configured to operate in the fractured mode, as needed by any specific application at any specific time. Further, core modes can be configured dynamically, in real-time, during execution. On the left in FIG. 2b, all cores are configured as primary cores (RISC mode). On the right in FIG. 2b some cores are configured as primary cores and some cores are configured as secondary cores (fractured mode). The configuration can take any form as required by the specific application at the specific time. Some examples include:

112 RISC cores/1,480 Fractured Core (FC) cores: 896 RISC cores/12K FC cores per 1U server, 36K RISC cores/474K FC cores per Rack 480 RISC cores/7,420 FC cores: 4K RISC cores/60K FC cores per 1U server, 154K RISC cores/2.4M FC cores per Rack 8196 RISC cores/131,136 FC cores: 66K RISC cores/1M FC cores per 1U server 2.6M RISC cores/42M FC cores per Rack Referring to FIG. 1, the various interconnections are configured by the node wrappers using a Network On Chip (NOC). In this example, the NOC is a 2-layer NOC of L0 switches interconnected to a L1 switch via 64 bit lanes. The NOC also has an overlay network that interconnects all the secondary cores in a linear manner, as shown by the red arrows in FIG. 1. In this example, the switches are "crosspoint" switches, i.e. a collection of switches arranged in a matrix configuration. Each switch can have multiple input and output lines that form a crossed pattern of interconnecting lines between which a connection may be established by closing a switch located at each intersection, the elements of the matrix. In this example, a PCI Express (PCIe) buss interface is used. PCIe provides a switched architecture of channels that can be combined in ×2, ×4, ×8, ×16 and ×32 configurations, creating a parallel interface of independently controlled "lanes."

In some implementations, the architecture may be formed on a single chip. Each cache memory may be a nodal memory including multiple small memories. In some implementations, each core may have multiple arithmetic logic units. In some implementations, by way of non-limiting example, the arithmetic logic units may include at least one of integer multipliers, integer multiplier accumulators, integer dividers, floating point multipliers, floating point multiplier accumulators, floating point dividers. In some implementations, the arithmetic logic units may be single instruction multiple data units. As a simple example, an architecture can be made up of 500 primary processor cores 108 each having 16 processing elements. In the streaming mode, up to 8000 secondary cores 114 can be addressed individually. This allows for performance of massive mathematical operations, as is needed in Artificial Intelligence applications. The primary cores and secondary cores can be dynamically mixed to implement new algorithms.

Figure 3:
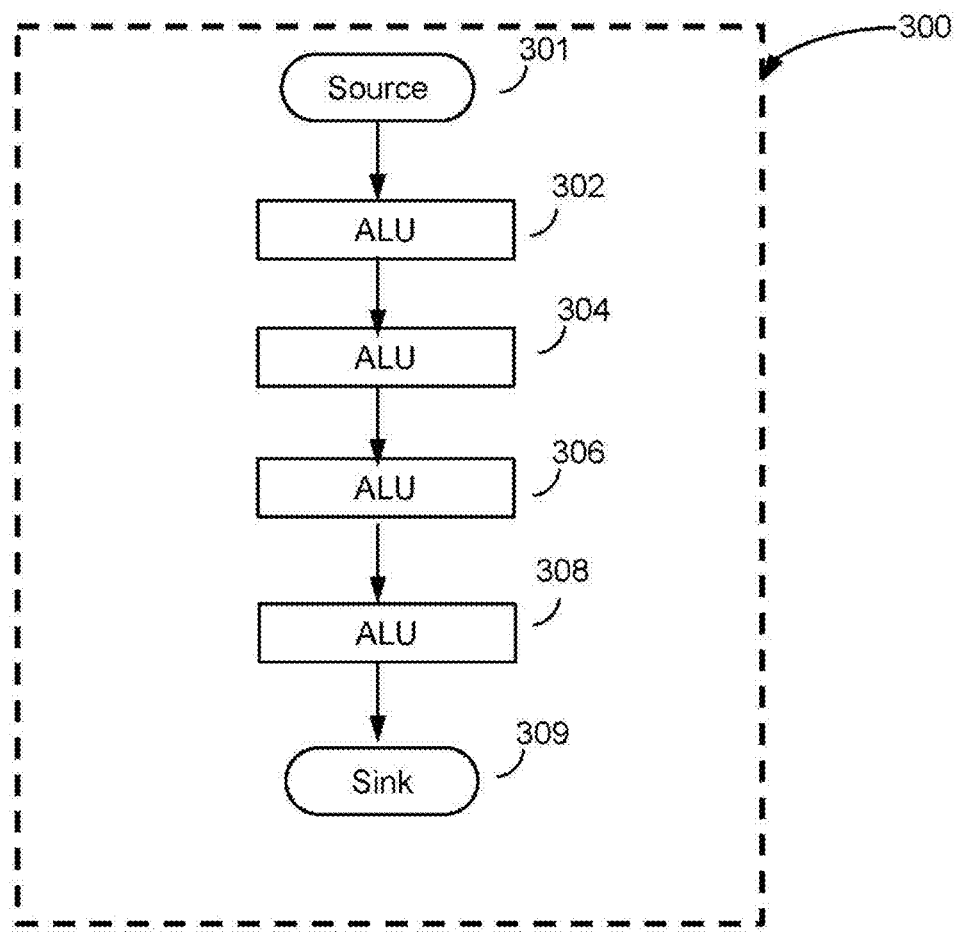
FIG. 3 is a flow chart of a pipeline of the computer processor architecture in a streaming mode, in accordance with one or more implementations.

The process and mechanism for configuring the architecture is described below. As noted above, the fractured mode is accomplished by defining one or more pipelines of streaming data between the secondary cores. FIG. 3 illustrates a simple data stream pipeline which connects 4 arithmetic logic units 302, 304, 306, and 308 in series so that an input from source 301 is processed into an output 309. The ALUs are examples of the processing elements described above that define the secondary cores. The pipeline is defined by setting the L0 and L1 switches in the NOC described above. Of course, the NOC can be configured in any manner to define any data stream pipeline(s). The appropriate node wrapper(s) 110 can execute code to configure the NOC. As an example, the pipeline of FIG. 2 can be configured by execution of the C++ code objects set forth below. Note that the keyword "threadModule" indicates to the tooling that the code to be executed will run on a RISC core, with the keyword "streamModule" indicating that the code to be executed will run on a Fractured Core.

```
class source: public threadModule { // code to run on a RISC core
    outputStream<int> outStrm;
    void code( );   // pointer to the RISC code
}; // sends data to output
class pipeline: public streamModule { // code to run on a Fractured core
    inputStream<int> inStrm;
    outputStream<int> outStrm;
    void code( );   // pointer to the operation the Fractured core will perform
}; // process data from input and send to output
class sink: public threadModule { // code to run on a RISC core
    inputStream<int> inStrm;
    void code( );   // pointer to the RISC code
}; // receives data from input
```

In the objects above "code( )" can point to the source code below:

```
// Example of code which can be run on a RISC core
void source::code( ) {
    int x;
    for (x = 0; x < 1000; ++x) // Put 1000 ints into outStrm {
        printf("Generating Data %d\n", x);
        outStrm << x; // TruStream put
    }
}
```

```
//Example of code which can be run on a Fractured Core
void pipeline::code( ) {
    int x;
    int sum = 0;
    inStrm >> x; // get data from input stream
    sum += x * 3;// perform some computation
    outStrm << sum; // TruStream put, send data to output stream
}
// Example of code which can be run on a RISC core
void sink::code( ) {
    int x;
    for (x = 0; x < 1000; ++x) {
        inStrm >> x; // get data from input stream
        printf("Received Data %d\n", x);
    }
}
```

The code below serves to connect the topology of pipeline of FIG. 3, where source and sink are running on a RISC core, and 4 Fractured Cores are performing a MAC (multiplication with accumulation):

```
class pipelineTest: public streamModule {
    source src;
    pipeline pipe;
    sink snk;
    public:
    pipelineTest( ) // Constructor
    {
        src >> pipe >> pipe >> pile >> pipe >> snk; // Connect modules
        end( ); // Housekeeping
    }
};
```

Figure 4:
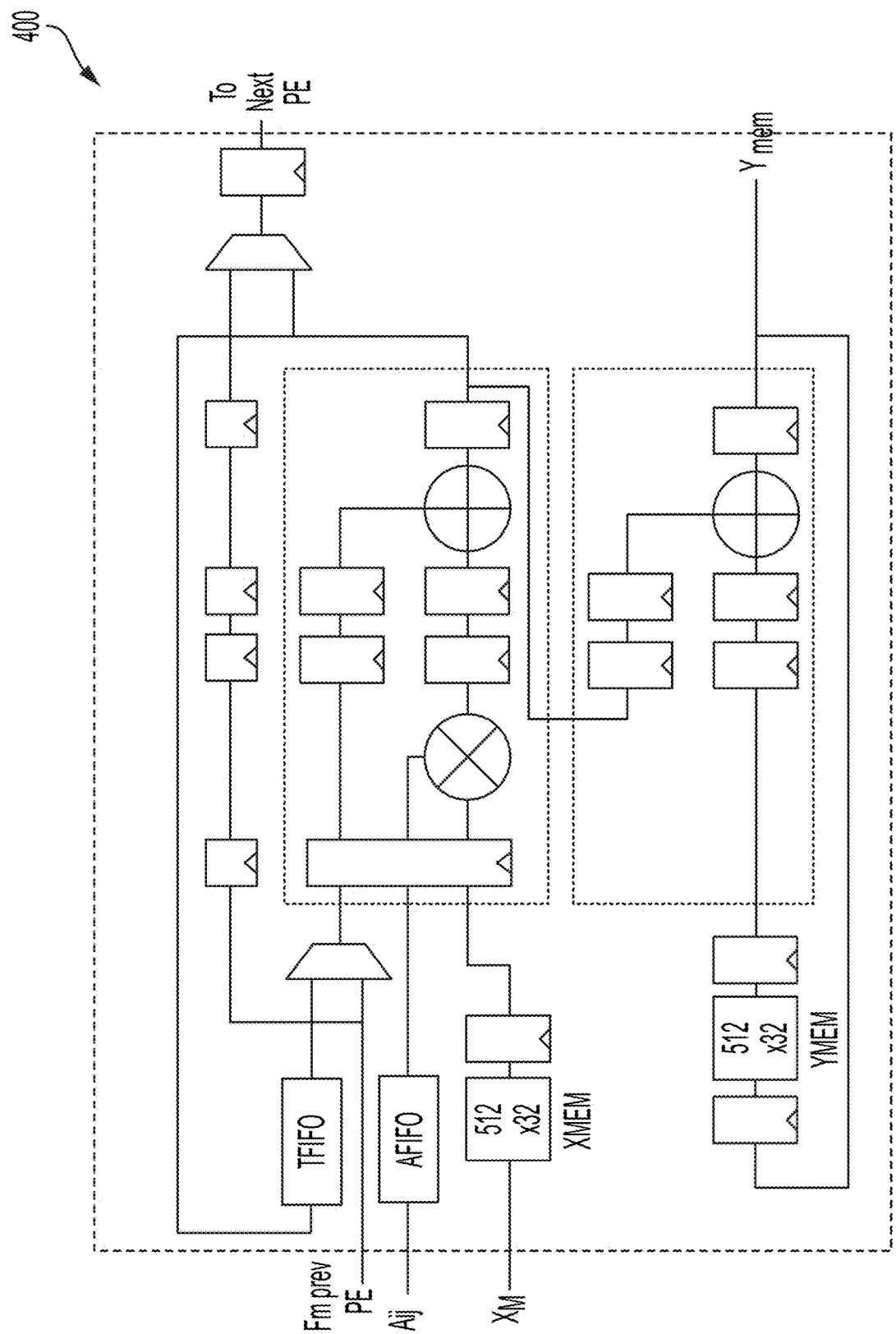
FIG. 4 is a schematic diagram of a secondary core in a streaming mode, in accordance with one or more implementations.

FIG. 4 illustrates a top-level diagram of an example of a secondary core 400 defined by processing elements. The pipeline configuration requires a number of clock cycles for a value to be read out of Y memory, added to the new product, and returned to Y memory before that element can be accessed again. A product that arrives before the Y memory element is ready to be read is shunted to the T-FIFO for later accumulation. Memory hazard logic (not shown) can be used to determine if the Y memory location for a new product has been used recently that controls steering of the data in the design. The pre-loaded X mem holds the partition of the X (right) matrix applicable to the partition of the Y (result) matrix performed by this Small Core. The applicable partition of the A (left) matrix is streamed into the PE in compressed form (non-zero elements only, accompanied by row/column info). The Y mem accumulates the products as the matrix is computed. The implementation can also include a peer-to-peer connection between adjacent processing elements 114 in a ring intended to permit dividing the processing load for particular Y-elements between two or more processing elements, which is useful to make the design scalable to larger matrices without a significant loss of performance.

Figure 5:
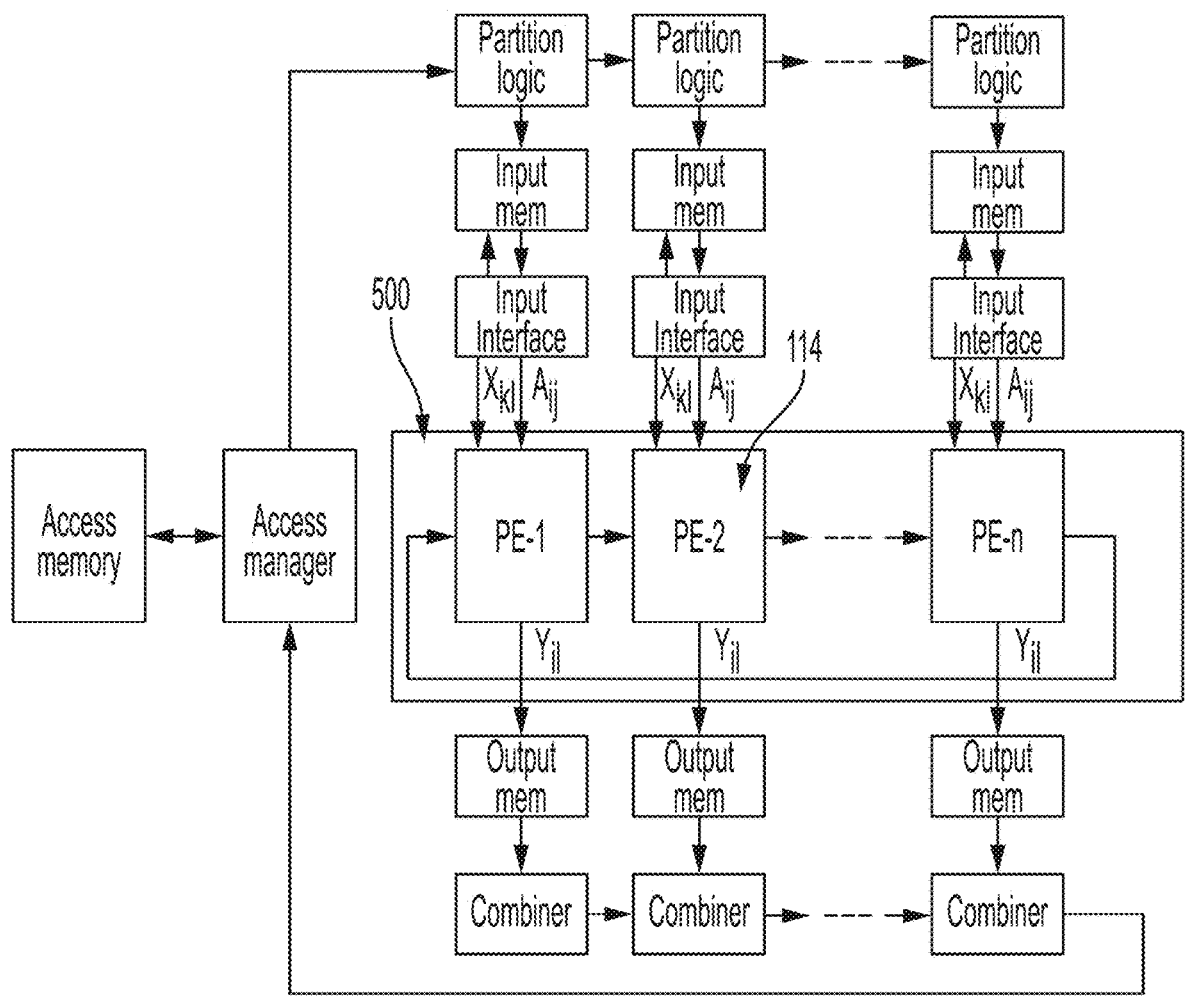
FIG. 5 is a schematic diagram of specific topology of a secondary core, in accordance with one or more implementations.

FIG. 5 illustrates a specific topology of secondary cores 500. The design includes a test scaffold built around the processing element ring that allows the test matrices to be initially stored in a central memory store, automatically partitioned and delivered to the processing elements, run through the processing elements with the option of continuously repeating the test matrices (for power measurement), and then have the result partitions collected and reassembled into the full output matrix and returned to the central memory where the result may be accessed easily using the memory initialization and dump tools.

Each processing element 114 in FIG. 5 is associated on the input side with a node input memory, partitioning logic and an input state machine for transferring data from the local memory to the processing element. On the output side, each processing element 114 is associated with an output memory that is updated throughout the process with the latest sum for each Y element as it is computed. At the completion of the matrix processing, the accumulated data in the output memory is transferred back to the central access memory via combiners that either pass data from the previous processing element 114, or replace input with data from the local processing element 114 to reconstruct the full matrix as the matrix is scanned by row and column.

The programming and data information in the central access memory includes a setup word for each processing element 114 that contains partition information for the processing element 114. That setup word configures the partition logic at each processing element 114 to only use data with rows and columns associated with the processing element's partition. Both the pre-load X matrix data and the streaming A matrix data arrive over the same path and use the same partition setup to select data out of the data stream from the central memory. Selected data at each processing element 114 gets written into the node input memory and held until the access manager completes transferring data and starts the processing. When processing starts, the processing uses only the data that has been transferred into the node memories and stops when the end of the data has been reached. If the repeat bit is set in the start word, the pointer into the node input memory is reset to 0 when the end of the buffered data is reached and allowed to repeat the data indefinitely. This allows power measurements to be made.

Figure 6:
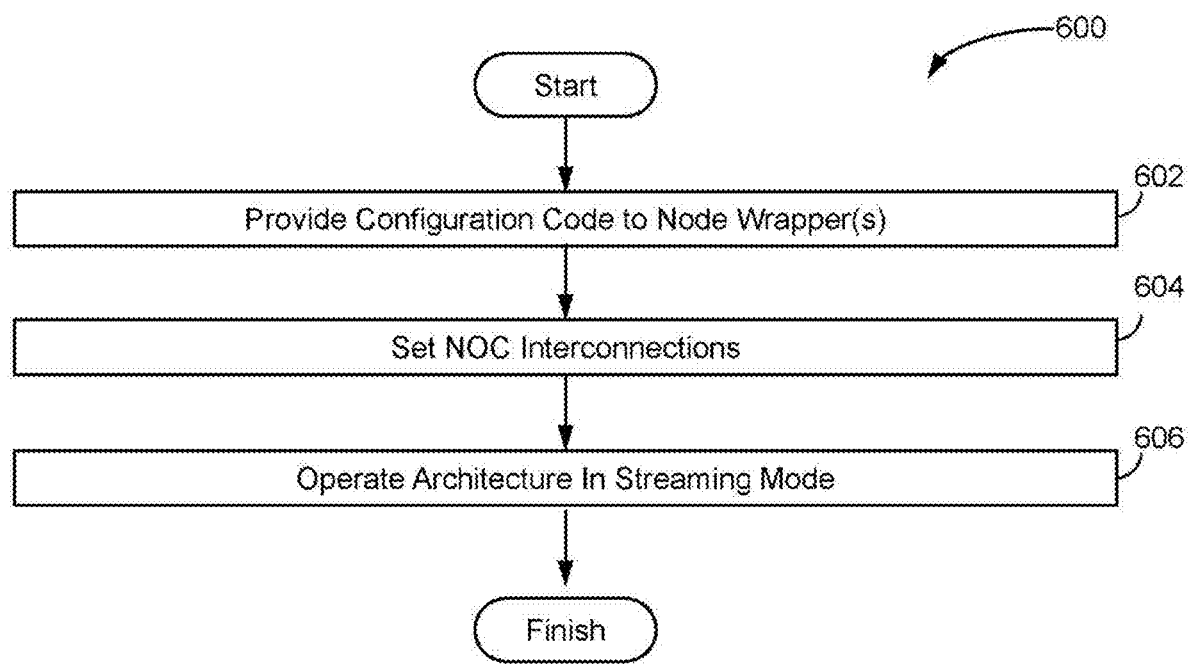
FIG. 6 is a flow chart of a method for configuring an architecture in accordance with one or more implementations.

FIG. 6 illustrates a method 600 for reconfiguring a reduced instruction set computer processor architecture, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

An operation 602 may include providing configuration code to one or more node wrappers. An operation 604 may include executing the configuration code to set the interconnections of the NOC in a manner which creates at least on pipeline. An operation 606 may include operating the architecture in a streaming mode wherein data streams out of the corresponding secondary core into the main memory and other ones of the plurality of secondary cores and data streams from the main memory and other secondary cores to stream into the corresponding core in a streaming mode or the control-centric mode.

Figure 7:
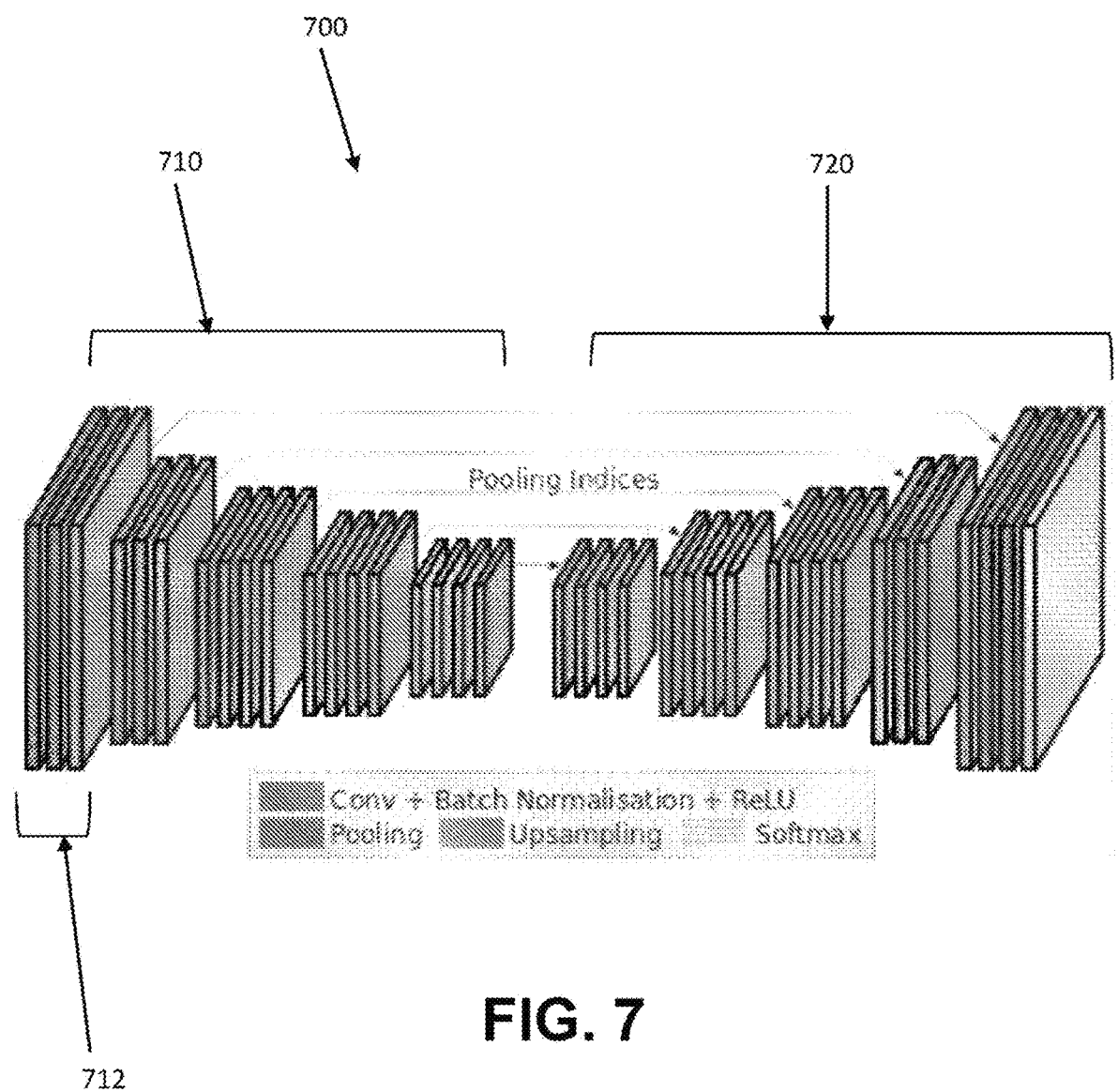
FIG. 7 is schematic diagram of a SegNet architecture.
Figure 8:
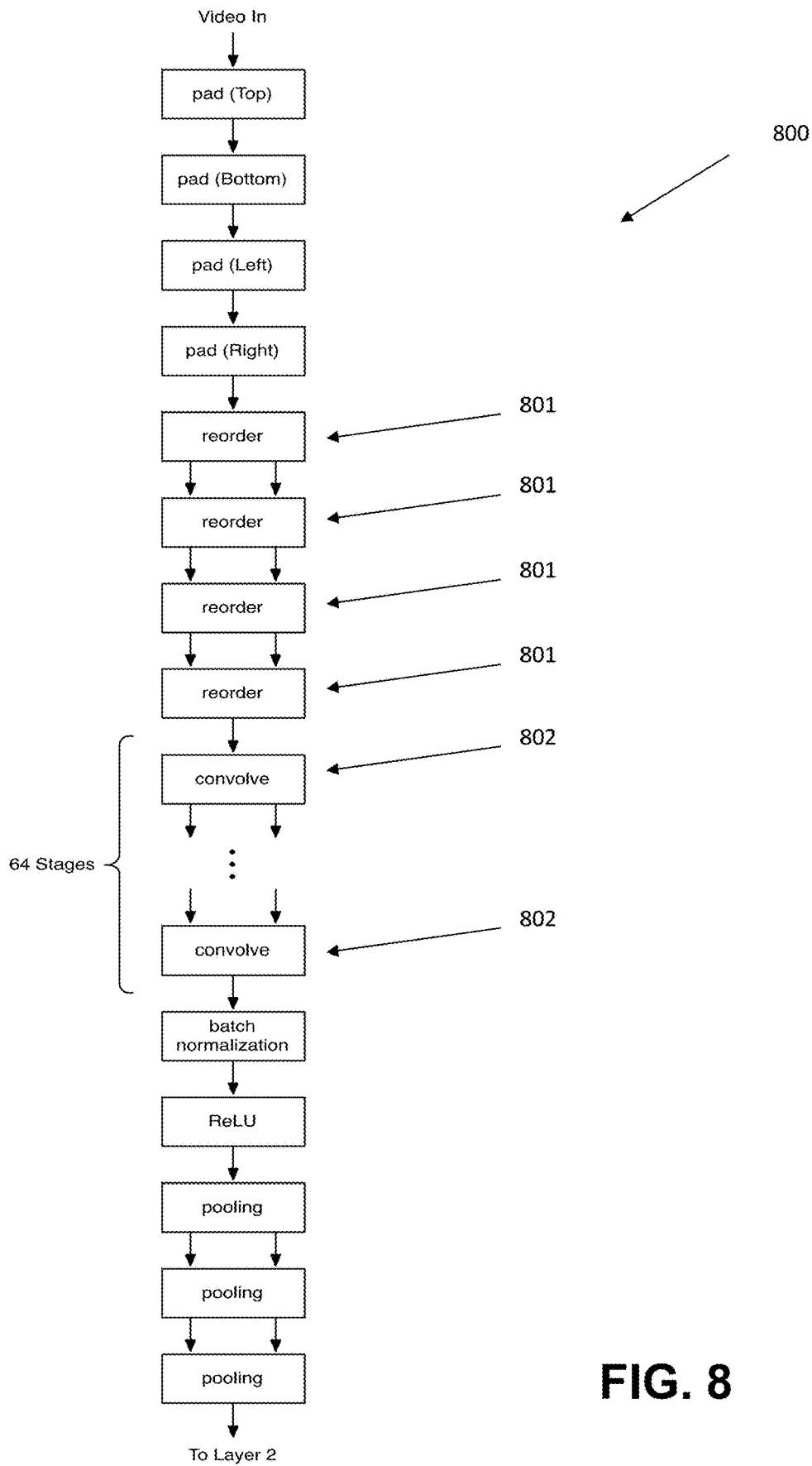
FIG. 8 is a flow chart of a data stream of a portion of the SegNet implementation.

FIGS. 7 and 8 illustrates a specific example of the architecture applied to a SegNet topology. As noted above, SegNet is a fully convolutional neural network (CNN) architecture for semantic pixel-wise segmentation. This core trainable segmentation engine consists of an encoder network, a corresponding decoder network followed by a pixel-wise classification layer. The architecture of the encoder network is topologically identical to the 13 convolutional layers in the VGG16 network. The role of the decoder network is to map the low-resolution encoder feature maps to full input resolution feature maps for pixel-wise classification. The SegNet decoder upsamples its lower resolution input feature map(s). Specifically, the decoder uses pooling indices computed in the max-pooling step of the corresponding encoder to perform non-linear upsampling. This eliminates the need for learning to upsample. The upsampled maps are sparse and are then convolved with trainable filters to produce dense feature maps.

As illustrated in FIG. 7, a SegNet Topology 700 includes encoder 710 and decoder 720. The three-dimensional CNN topology can be transformed into an equivalent one-dimensional topology using the techniques disclosed herein. SegNet Layer 1 712 can be transformed into the 77-stage fractured core pipeline 800 shown in FIG. 8. The stages illustrated in FIG. 8 perform the following operations:

pad (Top), pad (Bottom), pad (Left) and pad (Right) add zero-padding around the image. Does not require memory.

The reorder stages convert the row-based video stream into a window-based stream. Accesses on-die SRAM.

The 64 convolve stages perform a convolution for each of the 64 filters (kernels). Accesses on-die SRAM.

The batch-normalization stage performs batch normalization. Accesses on-die SRAM.

The ReLU stage implements the Rectified Linear Unit (ReLU) activation function. Does not require memory.

The three pooling stages perform max pooling. Accesses on-die SRAM.

Figure 9:
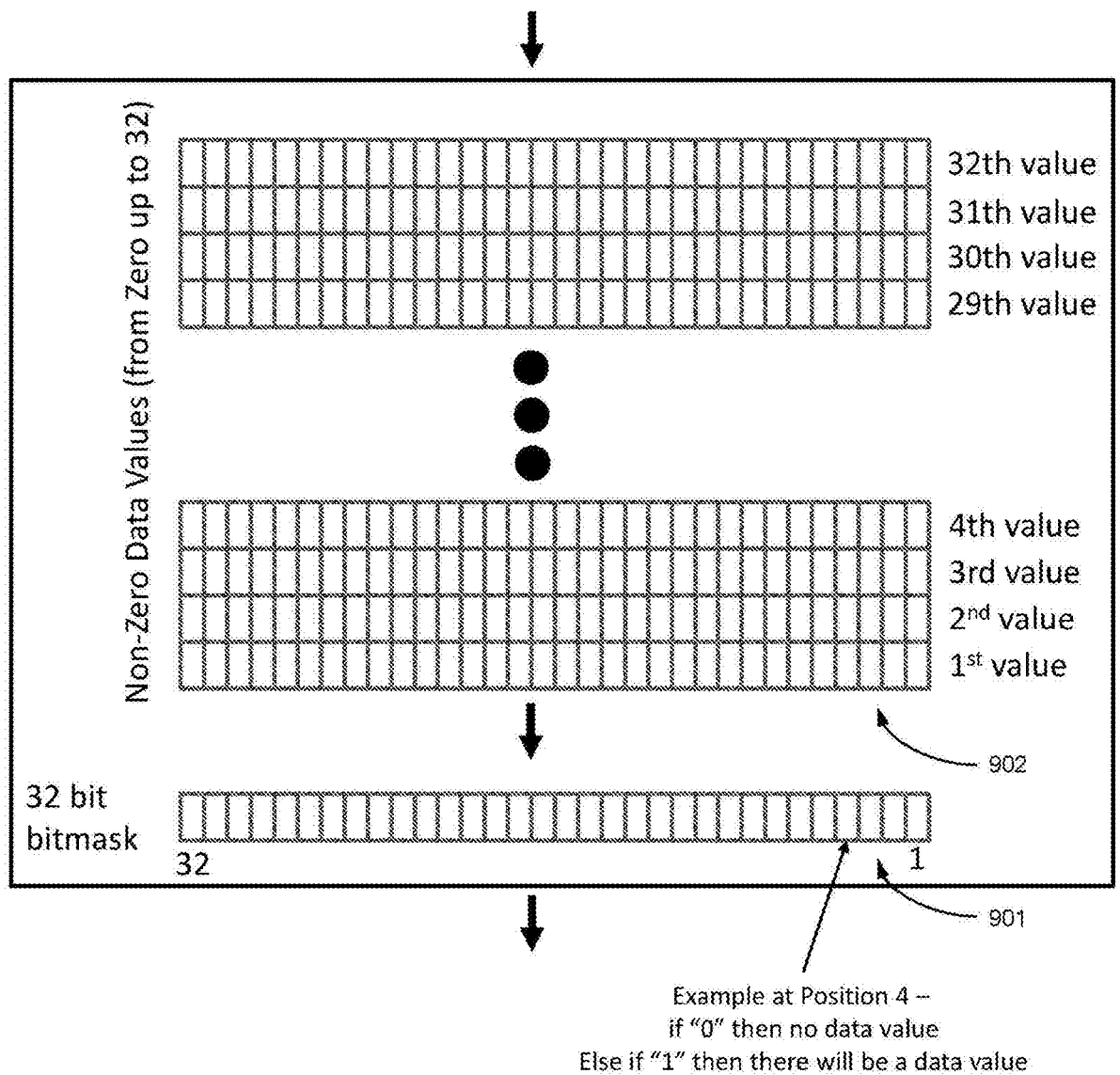
FIG. 9 is a schematic diagram of a compression data structure.
Figure 10:
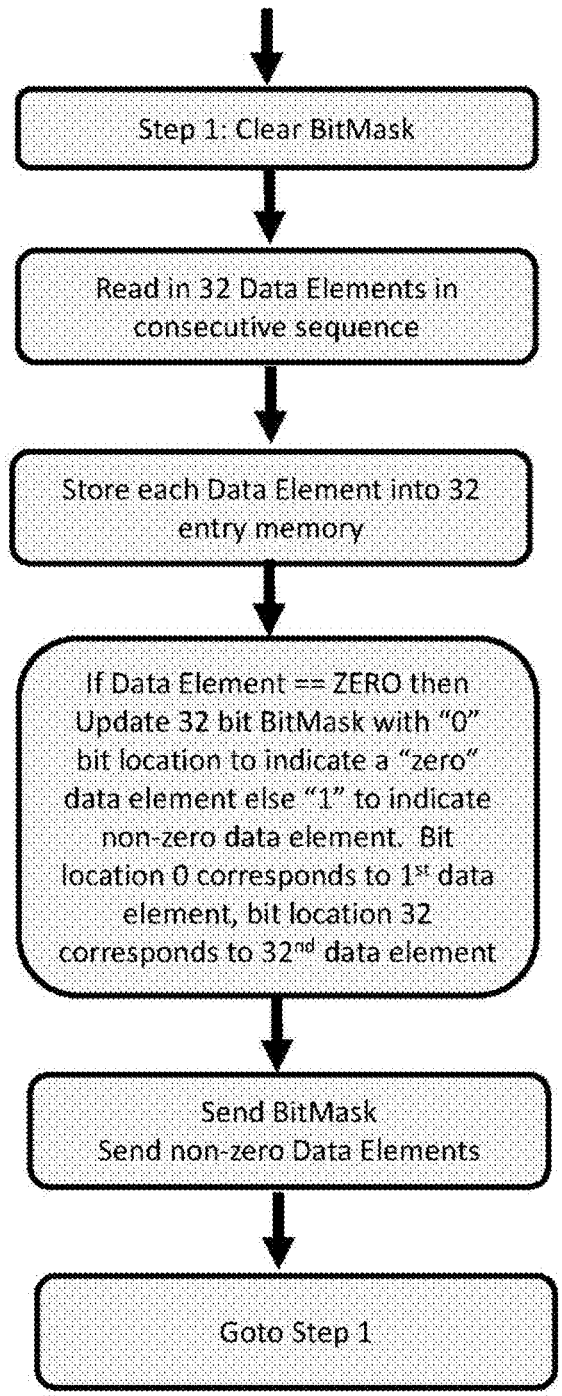
FIG. 10 is flowchart of an implementation of XEncoder.

The embodiments facilitate more efficient data compression. Neural Networks, by their very definition, contain a high degree of sparsity, for the SegNet CNN over 3× the computations involve a zero element. Clearly, having an architecture that can automatically eliminate the excess data movements for zero data, and the redundant multiply by zero for both random and non-random sparsity would result in higher performance and lower power dissipation. Data which is not moved results in a bandwidth reduction and a power savings. Multiplications that do not need to be performed also save power dissipation as well as allowing the multiplier to be utilized for data which is non-zero. The highest bandwidth and computation load in terms of multiply accumulates occurs in the DataStreams exiting the "Reorder" modules in 801 which feed the "Convolve" Modules 802. Automatically compressing the data leaving the reorder module, 801, reduces the bandwidth required to feed the convolve modules as well as reducing the maximum MAC (multiply accumulates) that each convolve performs. There are several possible zero compression schemes that may be performed, what is illustrated is a scheme which takes into account the nature of convolution neural networks. The input to a convolver, 802, consists of a 3-dimensional data structure (Width×Height×Channel). Convolution is defined as multiplying and summing (accumulating) each element of the W×H×C against a Kernel Weight data structure also consisting of (Width×Height×Channel). The data input into the convolver exhibits two types of sparsity—random zeros interspersed in the W×H×C data structure and short "bursts" of zeros across consecutive (W+1)×(H+1)×C data elements. The compressed data structure that is sent from the Reorder Modules to the Convolver modules is detailed in FIG. 9. For every possible 32 values one Bitmask value, 901, is sent followed by any non-zero data values, 902. Each bit position in the bitmask indicates where whether there is valid data or zero data in that position. In the case where there is no zero data, 901 will be all zeros, followed by 32 data values, 902. In the other extreme where there are 32 zero data values, 901 will be all "1"'s and no data values, 902, will follow. In the case there is a mixture of non-zero data values and data values the bitmask, 901, will indicate this and only the non-zero data values will follow in 902. FIG. 10 is the flow chart for the circuitry which resides in 801 the reorder module which performs the compression.

Figure 11:
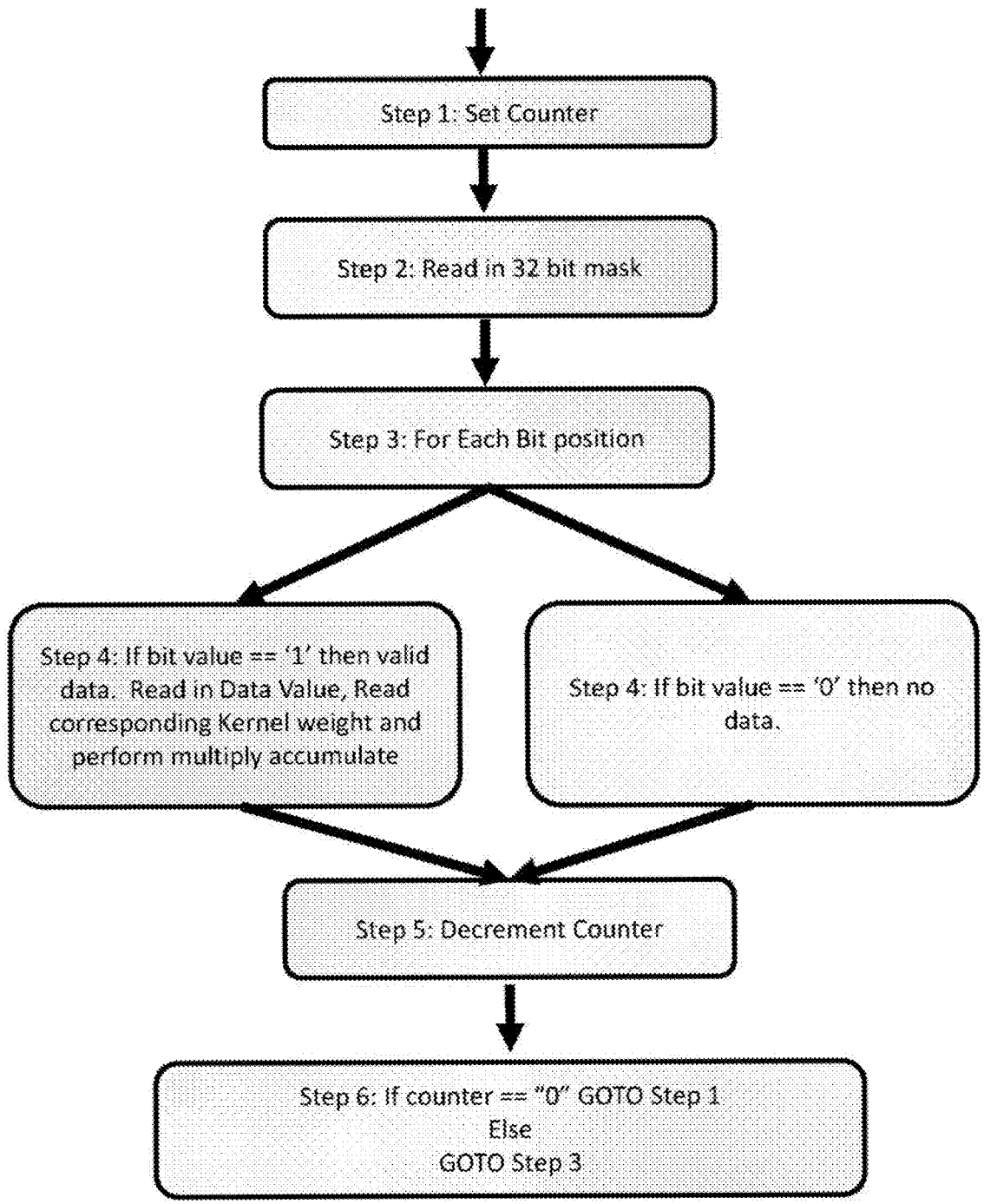
FIG. 11 is a flowchart of an implementation of ZMac.

FIG. 11 is the flow chart for the circuitry which resides in 802, the convolver, to perform the de-compression. Note that the bit position which is non-zero is critical since the convolution operation must multiply the non-zero data with the correct kernel weight—hence a counter (FIG. 11, step 1 and step 5) must be maintained. The advantage is as follows: Given a SegNet Reorder/Convolution of width 7, height 7 and channels 64 an approach with no compression will send 3136 (7×7×64) values from the reorder module, 801, to each convolver, 802 where 3136 Multiply Accumulations will be performed. With a 50% chance of zero values the described circuitry will send 98 BitMasks and only 1568 data values. This results in a savings in terms of bandwidth of almost 50% and a 50% reduction in multiply accumulates across 64 individual convolvers. Alternatively, a simpler compression scheme, such as the addition of an additional bit to each data values to indicate "non-zero" data plus the addition of several bits to indicate a "count" of zeros values can also be used to perform compression, at the penalty of increasing the bit width of the bus carrying the data values.

As noted above, the streaming topologies described herein can be applied to achieve FHE processing with far fewer computing resources than would be required with conventional processors. FHE has specialized logic gates that are very complicated and computing resource intensive. For example, the BootsAND logic gate of TFHE has two inputs (LweSample) that are each 501 32 bit integers. Transforming FHE logic, such as TFHE logic, to the streaming topologies desired herein yields processing that is much more efficient. Implementations described herein include topologies derived from three TFHE functions: (1) bootsAND, (2) tfhe_MuxRotate_FFT and (3) tGswFFTExternMulToTLwe.

Below are the constants used in the TFHE code. They are used to compute the sizes of the data members and for-loop limits in the streaming topology as described below.

| | |
|---|---|
| static const int32_t N | = 1024; |
| static const int32_t k | = 1; |
| static const int32_t n | = 500; |
| static const int32_t bk_l | = 2; |
| static const int32_t bk_Bgbit | = 10; |
| static const int32_t ks_basebit | = 2; |
| static const int32_t ks_length | = 8; |
| static const double ks_stdev | = 2.44e−5; //standard deviation |
| static const double bk_stdev | = 7.18e−9; //standard deviation |
| static const double max_stdev for a ¼ msg space | = 0.012467; //max standard deviation |

Torus32 is a key typedef used in the TFHE code and in the TruStream topologies below:

| | |
|---|---|
| typedef int | int32_t; |
| typedef unsigned int | uint32_t; |
| typedef unsigned long long | uint64_t; |
| typedef int32_t | Torus32; // avant uint32_t |

The TFHE code is divided into references ("structs") which are composite data type declarations defining a physically grouped list of variables under one name. Structs can be thought of as the data processed by the functions. For example, the TFHE bootsAND code includes 23 structs that can be classified as either 1) STATIC/NON-STREAMING (data values of these types are fixed/static for a particular Boolean AND gate and can therefore be stored in SRAM) or 2) DYNAMIC/STREAMING (data values which are periodically or constantly changing, and are streamed from one core to another).

The TFHE code is expressed in C/C++, both of which make extensive use of:

- new (a library function that requests memory allocation on a process's heap)
- malloc (a library function that allocates the requested memory and returns a pointer to it.)
- delete (a library function that requests removal of memory allocation on a process's heap)
- pointers.

The streaming topology described herein does not use these system functions. Instead, it uses streams. This has implications for the nine DYNAMIC/STREAMING structs of the TFHE code, when being adapted for a streaming processor arrangement. Implementations use a mechanism to replace the pointer data-members in these nine structs with the actual arrays being pointed to because instead of passing an array pointer from one function to another, a streaming program passes/streams the actual array from one module to another. On a conventional microprocessor, however, the benefits of a streaming programming model are best achieved by streaming pointers. However, this arrangement, conventional processors streaming pointers, is disadvantageous for the following reasons.

- The streaming compute fabric is arbitrarily scalable
- The streaming compute fabric can achieve much, much higher levels of performance
- the streaming compute fabric has none of the bottlenecks that plague conventional microprocessors, like caching, context switching, scheduling and dispatching
- The streaming compute fabric has no "bloat" code (such as control code), the only code running in the streaming compute fabric is application code
- the streaming compute fabric is far more efficient in terms of energy consumption and usage of silicon real-estate.

Accordingly, the dynamic structs of the TFHE bootsAND code can be converted into the following structs that can be streamed (the "S" designates a streaming struct.

```
1S. Struct TGswSample // DYNAMIC / STREAMING
{
    int32_t all_sample[ (k + 1) * bk_l ]; // (k + 1) * l = 4
    int32_t bloc_sample[ k + 1 ]; // k + 1 = 2
    const int32_t k; // STATIC / NON-STREAMING
    const int32_t l; // STATIC / NON-STREAMING
};
2S. Struct Ts_LweSample // DYNAMIC / STREAMING
{
    int32_t a[ n ]; // n = 500
    int32_t b;
    double current_variance;
};
3S. Struct Ts_TGswSampleFFT // DYNAMIC / STREAMING
{
    int32_t all_samples[ (k + 1) * l ]; // (k + 1) * l = 4
    int32_t sample[ k + 1 ]; // k + 1 = 2
    const int32_t k; // STATIC / NON-STREAMING
    const int32_t l;
};
4S. Struct Ts_IntPolynomial // DYNAMIC / STREAMING/** This
structure represents an integer polynomial modulo X^N+1 */
{
    const int32_t N; // N = 1024
    int32_t coefs[ N ];
};
5S. Struct Ts_TlweSample // DYNAMIC / STREAMING
{
```

```
    int32 a[ (k + 1) * N ]; // (k + 1) * N = 2048
    int32 b; // Alias of a[k], DON'T CARE
    double_current_variance;
    const int32_t k; // STATIC / NON-STREAMING
};
6S Struct Ts_TLweSampleFFT // DYNAMIC / STREAMING
{
    int32_t a[ (k + 1 ) * N ]; // (k + 1) * N = 2048
    int32_t b; // Alias of a[k], DON'T CARE
    double current_variance;
    const int32_t k; // STATIC / NON-STREAMING
};
7S. Struct Ts_TgswSample // DYNAMIC / STREAMING
{
    int32_t all_sample[ (k + 1) * l ]; // (k + 1) * l = 4
    int32_t bloc_sample[ k + 1 ]; // k + 1 = 2
    const int32_t k; // STATIC / NON-STREAMING
    const int32_t l; // STATIC, NON-STREAMING
};
8S. Struct Ts_LagrangeHalfCPolynomial_IMPL // DYNAMIC /
STREAMING
/**
structure that represents a real polynomial P mod X^N+1 as the N/2
complex numbers:
P(w), P(w^3), ..., P(w^(N-1))
where w is exp(i.pi/N)
*/
{
    double coefsC[ N ]; // N = 1024 N/2 complex numbers2
    FFT_Processor_Spqlios* proc;
};
9S Struct Ts_TorusPolynomial // DYNAMIC / STREAMING/** This
structure represents an torus polynomial modulo X^N+1 */
{
    const int32_t N; // N = 1024
    int32_t coefsT[ N ];
};
```

The streaming structs above can be created from the original structs by, for example, the following process:
 locate a pointer in the code;
 backtrack through the code to find data that was created and the allocated block of data that is pointed to;
 determine the size of the allocated block; replace the pointer with a data array corresponding to the allocated block;

and use the array as streaming data.

Figure 12:
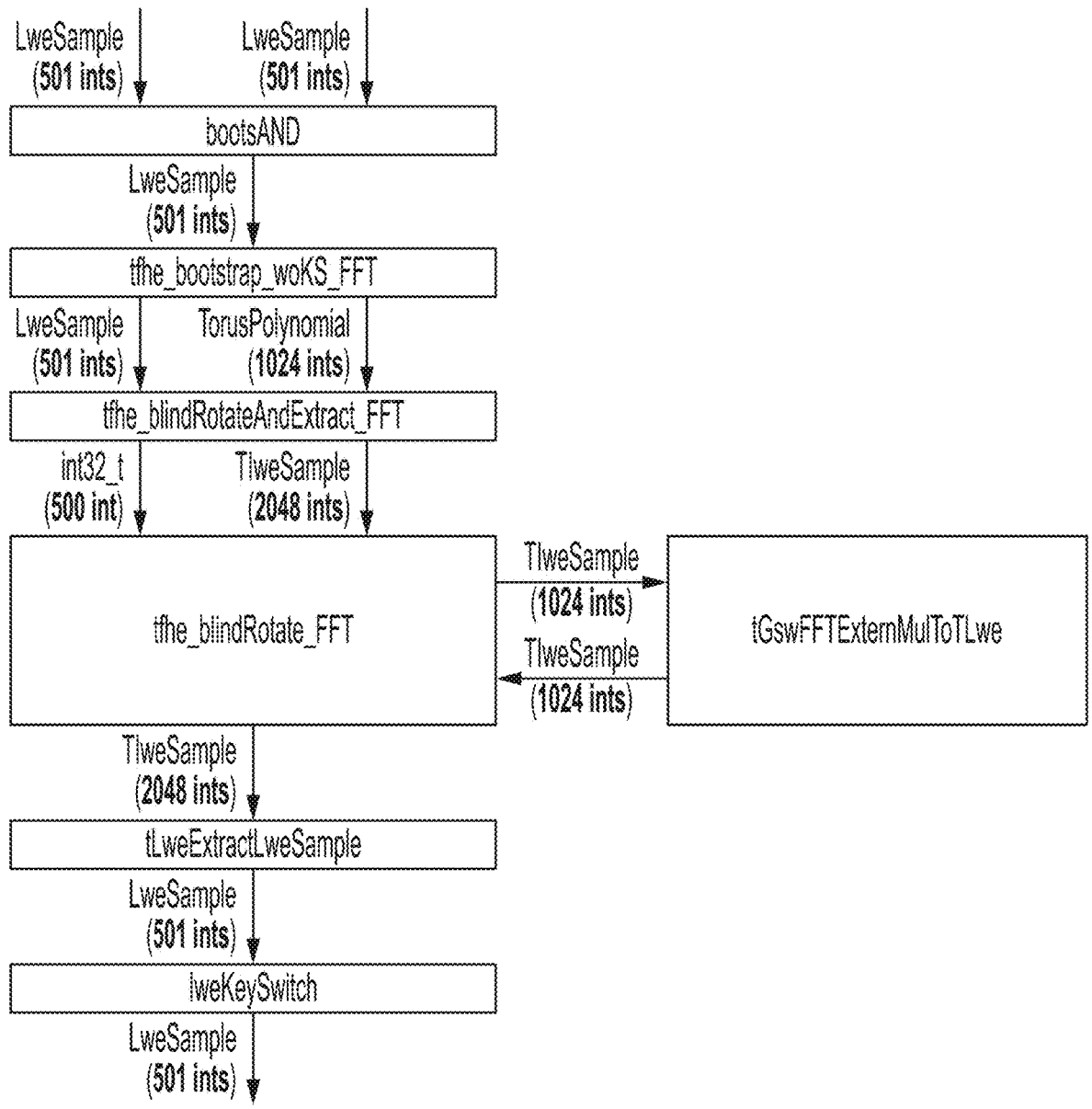
FIG. 12 illustrates the top-level topology derived from the bootsAND function in TFHE library for fully homomorphic encryption in accordance with one or more implementations.

FIG. 12 illustrates the top-level topology derived from the bootsAND function in TFHE library for fully homomorphic encryption. Note that "housekeeping" functions, such as new and delete, are not relevant in the streaming programming model. Also, static function arguments, such as TfheGateBootstrappingCloudKeySet, LweBootstrappingKeyFFT and TgswParams, are omitted from FIG. 12 since they can be stored in the memories, such as 112a of FIG. 1, of appropriate cores of a streaming architecture. The topology can be derived by starting with call stack, creating blocks of functions with control, and converting the function calls to modules. An example is set forth below. Starting with the tfhe_bootstrap_woKS_FFT Function:

```
EXPORT void tfhe_bootstrap_woKS_FFT(LweSample *result,
    const LweBootstrappingKeyFFT *bk,
    Torus32 mu,
    const LweSample *x) {
const TGswParams *bk_params = bk->bk_params;
const TLweParams *accum_params = bk->accum_params;
const LweParams *in_params = bk->in_out_params;
const int32_t N = accum_params->N;
const int32_t Nx2 = 2 * N;
const int32_t n = in_params->n;
TorusPolynomial *testvec = new_TorusPolynomial(N);
int32_t *bara = new int32_t[N];
// Modulus switching
int32_t barb = modSwitchFromTorus32(x->b, Nx2);
for (int32_t i = 0; i < n; i++) {
    bara[i] = modSwitchFromTorus32(x->a[i], Nx2);
}
// the initial testvec = [mu,mu,mu,...,mu]
for (int32_t i = 0; i < N; i++) testvect->coefsT[i] = mu;
// Bootstrapping rotation and extraction
tfhe_blindRotateAndExtract_FFT(result, testvect, bk->bkFFT, barb,
bara, n, bk_params);
delete[ ] bara;
delete_TorusPolynomial(testvect);
}
```

A corresponding module is created:

```
class tfhe_bootstrap_woKS_FFT_Module: public threadModule          // A
threadModule class
{
inputStream_NoAutoAck<LweSample*>    x_inStrm;              // Input-
stream data member
outputStream<TorusPolynomial*>       testvect_outStrm;      // Output-
stream data member
outputStream<int32_t*>               bara_outStrm;          // Output-stream
data member
outputStream<int32_t>                barb_outStrm;          // Output-stream
data member
        Torus32         mu;                      // Data member
        LweSample*      x;                       // Data member
const TGswParams*       bk_params;               // Data member
const TLweParams*       accum_params;            // Data member
const LweParams*        in_params;               // Data member
const int32_t    N;                              // Data member
const int32_t    Nx2;                            // Data member
const int32_t    n;                              // Data member
        TorusPolynomial* testvect[ FHE_FIFO_Size + 1 ];         // Data
        member
        int32_t*   bara[ FHE_FIFO_Size + 1 ];             // Data
        member
        int32_t    barb;                         // Data member
void code( );                                    // Member function
                                                 // (Contains the
                                                 threadModule thread)
```

```
public:
tfhe_bootstrap_woKS_FFT_Module( const LweBootstrappingKeyFFT* bk ): //
Constructor (Called from
        bk_params( bk->bk_params ),              // a
        streamModule when a
        accum_params( bk->accum_params ),        //
        tfhe_bootstrap_woKS_FFT_Module
        in_params( bk->in_out_params ),          // is
        constructed)
        N( accum params->N ),
        Nx2( 2 * N ),
        n( in_params->n )
{
        setName( "tfhe_bootstrap_woKS_FFT_Module" );         // Set
        name (used in debugging)
        x_inStrm.setName( "x_inStrm" );          // Set name (used in
        debugging)
        bara_outStrm.setName( "bara_outStrm" );              // Set name
        (used in debugging)
        barb_outStrm.setName( "barb_outStrm" );              // Set name
        (used in debugging)
        testvect_outStrm.setName( "testvect_outStrm" );      // Set
        name (used in debugging)
        x_inStrm.setDirection( TS_NORTH );  // Set direction (used by the
        streamMpdule >> operator)
        bara_outStrm.setDirection( TS_SOUTH );    // Set direction (used by
        the streamMpdule >> operator)
        barb_outStrm.setDirection( TS_SOUTH );    // Set direction (used by
        the streamMpdule >> operator)
        testvect_outStrm.setDirection( TS_SOUTH );   // Set direction (used
        by the streamMpdule >> operator)
}
};
```

Code for the module is generated:

```
void tfhe_bootstrap_woKS_FFT_Module::code( )              //
tfhe_bootstrap_woKS_FFT_Module thread
{
    static const Torus32 mu = modSwitchToTorus32( 1, 8 );
    for (int32_t h = 0; h < (FHE_FIFO_Size + 1); h++)        // Create array of
TorusPolynomials
    {
        testvect[h] = new_TorusPolynomial( N );               // N = 1024
        bara[h]    = new int32_t[ N ];                        // N = 1024
        for (int32_t i = 0; i < N; ++i)                       // Initialize bara[h]
        {
            bara[h][i] = 0;
        }
    }
    while (1)                            // An infinite loop
    {
        for (int32_t h = 0; h < (FHE_FIFO_Size + 1); h++)    // Process a "burst"
of input data
        {
            x_inStrm >> x;               // Get next LweSample pointer
from x_inStrm
            barb = modSwitchFromTorus32( x->b, Nx2 );         // Nx2 = 2048
            for (int32_t i = 0; i < n; i++)
            {
                bara[h][i] = modSwitchFromTorus32( x->a[i], Nx2 ); // Nx2 = 2048
            }
            x_inStrm.backwardAck( );     // Tell x_inStrm source that
we're done with x
            for (int32_t i = 0; i < N; i++)                   // N =1024
            {
                testvect[h]->coefsT[i] = mu;
            }
            testvect_outStrm << testvect[h];      // Put testvect[h] into
testvect_outStrm
            bara_outStrm           << bara[h];    // Put bara[h]            into
bara_outStrm
```

```
                barb_outStrm             << barb;       // Put barb          into
barb_outStrm
        }
    }
}
```

Finally, a streaming module is created:

```
class bootsAND_Topology: public streamModule      //
bootsAND_Topology streamModule
{
    bootsAND_Module     bAND;
    tfhe_bootstrap_woKS_FFT_Module   woKS;       //
tfhe_bootstrap_woKS_FFT_Module data member
    tfhe_blindRotateAndExtract_FFT_Module rotX;
    tfhe_blindRotate_FFT_Topology   rotTop;
    tLweExtractLweSample_Module      xSamp;
    lweKeySwitch_Module      keySwitch;
public:
    bootsAND_Topology( const TFheGateBootstrappingCloudKeySet* cks ) :
        bAND( cks ),
        woKS( cks->bkFFT ),
        rotX( cks->bkFFT->bk_params ),
       rotTop( cks->bkFFT ),
        xSamp( cks->bkFFT->accum_params ),
     keySwitch( cks, (char*)"/Users/fredfurtek/Desktop/FCF MacBook
Pro/QST/TruStreamCPP/TruStreamFHE/LweSAmple_result.txt" )
    {
      setName( "bootsAND_Topology" );
      bAND >> woKS >> rotX >> rotTop >> xSamp >> keySwitch;   // Create
bootsAND_Topology pipeline
      end( );
    }
};
```

As a result, each box of FIG. 12 represents a streaming function module corresponding to a TFHE function—in which one more module input streams can provide the function and, one or more module output streams receive the output data from the TFHE function. The output data is eventually conveyed to another streaming function module. There is no passing of control or calling of other functions. Each streaming function module is a portion of the top level BootsAND topology. This topology allows the BootsAND operation to be reproduced on silicon with parallelizing and pipelining and thus allows for much greater efficiency and performance in processing the BootsAND function.

The biggest factor limiting the performance of TFHE is a 500-iteration for-loop in the TruStream module tfhe_blindRotate_FFT. In partial loop-unrolling, an n-iteration for-loop is replaced with a pipeline containing m for-loops, each with n/m iterations. In a partially unrolled pipeline, the loops are performed in parallel, while the steps within each loop are performed serially. In full loop-unrolling, an n-iteration for-loop is replaced with a loop-free pipeline containing n instances of each step in the for-loop. In a fully unrolled pipeline, all steps are performed in parallel.

Figure 13:
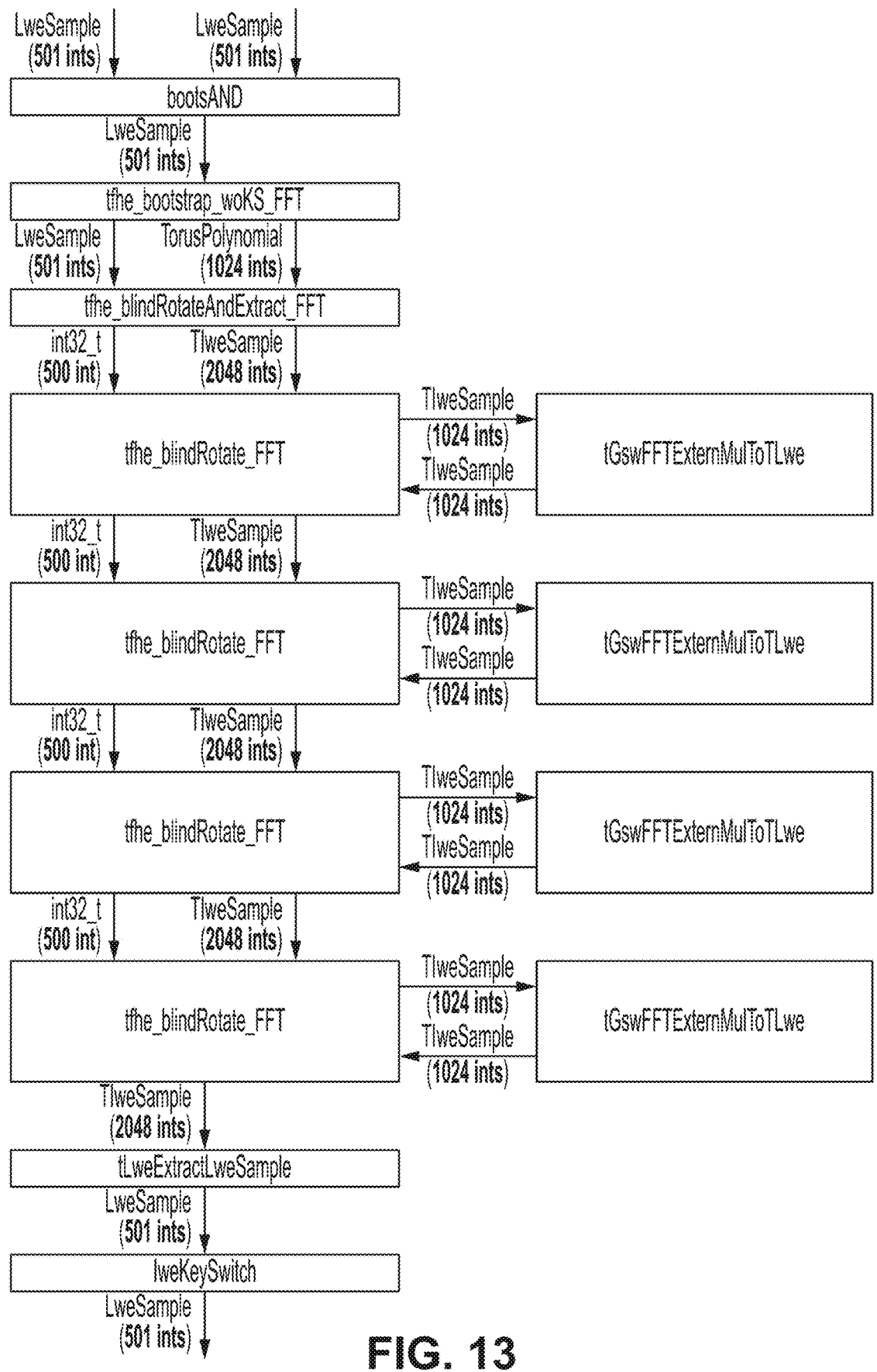
FIG. 13 illustrates the bootsAND Top-Level topology with partial unrolling of the tfhe_MuxRotate_FFT Loop in accordance with one or more implementations.

FIG. 13 shows the bootsAND Top-Level topology with partial unrolling of the tfhe_tfhe_blindRotate_FFT Loop. In FIG. 13, there are 4 tfhe_blindRotate_FFT modules, each containing a for-loop with 125 iterations. In contrast, the bootsAND Top-Level topology of FIG. 12 has a single instance of the tfhe_blindRotate_FFT module, the instance containing a for-loop with 500 iterations. Of course, the bootsAND Top-Level topology can be further unrolled as is appropriate for any specific application.

Figure 14:
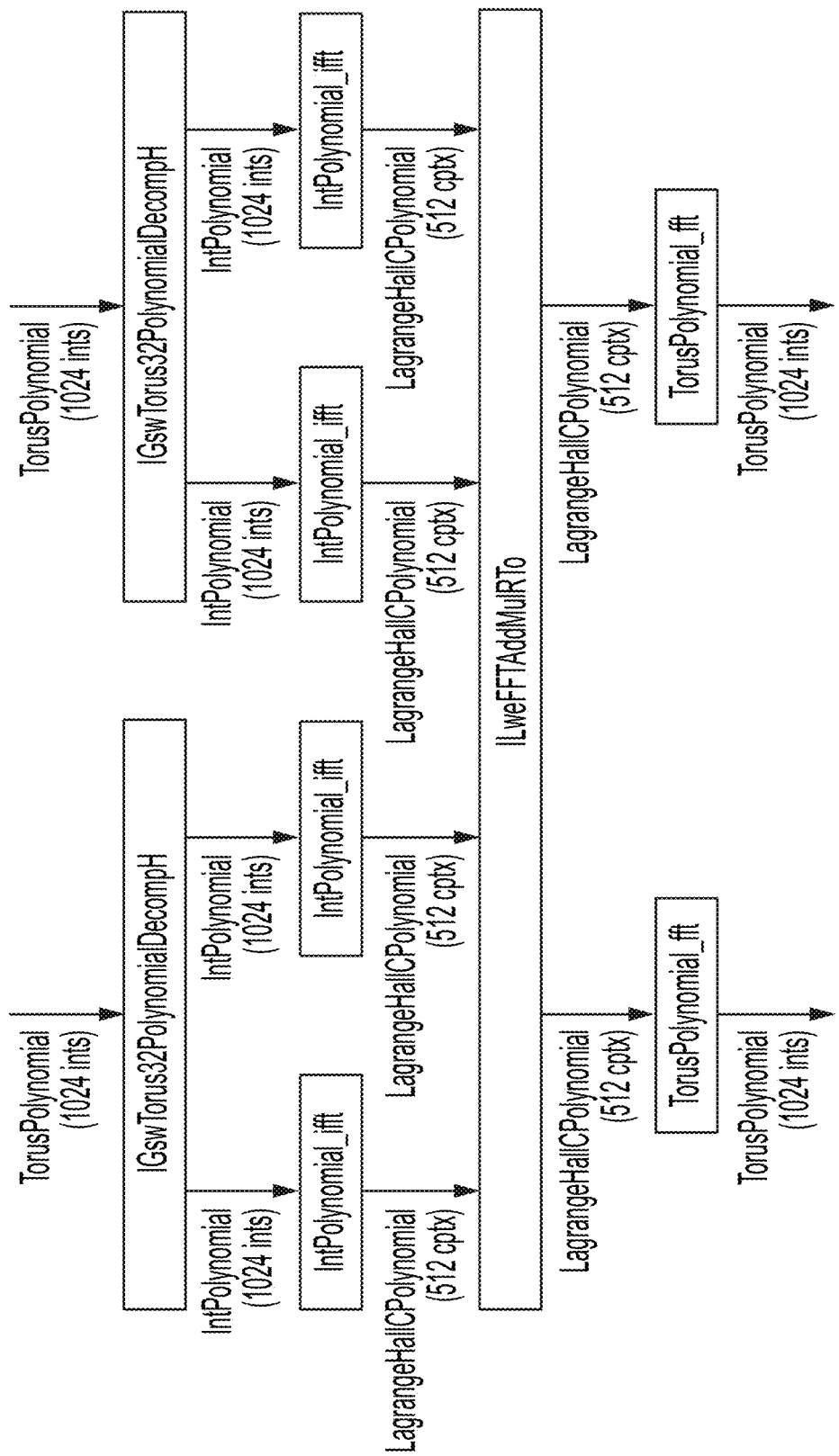
FIG. 14 shows the top-level topology derived from the tGswFFTExternMulToTLwe function in accordance with one or more implementations.

FIG. 14 shows the top-level topology derived from the GswFFTExternMulToTLwe function.

It is necessary to determine and upper bound on the throughput of a streaming topology. Applicants have developed an algorithm for determining an upper bound on the throughput of a streaming topology that performs a sequence of operations: the upper bound on throughput—in clock cycles per operation—for a Streaming topology is the maximum number of data values carried on a single topology stream during a single operation. This is so because a stream can transport data values at a maximum rate of one data value per clock cycle. For each stream, transport of data values for one operation must be completed before transport of data values for the next operation can begin. It follows that operations cannot be performed any faster than one operation per N clock cycles, where N is the maximum number of data values carried on a single stream during a single operation.

For example, the upper bound on throughput for the topology in FIG. 12 is: (The size of Ts_TlweSample in int32's)*(The number of loop iterations)

or 2,048*500=1,024,000 clock cycles per operation. While the upper bound on throughput for the topology in FIG. 13 is: (The size of Ts_TlweSample in int32's)*(The number of loop iterations) or 2,048*125=256,000 clock cycles per operation.

If the loop in FIG. 12 were to be fully unrolled, an upper bound on throughput of: (The size of Ts_TlweSample in int32's) or 2,048 clock cycles per operation would be achieved. The streaming topology described herein can achieve this upper bound because each core is able to: a) put a data value into its output stream(s) on every clock cycle, and b) get a data value from its input stream(s) on every clock cycle Table 1 summarizes the bootsAND function throughput numbers for two clock frequencies: a). 125 MHz, the clock rate for some FPGA implementations of streaming topology, and b) 1 GHz, the expected clock rate for some custom-ASIC implementations of the topology.

TABLE 1

|  | Throughput in Clock Cycles | Throughput in Microseconds at 125 MHz | Throughput in Microseconds at 1 GHz |
| --- | --- | --- | --- |
| bootsAND (no unrolling | 1,024,000 | 8,192 | 1,024 |
| bootsAND (4x unrolling | 256,000 | 2,048 | 256 |
| bootsAND (full unrolling | 2,048 | 16 | 2 |

Using the numbers in Table 1, we are able to calculate the times needed to perform a thousand of most common arithmetic operations, including: addition, subtraction, min, max and average. Table 2 illustrates the times to perform a thousand of the most common arithmetic operations, including addition, subtraction, min, max, and average, using the streaming topology.

|  | Clock Cycles | Milliseconds at 125 MHz | Milliseconds at 1 GHz |
| --- | --- | --- | --- |
| bootsAND (no unrolling | 1,024,000 | 8,192 | 1,024 |
| bootsAND (4x unrolling | 256,000 | 2,048 | 256 |
| bootsAND (full unrolling | 2,048 | 16 | 2 |

It can be seen that the streaming topology described herein provides greatly enhanced efficiency in processing FHE functions on a computer. However, the core of FHE processing is Fast Fourier Transforms (FFT) and Inverse Fast Fourier Transforms (IFFT). Therefore, additional efficiencies can be gained if FFT and IFFT can be processed faster. Applicants have discovered that some known techniques for optimizing Fourier Transforms can be leveraged to create even more efficient processing in a streaming environment.

The Fourier transform (FT) decomposes a function of time into its constituent frequencies. The Fourier transform of a function of time is itself a complex-valued function of frequency, whose magnitude (modulus) represents the amount of that frequency present in the original function, and whose argument is the phase offset of the basic sinusoid in that frequency. The Fourier transform is not limited to functions of time, but the domain of the original function is commonly referred to as the time domain. The inverse Fourier transform mathematically synthesizes the original function from its frequency domain representation. Linear operations performed in one domain (time or frequency) have corresponding operations in the other domain, which are sometimes easier to perform. Therefore, Fourier Transforms have many applications in data processing and are critical to some FHE implementations.

Implementations described herein define new way to process FFTs and IFFTs. The FFT can then be mapped into a new computational implementation, such as the streaming topology described herein, with high parallelism. Further, implementations process an FFT of each polynomial and multiply term-wise in the frequency domain then convert back to the time domain. Conventional processing uses a coefficient representation (i.e. multiplies the coefficient of each term). Conventional computation costs are on the order of $N^2$ squared (where N is order of polynomial). The method described herein yields a computation cost that is roughly N×Log(N).

Implementations described herein create a pipeline architecture that calculates FFT algorithms with a special stage at the endpoints that calculate multiples of order N polynomials. This greatly reduces computational requirements.

The discrete Fourier Transform (DFT) of a finite length sequence of N is:

$$X[k] = \sum_{n=0}^{N-1} x[n]W_N^{kn}, k = 0, 1, \ldots, N-1, \quad (1.1)$$

Where $W_N = e^{-j\left(\frac{2\pi}{N}\right)}$. The inverse discrete Fourier transform is given by $$x[n] = \frac{1}{N}\sum_{k=0}^{N-1} X[k]W_N^{-kn}, n = 0, 1, \ldots, N-1. \quad (1.2)$$

Using Decimation in Frequency methodologies, we can divide the output sequence of the DFT into smaller subsequences with the following equations.

$$X[2r] = \sum_{n=0}^{(N/2)-1} (x[n] + x[n + (N/2)])W_{N/2}^{rn}, r = 0, 1, \ldots, (N/2) - 1. \quad (2.1)$$

Equation (2.1) is the $(N/2)$ points $DFT$ of the $(N/2)$ – point sequence $g[n] = x[n] + x[n + (N/2)]$.

$$X[2r+1] = \sum_{n=0}^{(N/2)-1} (x[n] - x[n + (N/2)])W_N^n W_{N/2}^{rn}, \quad (2.2)$$

$$r = 0, 1, \ldots, (N/2) - 1.$$

Figure 15:
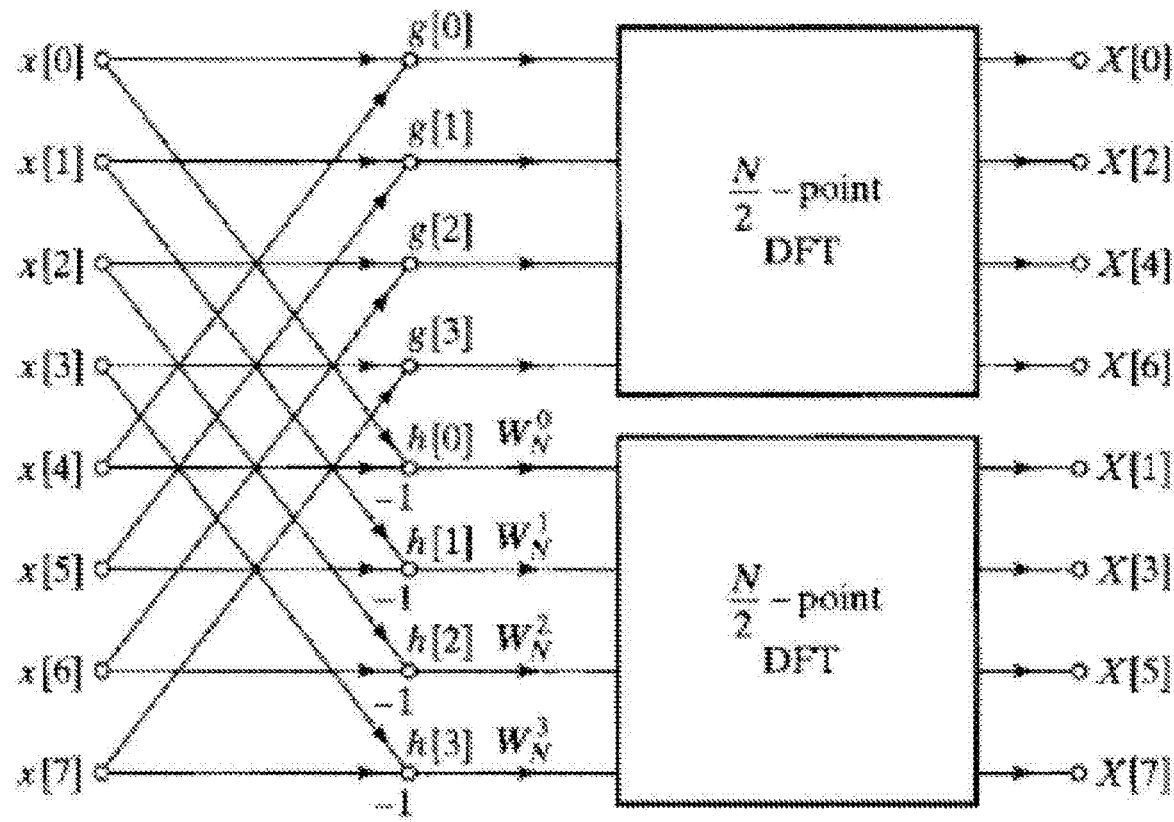
FIG. 15 graphically illustrates how Decimation-in-Frequency can be used to decompose an N=8-point DFT into 2 N/2=4 point DFTs in accordance with one or more implementations.
Figure 16:
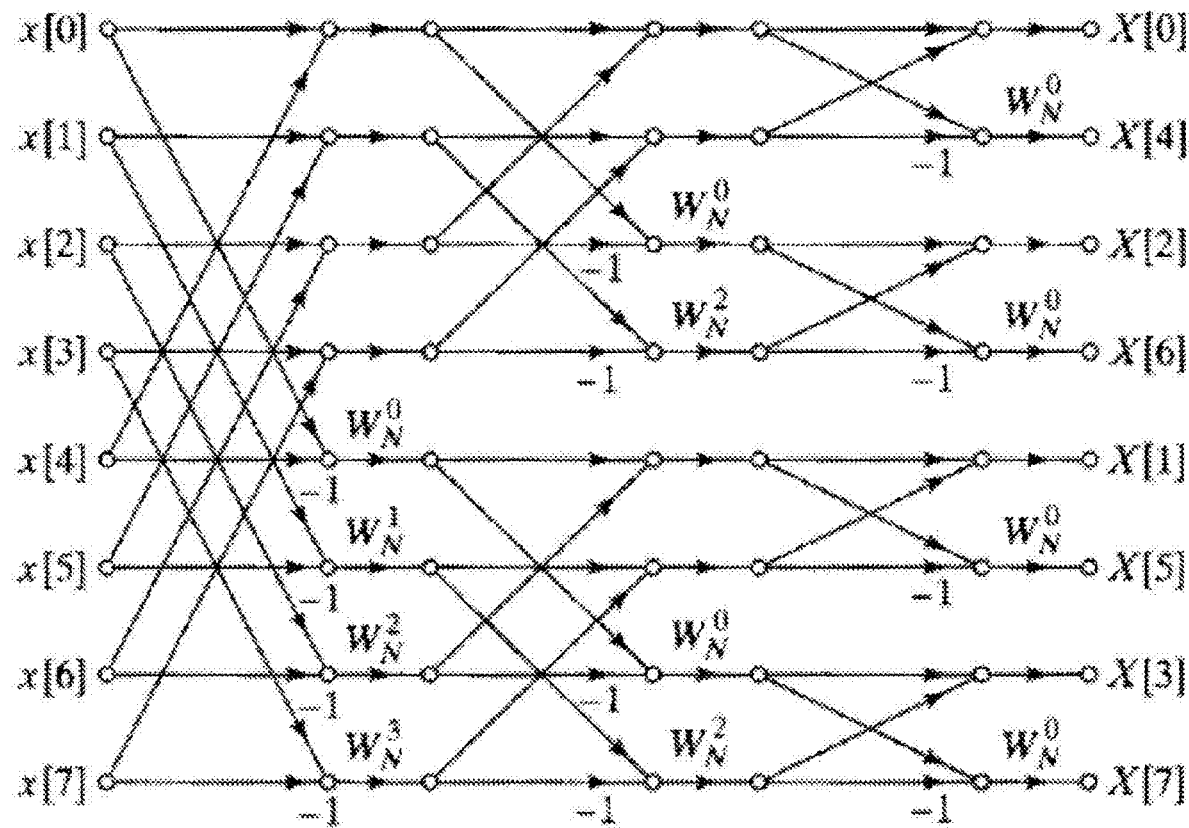
FIG. 16 is a flow graph of decimation-in-frequency decomposition of an 8 point DFT into four two point DFTs in accordance with one or more implementations.

FIG. 15 graphically illustrates how Decimation-in-Frequency can be used to decompose an N=8-point DFT into two N/2=4 point DFTs by applying equation 2.1 for the even outputs and equation 2.2 for the odd outputs. FIG. 16 is a flow graph of decimation-in-frequency decomposition of an 8-point DFT into four two point DFTs. Note that, in FIG. 16, there are 3 columns/stages. The first column has 4 "butterfly" structures, each having an input and output. A butterfly structure of a DFT is a portion of the computation that breaks up the results of larger DFTs into sub-transforms. Each column FIG. 16 has 4 butterfly structures.

Figure 17:
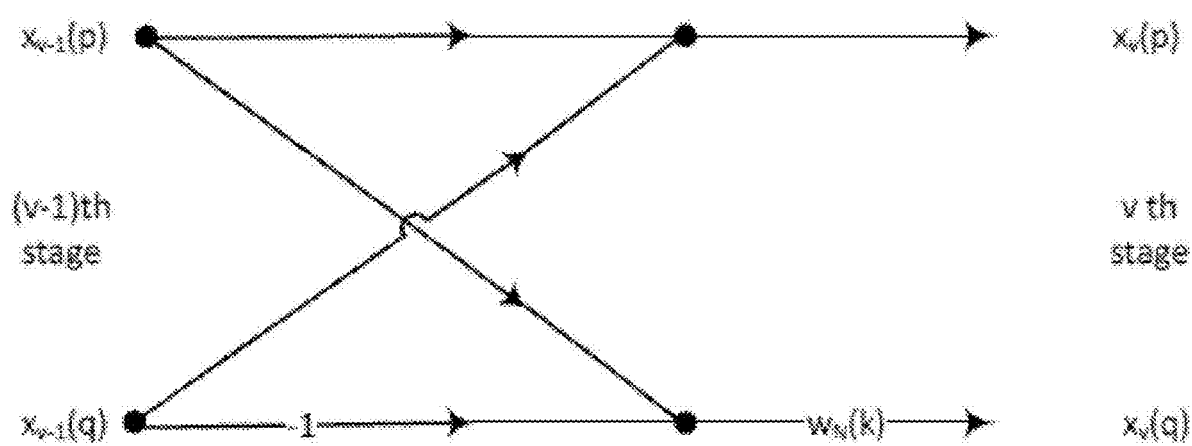
FIG. 17 is a basic flow graph of an FFT butterfly structure.
Figure 18:
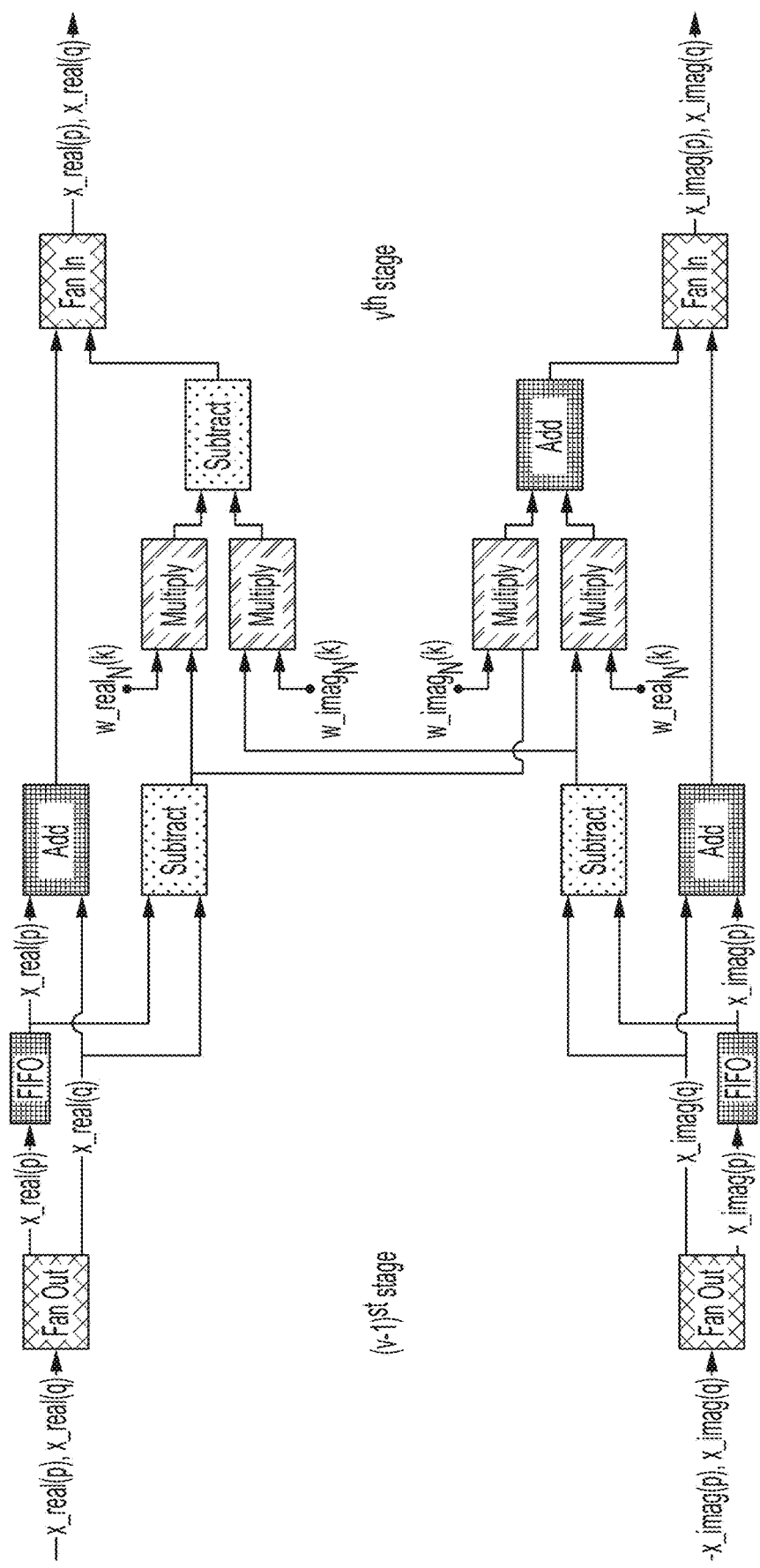
FIG. 18 is a logic element diagram of an FFT butterfly function in accordance with one or more implementations.

A basic flow graph of a butterfly structure is illustrated in FIG. 17. The input to the upper branch is p and the input to the lower branch is q Each butterfly structure can be mapped to a logic element and thus to a series of cores in a streaming topology. FIG. 18 is a logic element diagram of an FFT butterfly function. It can be seen that the logic is made up of standard logic elements (adders, multipliers . . . ). to create the flow graph, the complex inputs are divided into real and imagery parts for the computation. The upper input/output are for the real part, while the lower input/output are for the imagery part. The input/output is interleaved as p and q. The p and q input of the butterfly are selected from different addresses within the input buffer at different stages, as illustrated in FIG. 16. The "fanout" and "FIFO" accomplish this address selection. The "add", "subtraction" and "multiply" logic elements are used to calculate real and imagery parts of the multiplication of complex inputs and the complex constant "w". The "p" and "q" output of the butterfly are placed into the output buffer at different addresses at different stages, as illustrated in FIG. 16. The "FanIn" accomplishes this addressing.

Figure 19:
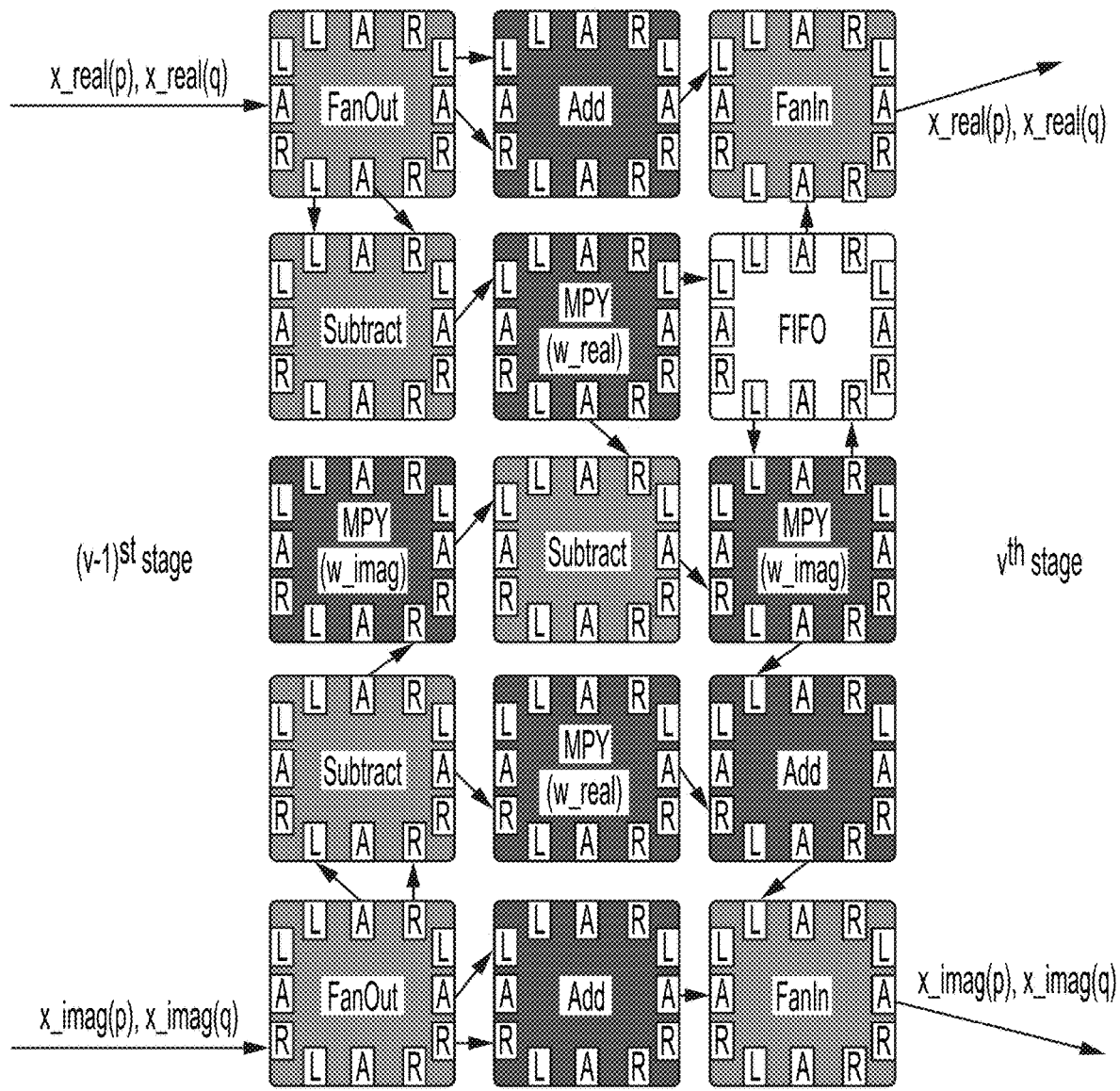
FIG. 19 illustrates the butterfly function of FIG. 19 mapped to physical cores of a streaming topology in accordance with one or more implementations.

FIG. 19 illustrates the butterfly function of FIG. 18 mapped to physical cores of a streaming topology. As described above, the cores include logic elements which can be configured to represent any processing algorithm. The result is that a single butterfly of one stage of an FFT has been mapped to silicon to define a streaming architecture for accomplishing the butterfly function. However, as discussed above, processing an FFT requires many butterfly functions.

The input sequence of an FFT (x[n]) can be also decomposed into smaller and smaller subsequences by applying Decimation-In-Time (DIT) transform algorithms. As discussed above, in the DIF algorithm, the decimation is done in the frequency domain. That's the reason, the frequency indices are in bit-reversed order. In DIT, we start, for example, with a single 8-point DFT, progress on to two 4-point DFTs and end with four 2-point DFTs by applying equation 3.1 below.

$$X[k] = \sum_{r=0}^{(N/2)-1} x[2r]W_{N/2}^{rk} + W_N^k \sum_{r=0}^{(N/2)} x[2r+1]W_{N/2}^{rk}X[k] \qquad (3.1)$$
$$= G[k] + W_N^K H[k], k = 0, 1, \ldots, N-1.$$

Figure 20:
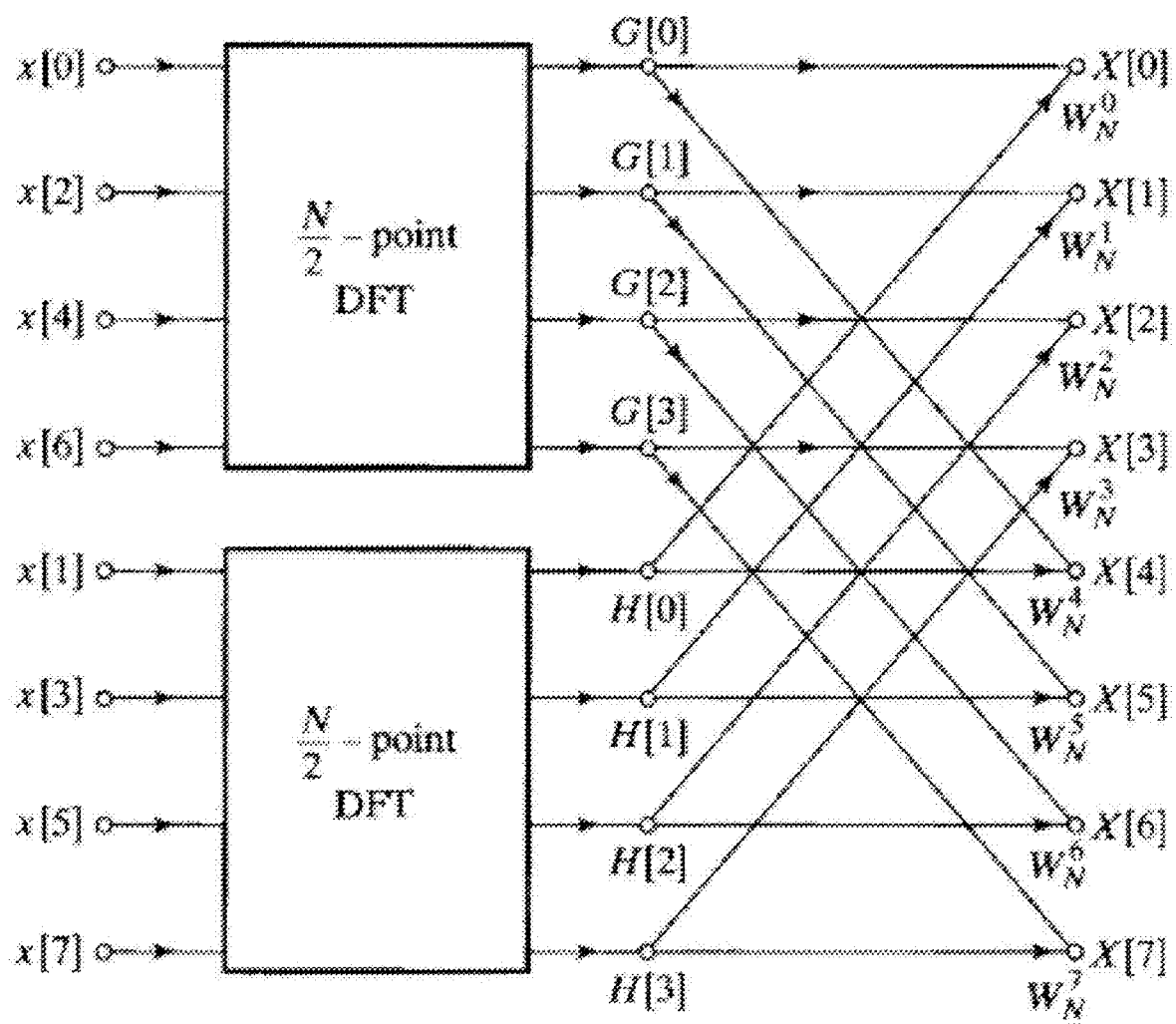
FIG. 20 is a flow graph of DIT decomposition of an N=8-point DFT into two N/2=4 point computations in accordance with one or more implementations.
Figure 21:
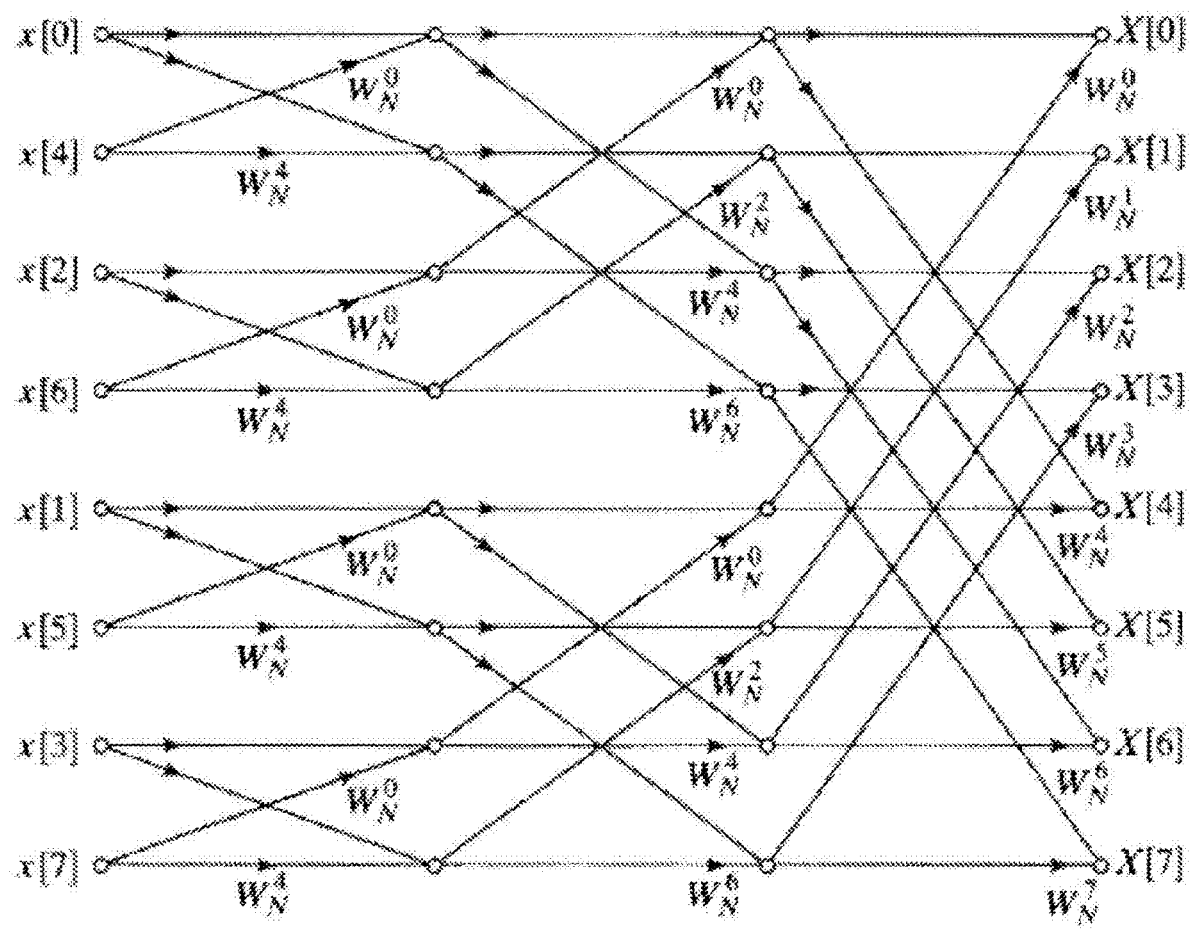
FIG. 21 is a flow chart of decimation-in-time decomposition of an 8-point DFT into four 2-point DFT computations in accordance with one or more implementations.
Figure 22:
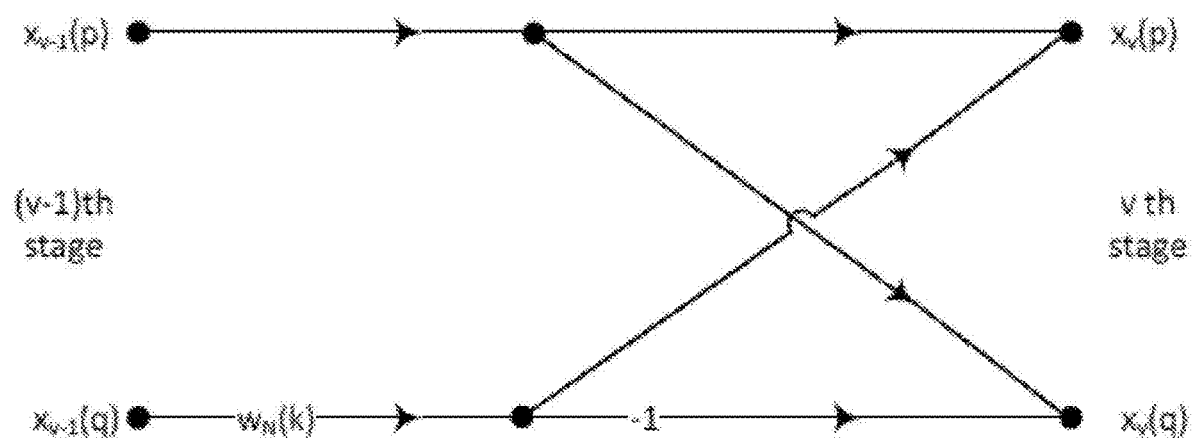
FIG. 22 illustrates a diagram on an input butterfly operation of single stage in accordance with one or more implementations.
Figure 23:
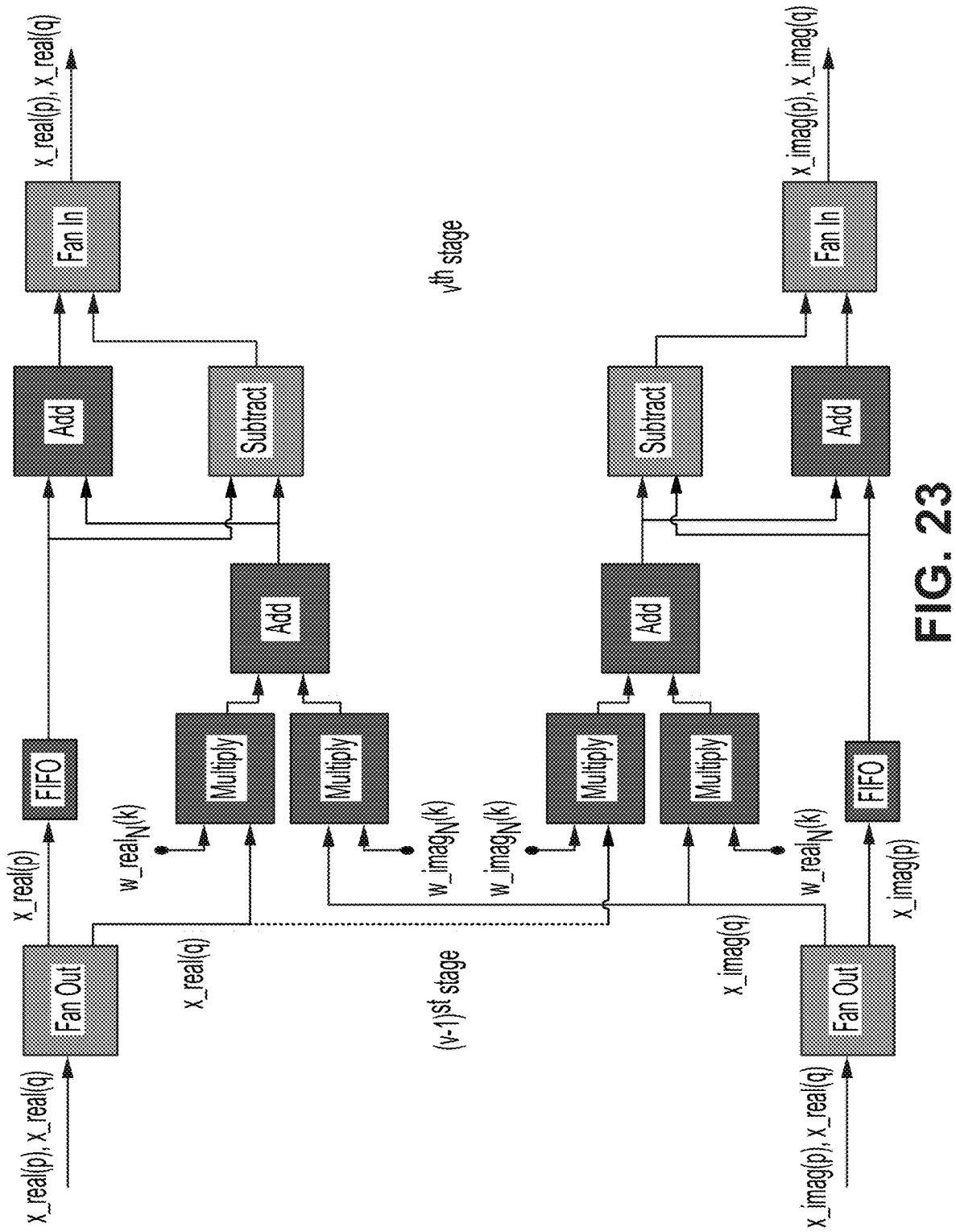
FIG. 23 illustrates a logic element diagram of the butterfly of FIG. 23 in accordance with one or more implementations.
Figure 24:
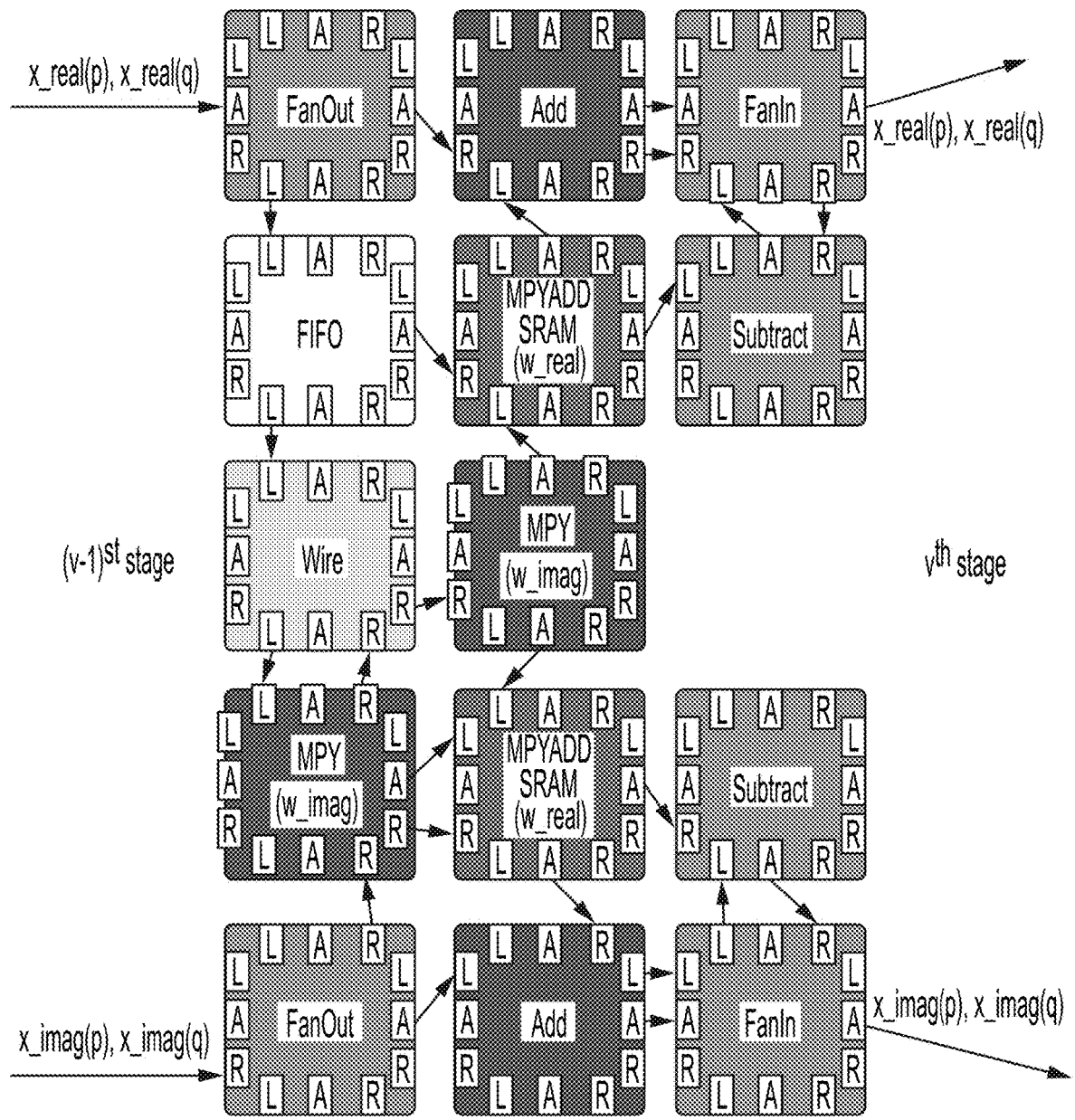
FIG. 24 illustrates the logic of FIG. 24 mapped out on cores of the streaming topology described herein in accordance with one or more implementations.

Each sum in equation (3.1) is the (N/2)-point DFT. The first sum is the (N/2)-point DFT of the even numbered points of the original input sequence and the second sum is the (N/2)-point DFT of the odd numbered points of the input sequence. FIG. 20 is a flow graph of DIT decomposition of an N=8 point DFT into two N/2=4 point computations. FIG. 21 is a flow chart of decimation-in-time decomposition of an 8-point DFT into four 2-point DFT computations. This is accomplished by applying equation 3.1 to continue to divide the N/2-point DFT into N/4-point DFTs until we obtain a 2-point FT. FIG. 22 is a diagram on an input butterfly operation of single stage. FIG. 23 is a logic element diagram of the butterfly of FIG. 22 obtained in a manner similar to that described above with respect to FIG. 18. FIG. 24 is the same logic mapped out on cores of the streaming topology described herein. Of course, the procedures described above can be used to map the logic diagrams to the cores.

Figure 25:
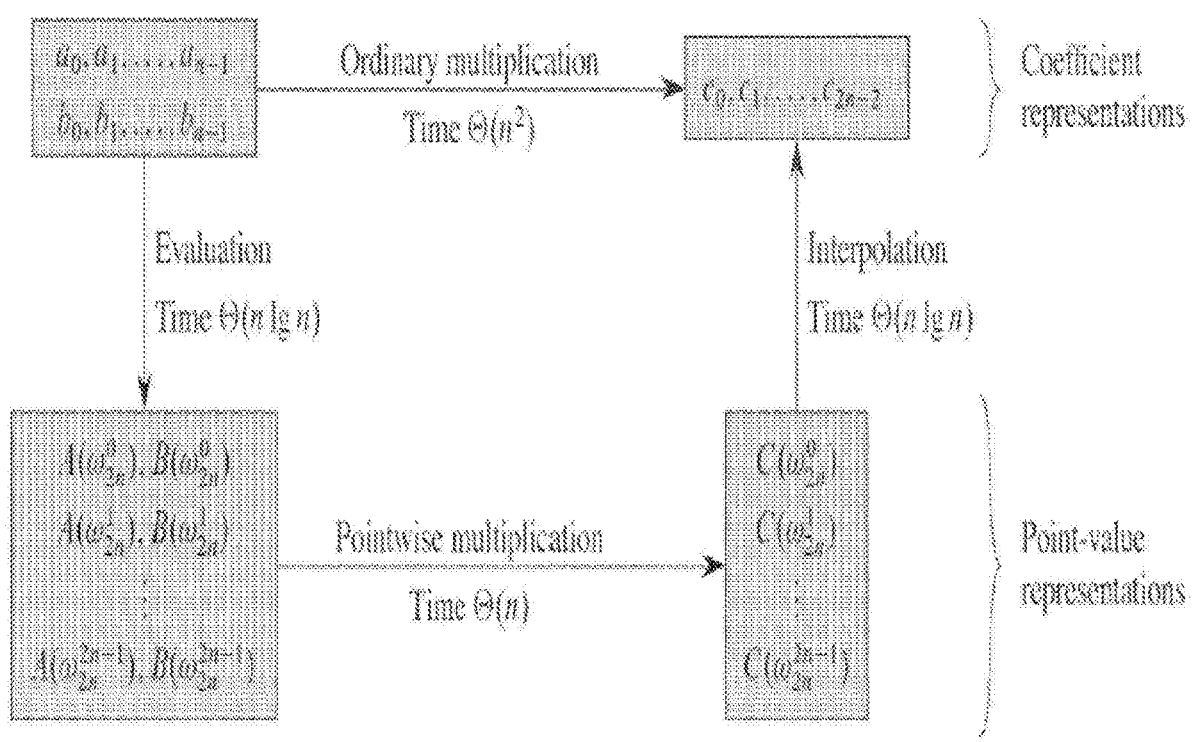
FIG. 25 illustrates polynomial multiplication, showing coefficients representation and point-value pair representation in accordance with one or more implementations.

FIG. 25 illustrates polynomial multiplication, showing coefficients representation and point-value pair representation. The top row of FIG. 25 is the conventional methodology. In the lower row of FIG. 25, in accordance with an implementation disclosed herein, FFT outputs A and B are pointwise multiplied to get C. subjecting the results of either method to an inverse (interpolation) algorithm achieves the same result. Given two polynomials $A(x)=\Sigma_{j=0}^{n-1}a_j x^j$ and $B(x)=\Sigma_{j=0}^{n-1}b_j x^j$, which are polynomials of degreebound n, their product, $C(x)=A(x)B(x)$ is a polynomial of degreebound 2n−1.

$$C(x) = \sum_{j=0}^{2n-2} c_j x^j, \qquad (4.1)$$

where $c_j = \Sigma_{k=0}^{j} a_k b_{j-k}$

Such a computation takes $O(n^2)$ time when we represent polynomial in the point-value format.

$$c = \text{IFFT}_{2n}[\text{FFT}_{2n}(a) \cdot \text{FFT}_{2n}(b)], \qquad (4.3)$$

where, the vectors a and b are padded with zeros to length 2n, and · denotes the component-wise of two 2n-length element vectors.

Figure 26:
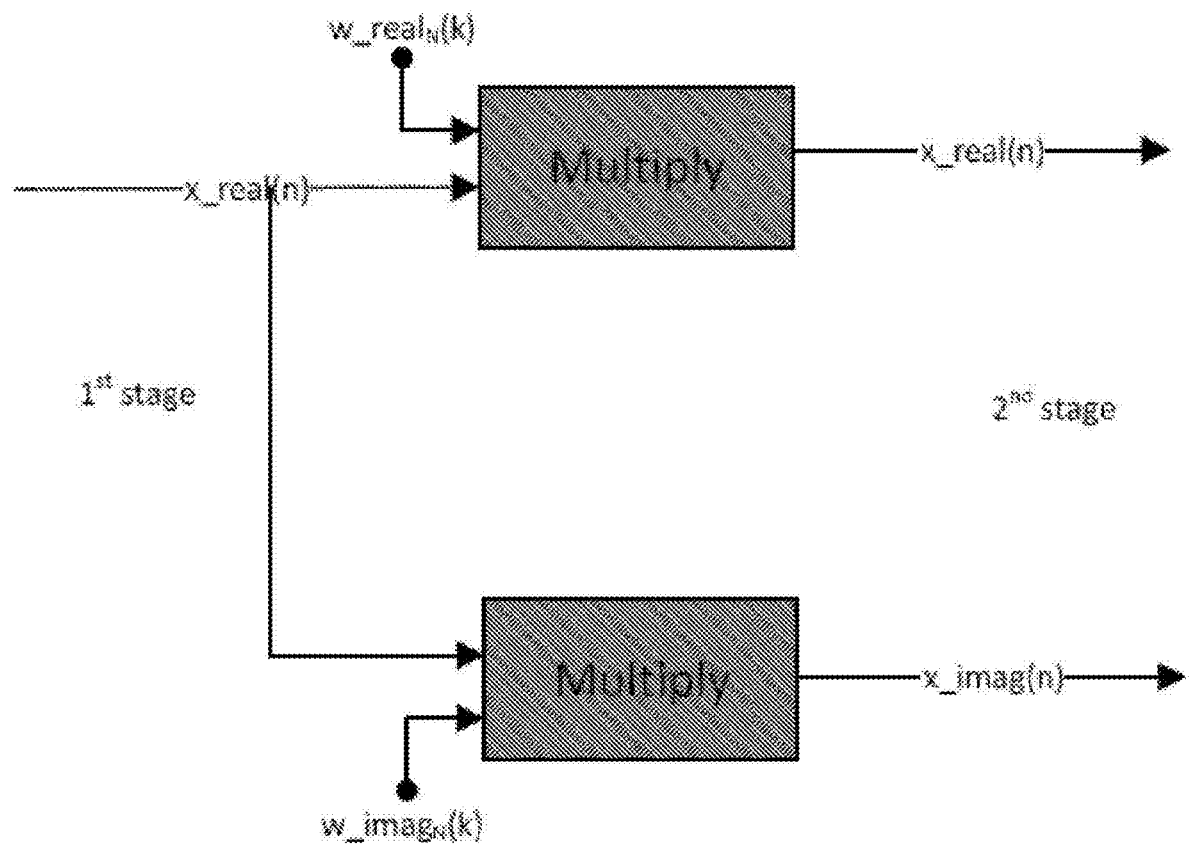
FIG. 26 illustrates an equivalent simplified logic flow in accordance with one or more implementations.
Figure 27:
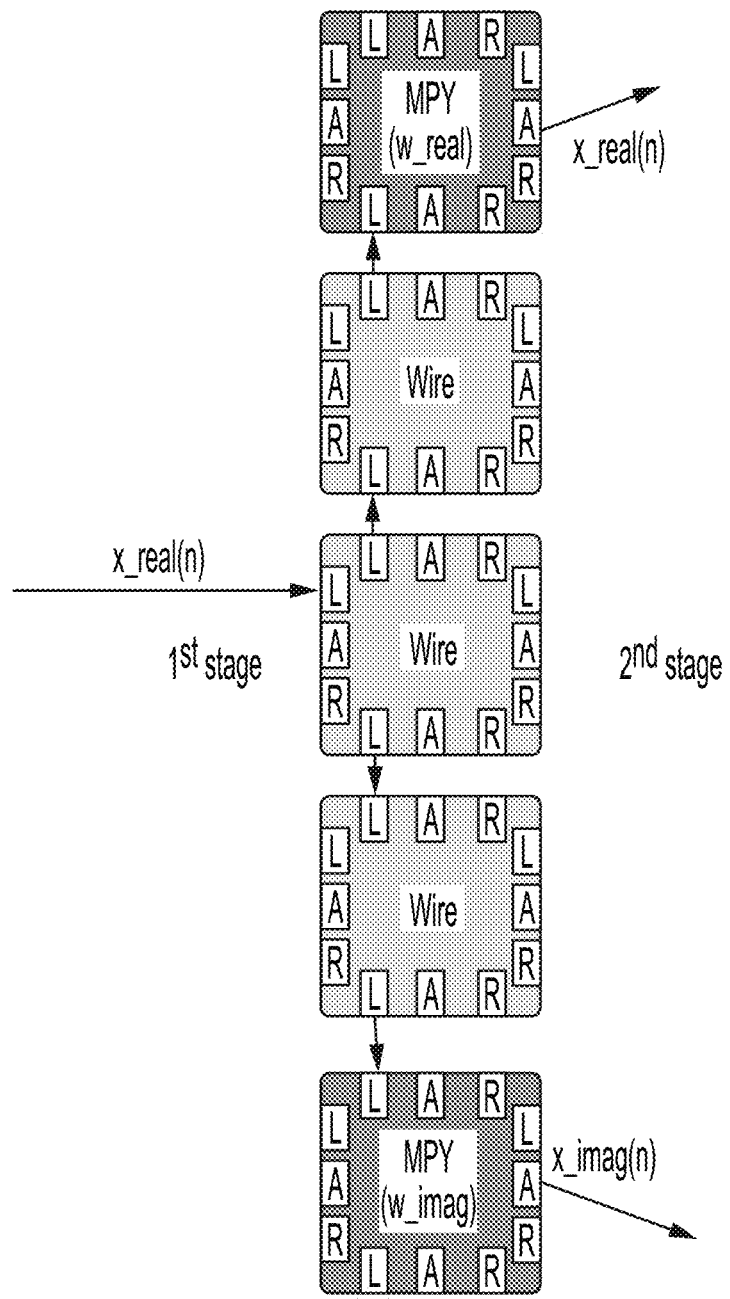
FIG. 27 illustrates a first stage streaming topology in accordance with one or more implementations.
Figure 28:
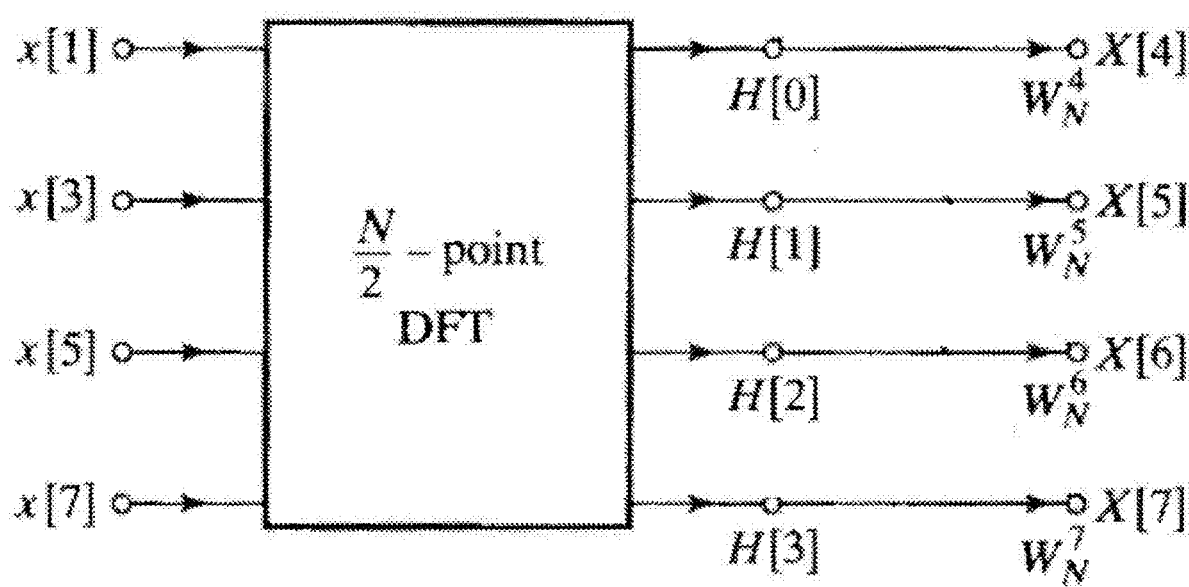
FIG. 28 illustrates the special last stage streaming topology in accordance with one or more implementations.
Figure 29:
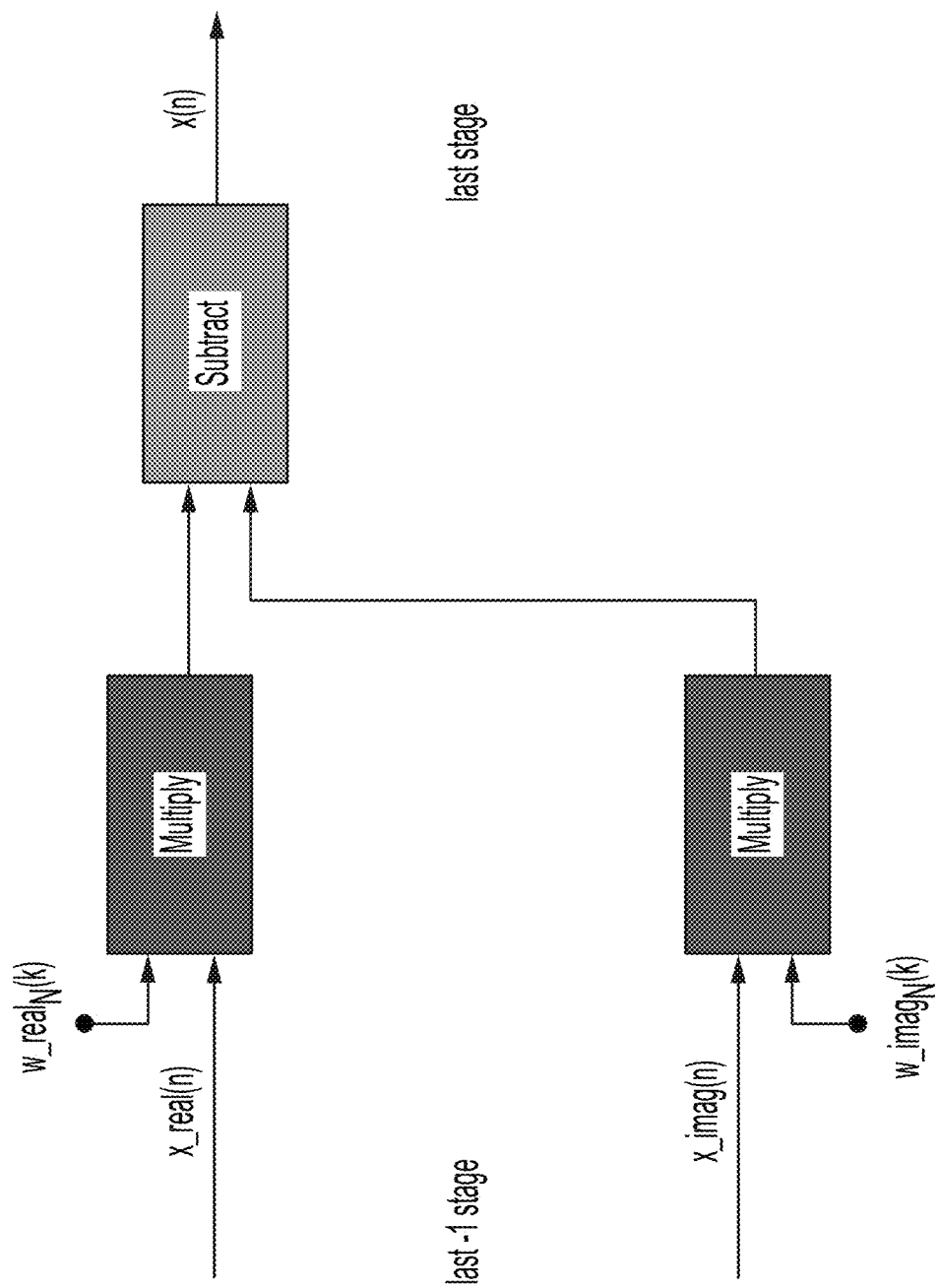
FIG. 29 illustrates the last stage of the optimized IFFT in a simplified form in accordance with one or more implementations.
Figure 30:
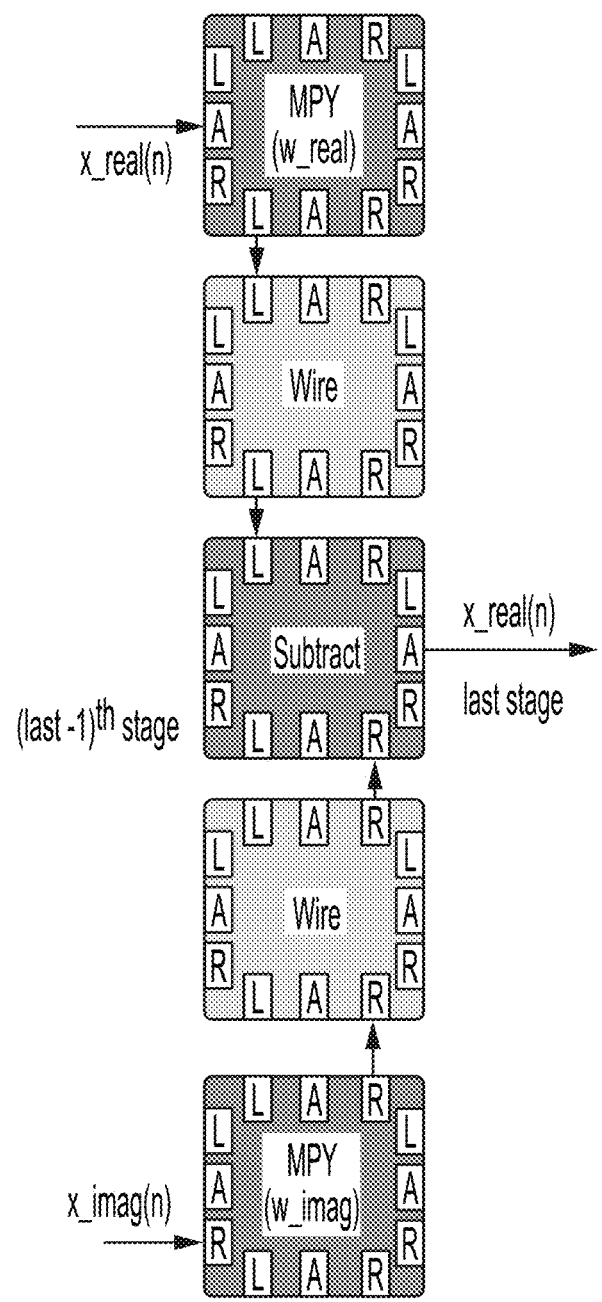
FIG. 30 illustrates the last stage streaming topology mapped onto cores in accordance with one or more implementations.

Given the fact that the elements in these vectors are real numbers (as opposed to complex numbers used as the standard input of an FFT) and the vectors have length of n and zero padded to length 2n, the FFT can be optimized by deploying a special first stage and an (N/2)-point FFT as shown in FIG. 25. As a result, the first stage of the optimized FFT has an equivalent logic flow that is very simple, as shown in FIG. 26. This yields a first stage streaming topology as shown in FIG. 27. A similar optimized (N/2) point IFFT (and corresponding relatively simple logic and streaming topology) can be used as the last stage for the same reasons. The special last stage is shown in FIG. 28. As a result, the last stage of the optimized IFFT has an equivalent logic flow that is very simple, as shown in FIG. 29. This yields a last stage streaming topology mapped onto cores as shown in FIG. 30.

In theory, to multiply two polynomials at order of N, an efficient way is to apply FFT to coefficients of each polynomial, pointwise multiply the FFT coefficients and perform the inverse FFT. The dimension of both the FFT and IFFT should be 2N. The coefficients of each polynomial are "zero-padded" to be a 2N dimension vector. The multiplication of two polynomials at order of N is in the order of 2N−1. In TFHE, the modular arithmetic operation with a polynomial is required. After multiplication of two Torus polynomials, the final product (2N−1 order polynomial) is reduced to modulo of $X^{N+1}$ based on the following equations.

$c(i)=p(i)−p(N+i), i=0,1,\ldots,N−1$ $c(N−1)=p(N−1)$

On the FFT implementation side, the FFT input is adjusted to achieve this modular operation before performing the 2N-point FFT by applying the following equations.

$$\mathit{fft}_{in(i)} = \frac{a(i)}{2}, i = 0, 1, \ldots N-1$$

$$\mathit{fft}_{in(i)} = -\frac{a(i)}{2}, i = N, N+1, \ldots 2N-1$$

Because of this unique input structure, the Decimation-in-Frequency Decomposition can be applies to optimize the FFT by deploying a special first stage and an (N)-point FFT. Similarly, the IFFT can optimized by deploying an (N)-point IFFT and a special last stage. Because of the modular arithmetic operation of polynomial in TFHE, there is no need to calculate the IFFT coefficients for i=N, N+1, . . . 2N−1.

The stages of the streaming topologies for the FFT and the IFFT noted above can be connected to create a single streaming topology for each. The results are the FFT topology illustrated in FIGS. 31a-31d and the IFFT illustrated in FIGS. 32a-32d. Note that FIGS. 31a-31d include a special first stage 320 and FIGS. 32a-32d include a special last stage 330. It can be seen that the FFT and IFFT processed in the manner described above can be mapped to a relatively simple topology of cores in the streaming environment described herein. This allows FFTs and IFFTs to be processed in the streaming environment and thus allows FHE operations to be processed in the streaming environment. As noted above, the streaming topology causes a computing device to operate much more efficiently, and thus with reduced computing resources. It can be seen that all stages of the FFT and IFFT calculation are streamed. Conventional FFT calculation is accomplished in a recursive manner, one stage at a time. The implementations allow all stages of the FFT and IFFT to be laid out on hardware using multiple cores in the manner described above.

The embodiments disclosed herein can be used in connection with various computing platforms. The platforms may include electronic storage, one or more processors, and/or other components. Computing platforms may include communication lines, or ports to enable the exchange of information with a network and/or other computing platforms. The computing platforms may include a plurality of hardware, software, and/or firmware components operating together to provide the functionality attributed herein. Electronic storage may comprise non-transitory storage media that electronically stores information Although the present technology has been described in detail for the purpose of illustration based on what is currently considered to be practical implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for configuring a reduced instruction set computer (RISC) processor architecture to execute a fully homomorphic encryption (FHE) logic gate as a streaming topology, wherein the RISC processor architecture includes a plurality of primary processing cores defined by RISC processors, each primary processing core comprising a main memory, at least one cache memory, and a plurality of arithmetic logic units, each primary processing core having an associated node wrapper, the associated node wrapper including access memory associated with each arithmetic logic unit, a load/unload matrix associated with each arithmetic logic unit, the method comprising:

parsing sequential FHE logic gate code;
transforming the FHE logic gate code into a set of code modules that each have in input and an output that is a function of the input and which do not pass control to other functions;
creating the associated node wrapper around each code module; and
configuring at least one of the primary processing cores to implement a logic element equivalent of each element in a manner which operates in a streaming mode wherein data streams out of the corresponding arithmetic logic units into the main memory and other ones of the plurality arithmetic logic units.

2. The method of claim 1, wherein the transforming comprises:
locating a pointer in the FHE logic gate code;
backtracking through the FHE logic gate code to find data that was created and an allocated block of data that is pointed to by the pointer;
determining a size of the allocated block;
replacing the pointer with a data array corresponding to the allocated block; and
using the data array as streaming data.

3. A computer processor architecture for executing a fully homomorphic encryption (FHE) logic gate as a streaming topology, the computer processor architecture comprising:
a plurality of primary processing cores defined by reduced instruction set computer (RISC) processors, each primary processing core comprising a main memory, at least one cache memory, and a plurality of arithmetic logic units, each primary core having an associated node wrapper, the associated node wrapper including access memory associated with each arithmetic logic unit, a load/unload matrix associated with each of the arithmetic logic units;
wherein sequential FHE logic gate code has been transformed into a set of code modules that each have an input and an output that is a function of the input and which do not pass control to other functions, the associated node wrapper has been created around each code module; and
wherein at least one of the primary processing cores has been configured architecture to implement a logic element equivalent of each element in a manner which operates in a streaming mode wherein data streams out of the corresponding arithmetic logic units into the main memory and other ones of the plurality arithmetic logic units.

4. The computer processor architecture of claim 3, wherein the FHE logic gate code was transformed by locating a pointer in the FHE logic gate code, backtracking through the FHE logic gate code to find data that was created and an allocated block of data that is pointed to by the pointer, determining a size of the allocated block, replacing the pointer with a data array corresponding to the allocated block, and using the data array as streaming data.

* * * * *